United States Patent
Jang et al.

(10) Patent No.: US 9,768,824 B2
(45) Date of Patent: Sep. 19, 2017

(54) MOBILE TERMINAL AND CONTROL METHOD FOR THE MOBILE TERMINAL

(71) Applicant: LG Electronics Inc., Seoul (KR)

(72) Inventors: Inkwi Jang, Seoul (KR); Sanghyun Eim, Seoul (KR); Ilbyoung Yi, Seoul (KR); Sojin Kim, Seoul (KR); Yongho Lee, Seoul (KR); Kwanghyun Ahn, Seoul (KR); Hophil Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/351,251

(22) Filed: Nov. 14, 2016

(65) Prior Publication Data

US 2017/0063424 A1   Mar. 2, 2017

Related U.S. Application Data

(63) Continuation of application No. 14/242,595, filed on Apr. 1, 2014, now Pat. No. 9,531,422.

(30) Foreign Application Priority Data

Dec. 4, 2013 (KR) .................. 10-2013-0149900
Feb. 11, 2014 (KR) .................. 10-2014-0015560

(51) Int. Cl.
*H04M 1/00* (2006.01)
*H04W 68/00* (2009.01)
(Continued)

(52) U.S. Cl.
CPC ............ *H04B 1/3888* (2013.01); *H04M 1/04* (2013.01); *H04M 1/22* (2013.01);
(Continued)

(58) Field of Classification Search
None
See application file for complete search history.

(56) References Cited

U.S. PATENT DOCUMENTS 6,415,138 B2    7/2002  Sirola et al.
8,989,826 B1 *  3/2015  Connolly .............. A45C 1/06
                                                361/679.01
(Continued)

FOREIGN PATENT DOCUMENTS

CN    2695097     4/2005
EP    2532265     12/2012
(Continued)

OTHER PUBLICATIONS

European Patent Office Application Serial No. 14167517.3 Search Report dated Apr. 21, 2015, 6 pages.
(Continued)

*Primary Examiner* — Moustapha Diaby
(74) *Attorney, Agent, or Firm* — Lee, Hong, Degerman, Kang & Waimey PC

(57) ABSTRACT

The present disclosure relates to a mobile terminal mounted with a cover to provide its associated functions, and a control method thereof. The present disclosure may include a body having a front surface and a rear surface thereof, a display unit disposed on the front surface, a cover disposed to cover the display unit, and provided with a window portion, and a controller configured to control the display unit to illuminate notification light on the window portion when an event occurs while the display unit is deactivated. The window portion may be formed to expose at least part of the display unit to the outside while covering the display, and the cover is formed to output the illuminated notification light at a boundary of the window portion.

16 Claims, 49 Drawing Sheets

(51) Int. Cl.
*H04B 1/3888* (2015.01)
*H04M 1/04* (2006.01)
*H04M 1/22* (2006.01)
*H04M 19/04* (2006.01)
*H04M 1/725* (2006.01)
*A45C 11/00* (2006.01)

(52) U.S. Cl.
CPC ..... *H04M 1/72522* (2013.01); *H04M 19/048* (2013.01); *A45C 2011/002* (2013.01); *H04M 2250/22* (2013.01)

(56) References Cited

U.S. PATENT DOCUMENTS

| | | | |
|---|---|---|---|
| 2001/0012769 A1 | 8/2001 | Sirola et al. | |
| 2007/0268699 A1* | 11/2007 | Awabayashi | G09F 13/22 362/249.07 |
| 2008/0129714 A1* | 6/2008 | Akiyama | G09G 3/3426 345/204 |
| 2011/0195753 A1* | 8/2011 | Mock | H04B 1/3888 455/566 |
| 2012/0208466 A1 | 8/2012 | Park et al. | |
| 2012/0212430 A1* | 8/2012 | Jung | G06F 1/1626 345/173 |
| 2012/0302294 A1* | 11/2012 | Hammond | H04M 1/18 455/567 |
| 2012/0314421 A1 | 12/2012 | Infanti et al. | |
| 2013/0088410 A1* | 4/2013 | Hill | G06F 3/1431 345/1.1 |
| 2013/0242505 A1* | 9/2013 | Nguyen | G06F 1/1626 361/679.55 |
| 2013/0265800 A1 | 10/2013 | Hong et al. | |
| 2013/0281169 A1 | 10/2013 | Coverstone et al. | |
| 2015/0155903 A1 | 6/2015 | Jang et al. | |

FOREIGN PATENT DOCUMENTS

| | | |
|---|---|---|
| KR | 10-1212133 | 12/2012 |
| KR | 10-2013-0079064 | 7/2013 |
| KR | 10-1322205 | 10/2013 |
| KR | 10-2014-0011453 | 1/2014 |
| WO | 2004/098078 | 11/2004 |

OTHER PUBLICATIONS

State Intellectual Property Office of the People's Republic of China Application Serial No. 201410724583.2 Office Action dated Nov. 3, 2016, 12 pages.
Korean Intellectual Property Office Application Serial No. 10-2013-0149900, Notice of Allowance dated Oct. 20, 2015, 1 page.
Korean Intellectual Property Office Application Serial No. 10-2013-0149900, Office Action dated Aug. 18, 2015, 4 pages.

* cited by examiner (a)

(b)

(b)

(a)

(b)

(c)

(d)

(a)

(b)

(a)　　　　　　　　(b)

(a)

(b)

(c)

(a)    (b)

(c)

(a)

(b)

(c)

(a)

(b)

(c)

(a)  (b)

(a)　　　　　　　　　(b)

(a)  (b)

(a)            (b)

MOBILE TERMINAL AND CONTROL METHOD FOR THE MOBILE TERMINAL

CROSS-REFERENCE TO RELATED APPLICATIONS

This application is a continuation of U.S. patent application Ser. No. 14/242,595, filed on Apr. 1, 2014, now U.S. Patent No. 9,531,422, which claims the benefit of earlier filing date and right of priority to Korean Application No. 10-2013-0149900, filed on Dec. 4, 2013, and 10-2014-0015560, filed on Feb. 11, 2014, the contents of which are all hereby incorporated by reference herein in their entirety.

RELATED APPLICATION

Pursuant to 35 U.S.C. §119(a), this application claims the benefit of earlier filing date and right of priority to Korean Application No. 10-2013-0149900, filed on Dec. 4, 2013, and 10-2014-0015560, filed on Feb. 11, 2014, the contents of which are all hereby incorporated by reference herein in their entirety.

BACKGROUND OF THE INVENTION

1. Field of the Invention

The present disclosure relates to a mobile terminal mounted with a cover to provide its associated functions, and a control method thereof.

2. Description of the Related Art

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Furthermore, in recent years, the development of a cover (or pouch) surrounding at least part of the mobile terminal has been actively carried out to protect the mobile terminal. However, the use of the mobile terminal will be restricted while the mobile terminal is covered by a cover. For such an example of restriction, while the display unit of the mobile terminal is covered by the cover, a user may not know visual information displayed thereon, and therefore, the display unit should be open. Accordingly, a mobile terminal capable of providing information associated with the mobile terminal to the user even while the display unit of the mobile terminal is covered by the cover may be conceived.

SUMMARY OF THE INVENTION

An aspect of the present disclosure is to provide a cover for implementing a new form factor of a mobile terminal in association with the mobile terminal.

Another aspect of the present disclosure is to provide a mobile terminal capable of providing information even while the cover is not open, and a control method thereof.

Furthermore, the present disclosure provides a new mechanism for allowing design changes and additional functions in a mobile terminal.

In addition, still another aspect of the present disclosure is to implement a structure that emits light from a folio cover in a folio type mobile terminal case for covering a display unit, thereby providing a mobile terminal case with the role of an indicator and an excellent design.

In order to accomplish the foregoing objective, the present disclosure may include a body having a front surface and a rear surface thereof, a display unit disposed on the front surface, a cover disposed to cover the display unit, and provided with a window portion, and a controller configured to control the display unit to illuminate notification light on the window portion when an event occurs while the display unit is deactivated. The window portion may be formed to expose at least part of the display unit to the outside while covering the display, and the cover may be formed to output the illuminated notification light at a boundary of the window portion.

According to an embodiment, the cover may include a cover front surface portion configured to cover the display unit, and a guide portion mounted on the cover front portion to cover at least part of the display unit, and formed to guide light output from the display unit to the window portion.

According to an embodiment, the guide portion may be formed to surround an outer circumference of the window portion.

According to an embodiment, the window portion may be formed with a circular shape, and the guide portion may be formed to be greater than the window portion, and a through hole corresponding to the window portion is formed in the guide portion.

According to an embodiment, a recess portion recessed along the thickness direction thereof to accommodate the guide sheet portion may be formed on the cover body portion.

According to an embodiment, the controller may turn on a region covered by the guide sheet portion within the display unit to guide light displayed on the display unit by the guide portion when the event occurs.

According to an embodiment, the cover may be provided with a light transmitting edge region to output light output from the display unit to the outside.

According to an embodiment, the cover may include a guide portion at least part of which is exposed to the outside while covering the display unit to guide light output from the display unit to the edge region.

According to an embodiment, the cover portion may include a sensing unit configured to sense a configuration that the cover portion is covered on the display unit, and the controller may control the display unit to output notification light on the boundary of the window portion when an event occurs while the cover portion covers the display unit.

According to an embodiment, the controller may control the display unit to vary the color of notification light output on the boundary of the window portion according to the type of the occurred event.

According to an embodiment, the window portion may be formed with a circular shape, and an image sequentially turned on along the outer circumference of the window portion may be formed on the display unit.

According to an embodiment, the controller may control a turn-on speed displaying the image on the display unit at a first speed when the occurred event is an event associated with a first application, and control a turn-on speed displaying the image on the display unit at a second speed which is different from the first speed when the occurred event is an event associated with a second application which is different from the first application.

According to an embodiment, the window portion may be formed with a circular shape, and when there exist a plurality of notification target events to be guided through the notification light, the controller may control the display unit to partition the outer circumference of the window portion into a plurality of regions based on the number of a plurality of events, and display different colors of notification light on the surrounding of the plurality of partitioned regions.

According to an embodiment, the different colors may be determined based on the types of the plurality of events, and information on the different colors may be stored in a memory in connection with the information of applications corresponding to the plurality of events, respectively, and when an event occurs, the controller may control the display unit to output notification light based on the information of an application corresponding to the occurred event and color information in connection with an application corresponding to the occurred event. According to an embodiment, the controller may display a plurality of icons representing applications corresponding to the plurality of events, respectively, when notification light consisting of a plurality of colors is output on the outer circumference of the window portion and then a predetermined type of touch is applied to the window portion within a predetermined period of time, and output the detailed information of an event corresponding to the selected icon on an exposed region exposed through the window portion of the display unit when any one of the displayed icons is selected.

According to an embodiment, the plurality of icons may be arranged along the circumference of the window portion.

According to an embodiment, the controller may display the plurality of icons with colors based on color information in connection with applications corresponding to the plurality of icons, respectively.

According to an embodiment, when any one of the plurality of icons is selected, the controller may switch notification light consisting of a plurality of colors along the outer circumference of the window portion to a color in connection with an application corresponding to the selected icon.

According to an embodiment, the notification target event may be an event that has occurred prior to a time point at which notification light is output in response to the event occurrence but has been unchecked.

According to an embodiment, when a predetermined type of touch is applied to the window portion while displaying the different colors of notification light, the controller may display detailed information on any one of the plurality of notification target events.

According to an embodiment, when a predetermined type of touch is applied again to the window portion while displaying detailed information on any one of the plurality of notification target events, the controller may switch detailed information displayed on the display unit to detailed information on the other one of the plurality of notification target events.

According to an embodiment, different colors constituting the notification light may represent the plurality of notification target events, respectively, and when detailed information on any one of the plurality of notification target events is switched to detailed information on the other one thereof, the controller may exclude a color corresponding to the any one event from the different colors constituting the notification light.

Moreover, the present disclosure may include a rear cover combined with a rear surface of the mobile terminal, and a folio cover connected to one side of the rear cover to cover a front surface of the mobile terminal, wherein the folio cover provides a front sheet located on the front surface, a rear sheet brought into contact with the front surface of the mobile terminal, a light source interposed between the front sheet and the rear sheet, an opening portion formed on the front sheet, and a light guide member configured to guide light incident from the light source to be emitted to the front surface through the opening portion of the front sheet.

The light guide member may include an opening portion formed on the front sheet, and a light guide sheet disposed on a rear surface of the opening portion to emit light emitted from the light source through the opening portion.

The light guide member may include an opening portion formed on the folio cover, and a light guide sheet one side of which is disposed adjacent to the light source, and the other side of which is located around the opening portion.

The light guide member may further include a reflective layer formed on a rear surface of the light guide sheet.

The opening portion may include a plurality of micro perforated holes, and may further include liquid crystals for selectively transmitting light between the light guide member and the micro perforated holes.

The present disclosure may further include a connection terminal brought into contact with a rear terminal formed on a rear surface of the mobile terminal when coupling to the mobile terminal and formed at an inner side of the rear cover, and a circuit unit configured to supply power to the light source from the power supply terminal.

The present disclosure may use a flexible printed circuit board as the circuit unit.

During the occurrence of an event on the mobile terminal, power may be applied through the connection terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
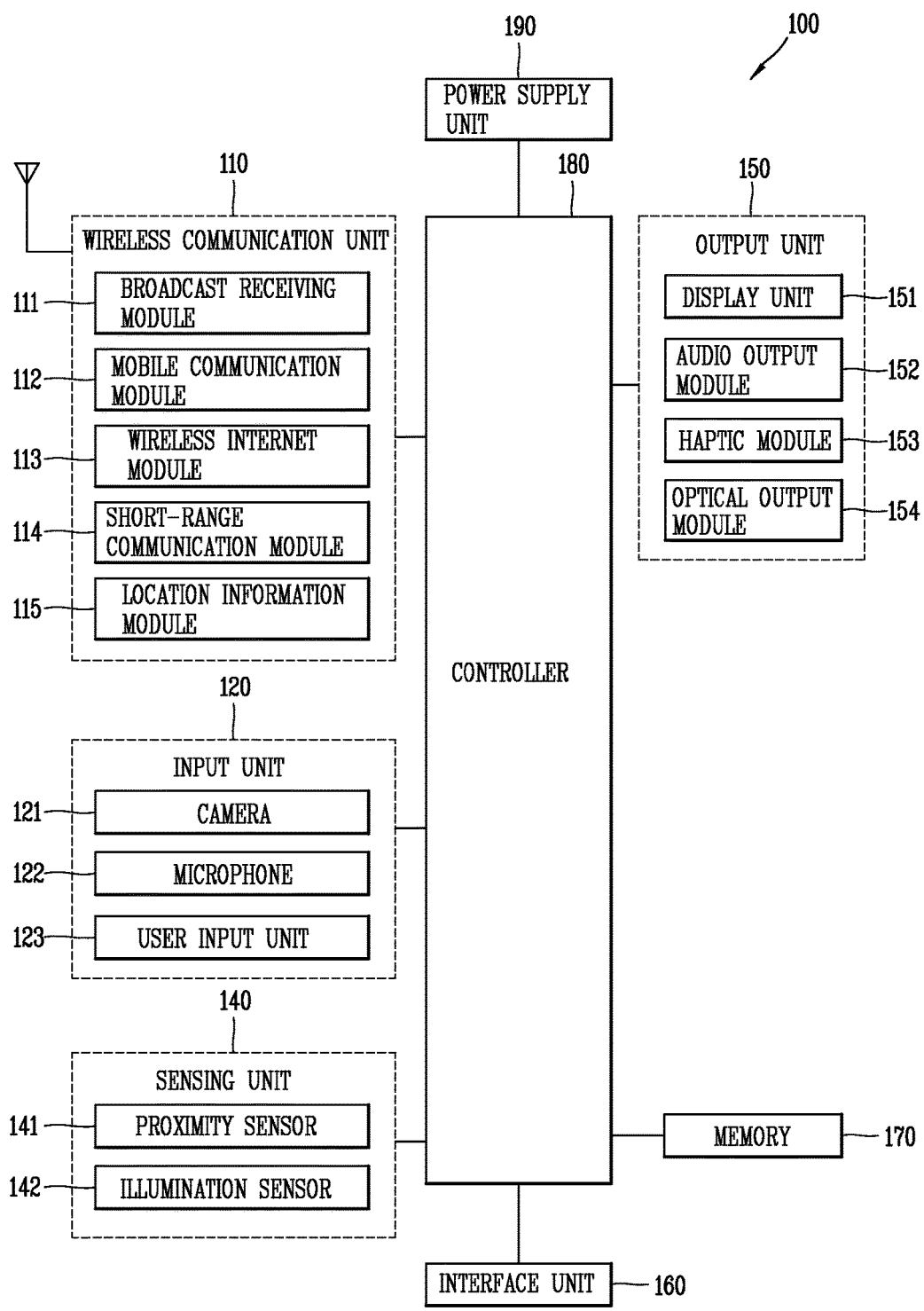
FIG. 1A is a block diagram for explaining a mobile terminal associated with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
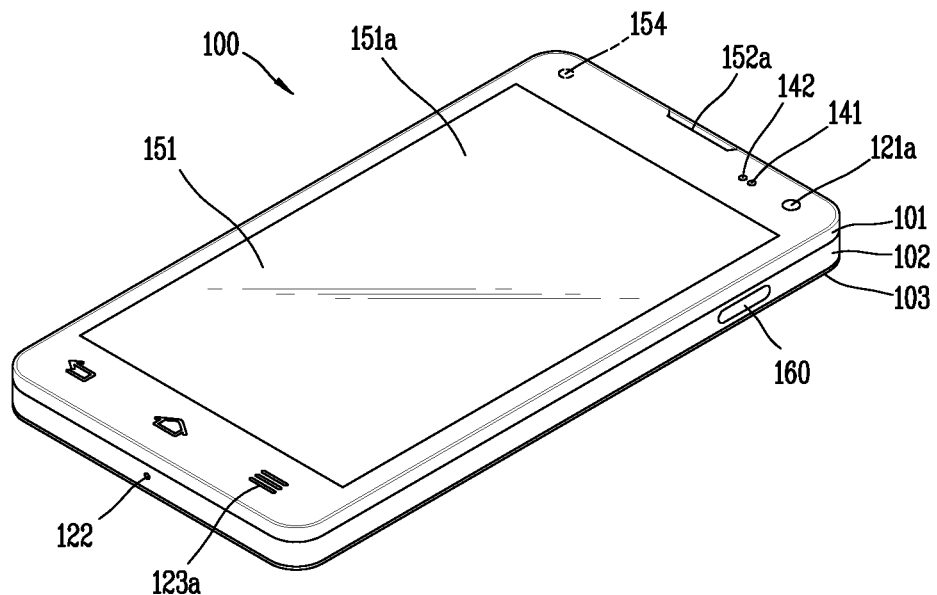
FIGS. 1B and 1C are conceptual views in which an example of the mobile terminal associated with the present disclosure is seen from different directions.
Figure 1C:
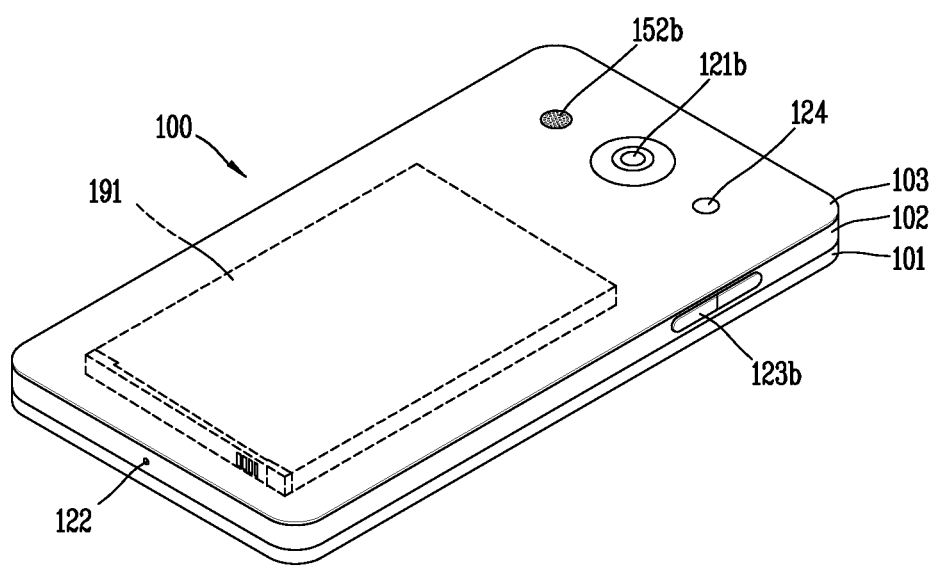

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic to display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), is titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

Figure 10:
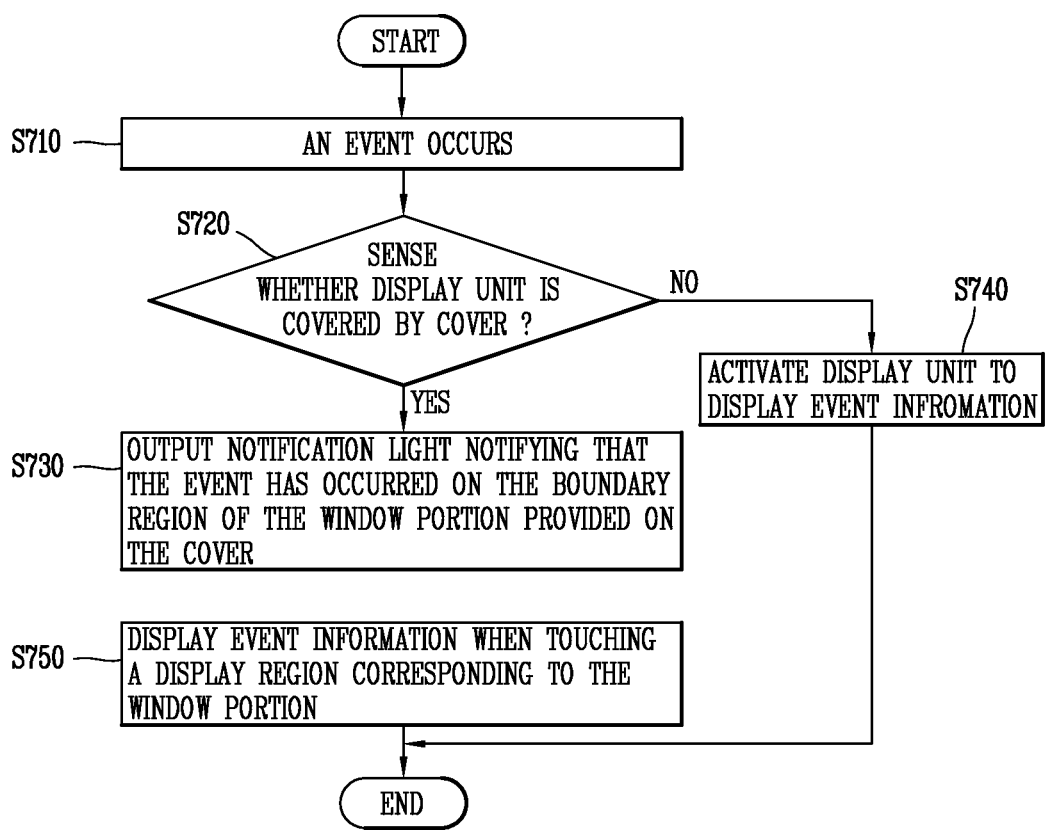
FIG. 10 is a flow char for explaining a method of providing a user interface notifying the occurrence of an event using a cover in a mobile terminal according to an embodiment of the present disclosure.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

On the other hand, according to the drawing, it is illustrated that a rear surface cover 103 is combined with a rear case 102 to cover the battery so as to restrict the release of the battery 191, and configured to protect the battery 191 from external shocks and foreign substances. When the battery 191 is detachably configured in a terminal body, the rear surface cover 103 may be detachably combined with the rear case 102.

An accessory for protecting an appearance of the mobile terminal 100 or for assisting or extending the function of the mobile terminal 100 may be added to the mobile terminal 100. For an example of the accessory, there is a touch pen for assisting or extending a touch input to the touch screen. For another example, there is a pouch or cover for covering or accommodating at least one surface of the mobile terminal 100. The pouch or cover may be configured to extend the function of the mobile terminal 100 in connection with the display unit 151.

On the other hand, according to the present disclosure, information output from the mobile terminal may be processed in association with the structure or function of the pouch or cover (hereinafter, referred to as a "cover"). Hereinafter, it will be described in more detail with reference to the accompanying drawings.

Figure 2A:
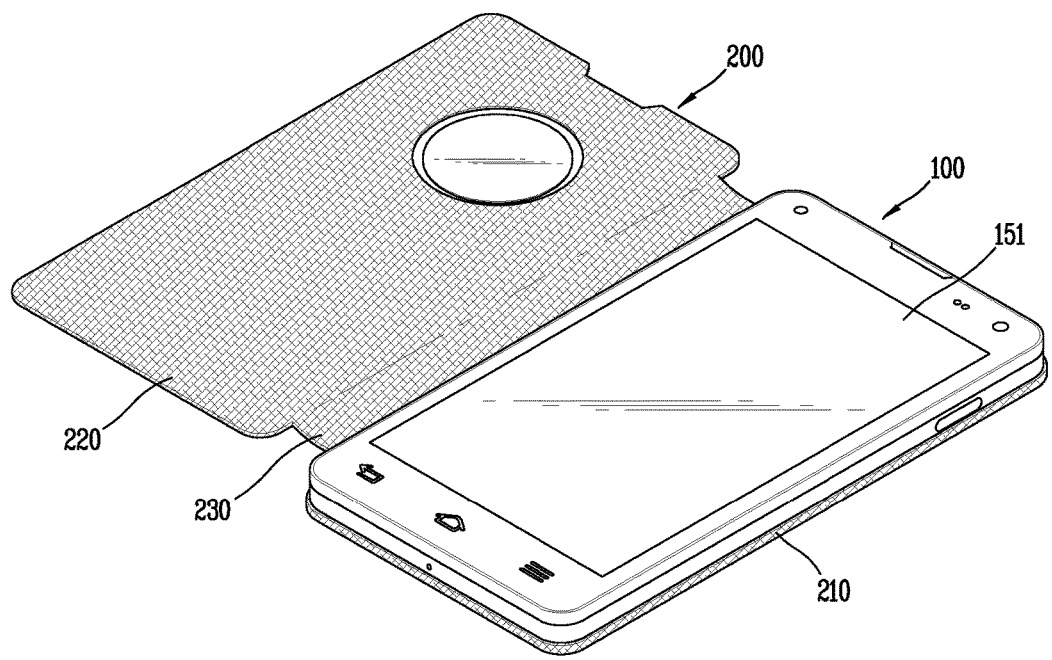
FIGS. 2A and 2B are perspective views illustrating a mobile terminal accommodated in a cover according to an embodiment of the present disclosure.
Figure 2B:
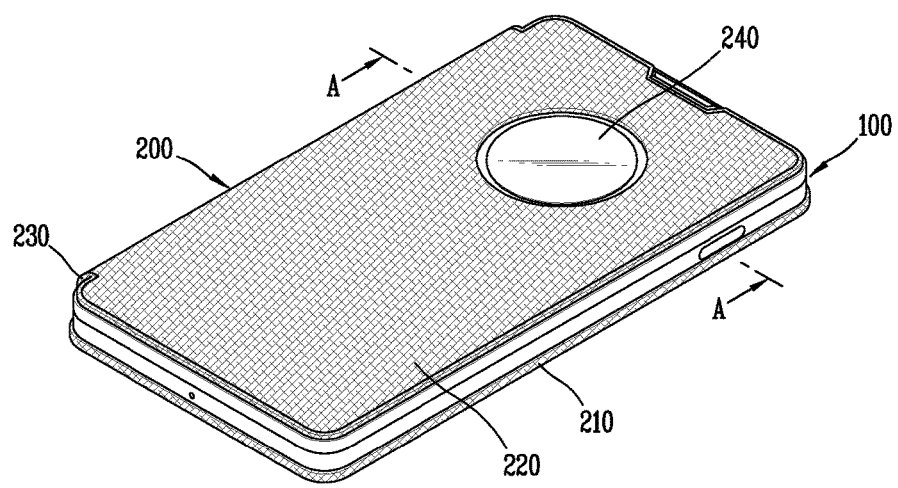

FIGS. 2A and 2B are perspective views illustrating a mobile terminal accommodated in a cover according to an embodiment of the present disclosure.

According to the drawing, the cover 200 is configured to accommodate a body of the mobile terminal. FIG. 2A illustrates a configuration in which the front surface of the mobile terminal is open by the cover 200. The configuration in which the front surface is open becomes a configuration in which the display unit 151 disposed on the front surface thereof is open.

The cover 200 may include a cover rear surface portion 210 configured to accommodate a rear surface of the body of the mobile terminal. Furthermore, the cover may include a cover front surface portion 220 rotatably connected to the cover rear surface portion 210 to cover or open the display unit 151.

However, the present disclosure may not be necessarily limited to this, and to for example, the cover rear surface portion 210 may be configured to be combined with a lateral surface of the body, other than to a rear surface thereof.

Furthermore, the cover 200 may be configured with a structure replacing the rear surface cover 103 of the terminal body. More specifically, in a mobile terminal combined with a battery cover, the cover 200 may be combined with a rear surface is portion of the mobile terminal instead of the battery cover. In this case, the a coupling protrusion allowing the cover 200 to be detachable as a battery cover may be formed on an inner lateral surface of the cover rear surface portion 210, and a coupling groove combined with the coupling protrusion may be provided in a rear case of the terminal.

For another example, in a mobile terminal with a battery cover provided as an integral body therein, the cover 200 may be combined with the mobile terminal while covering the battery cover. In this case, a coupling protrusion for coupling the mobile terminal to the cover may be disposed at another portion other than the cover rear surface portion 210.

According to the drawing, the cover rear surface portion 210 may be protruded from the cover rear surface portion 210 to be integrally formed with a cover lateral surface portion surrounding a lateral surface of the terminal. The cover lateral surface portion is protruded from an edge of the main surface of the cover rear surface portion 210 to surround the lateral surface of the terminal. More specifically, the cover lateral surface portion may be protruded in a direction perpendicular to the main surface, and formed to partially surround the lateral surface or entirely surround the lateral surface.

According to the drawing, a connecting portion 230 may be protruded and extended from the edge of the cover rear surface portion 210 to the outside to connect the cover rear surface portion 210 to the cover front surface portion 220. The connecting portion 230 may have a narrow width to be easily warped, and the cover front surface portion 220 may be rotated while covering the display unit 151 using the warpage of the connecting portion 230. In this case, a supporting protrusion bent at one side of the cover rear surface portion 210 to be closely adhered to one side of an edge of the mobile terminal may be provided in the connecting portion 230.

The connecting portion 230 may be integrally formed with the cover front surface portion 220, and combined with the cover rear surface portion 210. In this case, the connecting portion 230 may have the same material as that of the cover front surface portion 220 to be extended from one side of the cover front surface portion.

For another example, the connecting portion 230 may be integrally formed with the cover rear surface portion 210, and combined with the cover front surface portion 220. In this case, the connecting portion 230 may have the same material as that of the cover rear surface portion 210 to be extended from one side of the cover rear surface portion 210.

FIG. 2B illustrates a configuration in which the cover 200 covers the display unit 151 of the mobile terminal.

In a covered configuration, the mobile terminal 100 and cover 200 form a diary like shape to enhance the user's portability. Furthermore, the cover 200 may perform the role of a protective cover surrounding the mobile terminal 100, and thus the mobile terminal 100 can be more safely protected from external shocks or stimulations.

The cover rear surface portion 210 and cover front surface portion 220 may be formed to be disposed in parallel to each other in a covered configuration, and the connecting portion 230 may be formed to block only part of a gap formed between the cover rear surface portion 210 and cover front surface portion 220. In this case, the remaining portion of the gap may be filled by providing the cover lateral surface portion.

Referring to the drawing, the cover 200 is formed to expose the visual information of the display unit 151 while covering the display unit 151. More specifically, referring to FIG. 2B, the cover front surface portion 220 may include a window portion 240, and the window portion 240 may be a region made of a light transmitting member. The window portion 240 is formed to display the visual information of the display unit 151 on an outer surface of the window portion 240 due to light transmittance.

The window portion 240 is formed to be overlapped with the display unit 151 to display the visual information thereof. More specifically, the window portion 240 may be located at an upper portion of the front surface of the display unit 151 while the cover front surface portion 220 covers the display unit 151. Due to the structure, the user can recognize icons, text, images and the like displayed on the display unit 151 from the outside through the window portion 240.

Furthermore, when an event occurs in the terminal in a state that the cover front surface portion is closed and the display unit 151 is deactivated, the terminal of the present disclosure may activate a portion corresponding to a region exposed by the window portion 240 within the display unit, and the cover 200 may be configured to output notification light to the outside using light generated by the activation of the display unit 151. In this case, a portion exposed to the outside by the window within a region of the display unit may be activated to display an additional screen. For such a control operation, a mechanism for converging light output from the display unit 151 to generate a specific pattern is provided in the cover 200. Hereinafter, the pattern generation mechanism will be described in more detail.

Figure 3:
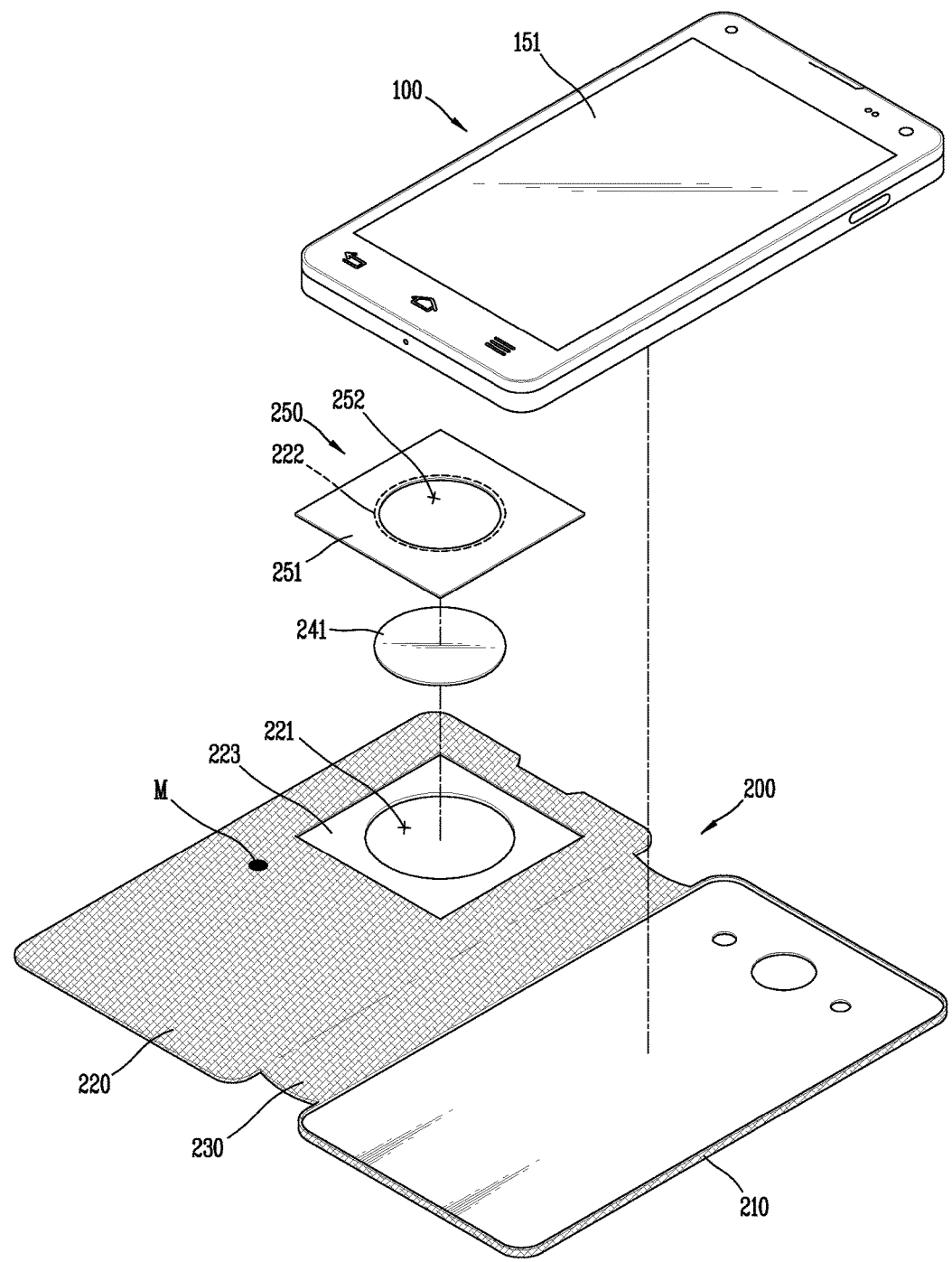
FIG. 3 is an exploded view illustrating a cover in FIG. 2A.
Figure 4A:
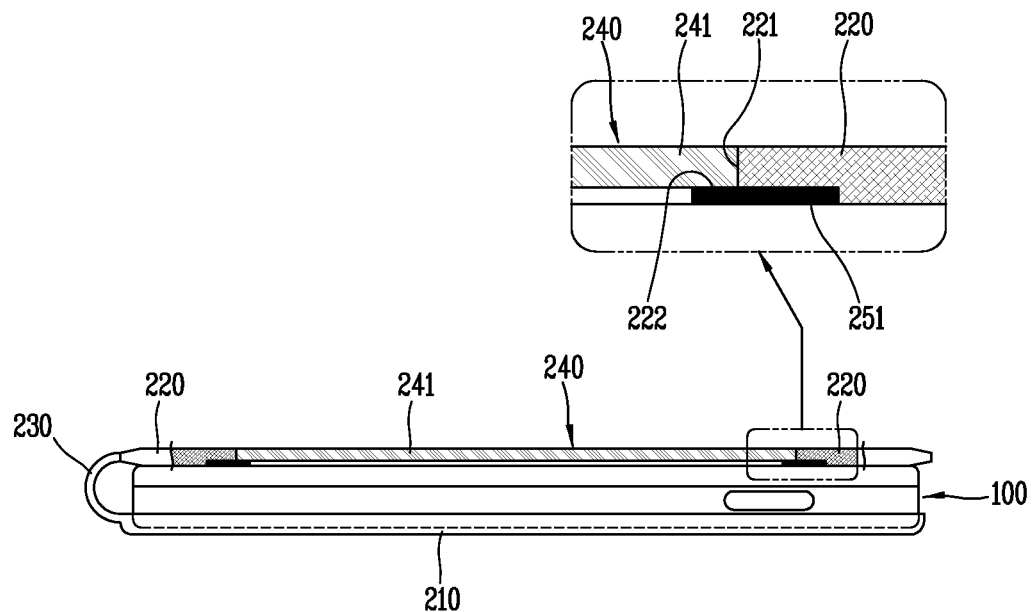
FIG. 4A is a cross-sectional view taken along line A-A in FIG. 2B.

FIG. 3 is an exploded view illustrating a cover in FIG. 2A, and FIG. 4A is a cross-sectional view taken along line A-A in FIG. 2B.

Referring to FIGS. 3 and 4A, a window hole 221 is formed on the cover front surface portion 220, and the window portion 240 (refer to FIG. 2B or 4A) may include a window 241 formed to cover the window hole 221. The window hole 221 may be located at a center line in the length direction of the display unit 151 of the terminal (or center line in the length direction of a front surface of the terminal) while the cover 200 covers the terminal. However, the present disclosure may not be necessarily limited to this, and the window portion 240 may be a structure formed only with the window hole 221 with no window 241.

The window 241 may include an outer surface formed on the same plane as that of one surface (outer surface: a surface exposed to the outside in a covered configuration) of the cover front surface portion 220, and made of a material such as glass, transparent silicon, transparent urethane, transparent synthetic resin, and the like.

A mounting surface 222 on which the window 241 is mounted is provided in the cover front surface portion 220, and the mounting surface 222 may be a surface having a height difference with respect to an outer surface of the cover front surface portion, and formed to surround the window hole 221.

Referring to FIGS. 3 and 4A, the cover 200 may include a guide portion 250 mounted on the mounting surface 222. The guide portion 250 is formed to guide light output from the display unit 151 to the window portion 240.

The window portion 240 is formed to expose at least part of the display unit 151 to the outside while covering the display. The notification light is illuminated at a boundary (or a boundary portion) of the window portion 240. The notification light is not illuminated at a region excluding the boundary of the window portion 240 in the cover 200. The region includes a first remaining portion and a second remaining portion. The first remaining portion is a part excluding the boundary portion in the window portion 240, and the second remaining portion is a part excluding the window portion 240 in the cover 200.

Furthermore, the cover 200 is formed to output the illuminated notification light at a boundary of the window portion 240. The notification light.

The guide portion 250 is configured to cover at least part of the display unit 151 while the cover 200 covers the display unit 151, and formed to diffuse light to a specific region of the window portion 240 when light output from the display unit 151 is entered. A specific pattern may be formed on the outside of the cover 200 due to the diffusion of light.

According to the present example, it is disclosed a structure in which a circular pattern is formed along a border of the window portion 240, more particularly, along an edge of the window 241. To this end, the window 241 may be a circular shape. Furthermore, the guide portion 250 may be formed to be greater than the window portion 240, and formed to cover the surrounding of the window portion 240. For example, the window portion 240 may be configured with a circular shape, and to this end the window 241 is formed with a circular shape. Furthermore, the guide portion 250 is formed to be greater than the window portion 240, and formed to cover the surrounding of the window portion 240.

The guide portion 250 may include a guide sheet 251, for example. The guide sheet 251 is configured to diffuse light entered to part of one surface thereof and emit light to a broader region on the other surface thereof. For such an example, the guide sheet may be a diffusion sheet or diffusion film.

Figure 4B:
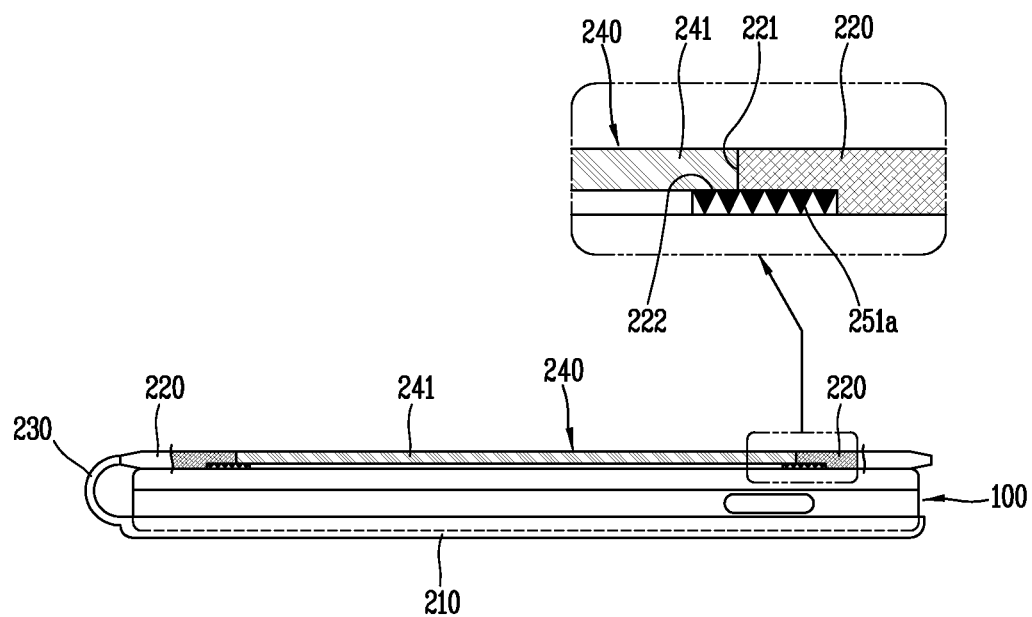
FIG. 4B is a view illustrating a guide sheet in FIG. 4A according to a modified example.

The guide sheet is formed with a diffusion layer by coating on one surface of the base film, and configured to diffuse light through this, however, for another example, as illustrated in FIG. 4B, a protrusion may be formed within the guide sheet 251a.

Referring to FIGS. 3 and 4A again, the guide sheet 251 is configured to cover any one part of the window portion 240, and a through hole 252 corresponding to window portion 240 is formed on the guide sheet 251. For example, the center of the through hole 252 corresponds to the center of the window 241, and the size of the through hole 252 is formed to be less than that of the window 241, thereby allowing an overlapping portion overlapped with the window 241 on the guide sheet 251 to form a ring-shaped band. Due to such a structure, one surface of the guide sheet 251 may be the mounting surface 222.

In this case, the window portion 240 may include a coupling portion (not shown) for coupling the mounting surface 222 to the window 241. For such an example, the coupling portion (not shown) may be an adhesive or double-sided tape coated only on part of the mounting surface 222. For another example, it may be possible to coat a light transmitting adhesive on the entire surface of the mounting surface 222.

According to the drawing, a recess portion 223 recessed along the thickness direction thereof to accommodate the guide sheet 251 is formed on the cover front surface portion 220.

The recess portion 223 may be formed on the other surface (inner surface, an opposite surface to one surface of the cover front surface portion 220) of the cover front surface portion 220. In this case, the window hole 221 may be formed at the bottom of the recess portion 223. The guide sheet 251 may be configured with a thickness corresponding to the depth of the recess portion 223, and through this, the guide sheet 251 may be disposed on the same plane as that of the other surface of the cover front surface portion 220.

In this case, when an event occurs, the controller of the terminal may turn on a region covered by the guide sheet portion within the display unit to guide light displayed on the display unit by the guide portion.

Furthermore, the terminal is configured to sense the opening or closing of the display unit 151 by the cover 200. For an example, a magnet (M) is mounted on the cover 200 and a sensor corresponding to the magnet may be mounted on the terminal. The sensor may be a hole IC for sensing a magnetic field, for example. However, the present disclosure may not be necessarily limited to this, and for example, may recognize the covering of the cover using a proximity sensor, or recognize the covering of the cover using a luminance sensor. In this manner, allowing the terminal to sense the opening or closing of the display unit 151 by the cover may be similarly applicable to modified examples or other embodiments of the present disclosure.

In this manner, when an event occurs in a covered configuration, the display unit 151 is activated to turn on the covered region. In this case, it may be possible to activate the display unit as a whole, and otherwise, to activate part thereof (for example, a portion corresponding to a region of the guide sheet) and deactivate the remaining region thereof. Due to the activation, light output from the display unit is entered to the guide sheet 251, and the incident light is diffused to the overlapping portion and emitted to the outside. The light emitted to the outside is notification light and the overlapping portion is a ring-shaped band, and thus the notification light forms a ring-shaped band. Light may be output for a predetermined period of time with the maximum amount of light, and the user may view ring-shaped light to recognize whether or not an event has occurred. In this case, the intensity of light may be adjusted by the user.

The foregoing pattern generation mechanism associated with the present disclosure may be configured with a structure according to another example, and the other embodiments or modified examples will be described below. According to the modified examples and embodiments which will be described below, the same or similar reference numerals are designated to the same or similar configurations, and the description thereof will be substituted by the earlier description.

Figure 5:
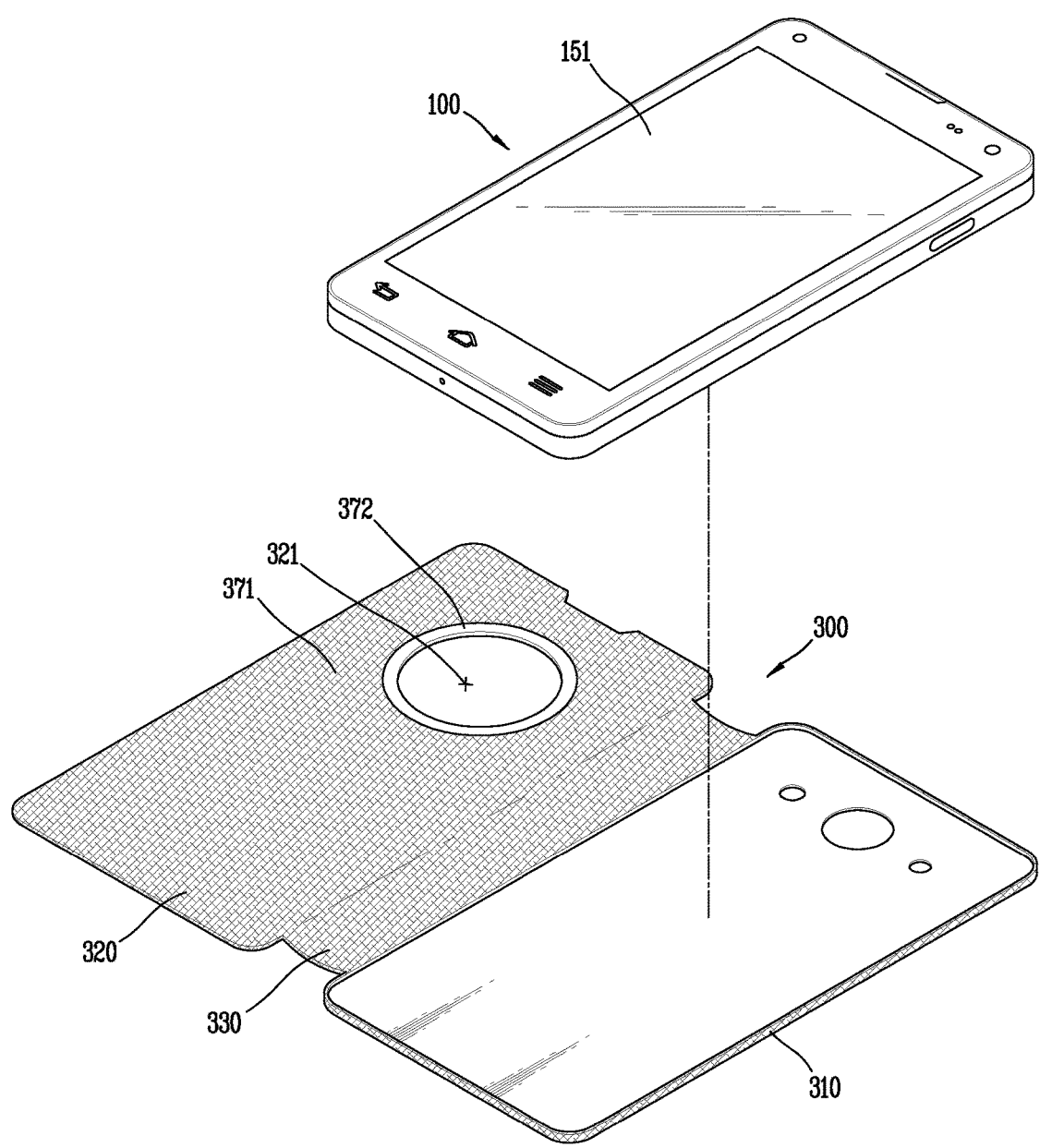
FIG. 5 is an exploded view illustrating a cover according to another embodiment of the present disclosure.
Figure 6:
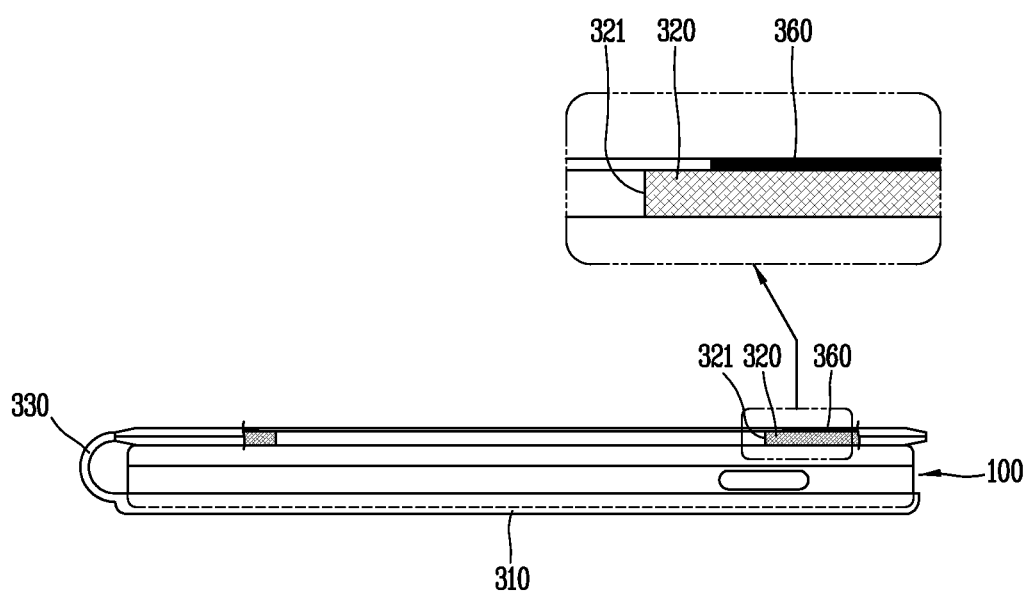
FIG. 6 is a cross-sectional view illustrating a cover in a state that the terminal is closed by the cover in FIG. 5.

FIG. 5 is an exploded view illustrating a cover 300 according to another embodiment of the present disclosure, and FIG. 6 is a cross-sectional view illustrating a cover in a state that the terminal is closed by the cover in FIG. 5.

Referring to FIGS. 5 and 6, the cover 300 may include a cover front surface portion 320 and a covering layer 360.

The cover front surface portion 320 is formed of a light transmitting material, thereby transmitting light output from the display unit. Furthermore, the cover front surface portion 320 is formed of a material in which the incident light is diffused therewithin when the light is entered. For such an example, the cover front surface portion 320 may be formed of a material such as transparent silicon, transparent urethane, transparent synthetic resin, and the like.

A window hole 321 is formed on the cover front surface portion 320. However, according to the present example, the window hole 321 may be a through hole that is not covered by the window. The cover 300 may expose the visual information of the display unit 151 to the outside while covering the display unit 151.

Referring to FIGS. 5 and 6, a pattern generation mechanism according to the present example may be implemented by a structure of the covering layer 360.

The covering layer 360 is made of a non-transparent material, and formed on an outer surface of the cover front surface portion 320. The covering layer 360 may be a printed layer formed by printing, a deposited layer formed by deposition, or the like.

The covering layer 360 is disposed to cover the cover front surface portion 320 and thus a non-transparent region 371 is formed on an outer surface of the cover 300. In this case, the covering layer 360 is configured not to cover an edge of the window hole 321 in order to form a transparent region 372 along the edge of the window hole 321. In this case, both the non-transparent region 371 and transparent region 372 are a diffusion region for diffusing light, and light is emitted from the transparent region 372 to the outside. In other words, the transparent region 372 has a ring-shaped band shape formed along the edge of the window hole 321, and accordingly, the transparent region 372 may be referred to as a decoration portion.

According to the present example, when an event occurs in the terminal, the display unit 151 is activated, and light output from the display unit is entered to a transparent body of the cover front surface portion, and the incident light is diffused from the transparent body and emitted to the outside from the transparent region 372. The light emitted to the outside will be notification light, and since the transparent region 372 is a ring-shaped band, the notification light forms a ring-shaped band.

Figure 7:
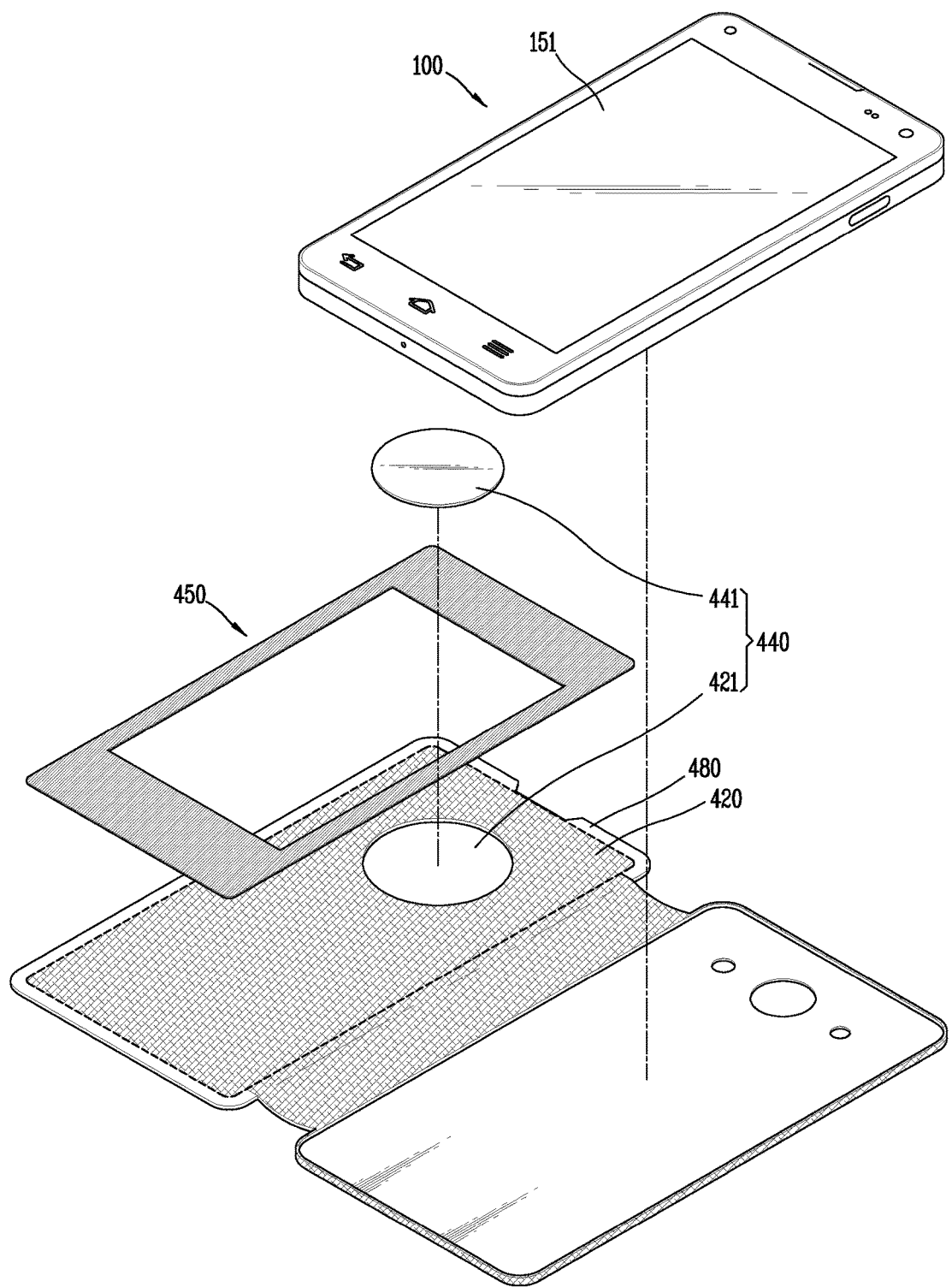
FIG. 7 is an exploded view illustrating a cover according to still another embodiment of the present disclosure.
Figure 8:
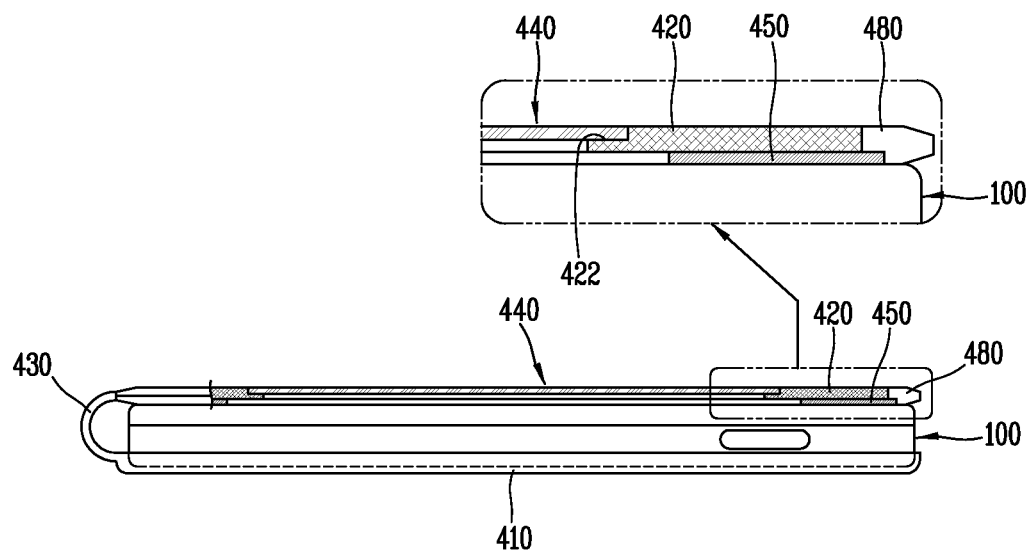
FIG. 8 is a cross-sectional view illustrating a cover in a state that the terminal is closed by the cover in FIG. 7.

FIG. 7 is an exploded view illustrating a cover according to still another embodiment of the present disclosure, and FIG. 8 is a cross-sectional view illustrating a cover in a state that the terminal is closed by the cover in FIG. 7.

Referring to FIGS. 7 and 8, a window hole 421 is formed on the cover front surface portion 420, and the window portion 440 may include a window 441 formed to cover the window hole 421. The window 441 may include an outer surface formed on the same plane as that of one surface (outer surface: a surface exposed to the outside in a covered configuration) of the cover front surface portion 420, and made of a material such as glass, transparent silicon, transparent urethane, transparent synthetic resin, and the like.

A mounting surface 422 on which the window 441 is mounted is provided in the cover front surface portion 420, and the mounting surface 422 may be a surface having a height difference with respect to an outer surface of the cover front surface portion, and formed to surround the window hole 421.

According to the drawing of FIGS. 7 and 8, the cover 400 may include an edge region 480 to output light output from the display unit 151 of the terminal to the outside. To this end, the edge region 480 may be formed of a light transmitting material. The edge region 480 will be a transparent region, and the remaining region excluding the window portion 440 and edge region 480 will be a non-transparent region.

Furthermore, the cover 400 may include a guide portion 450 at least part of which is exposed while covering the display unit 151 to guide light output from the display unit 151 to the edge region 480.

The guide portion 450 is configured to diffuse light entered to part thereof to emit the light from another part thereof. For such an example, the guide portion 450 may include a diffusion sheet or diffusion film.

More specifically, the guide portion 450 is formed to expose at least part thereof on an inner surface of the cover front surface portion 420, and the exposed portion is configured to cover the display unit 151 in the covered configuration. Furthermore, the guide portion 450 is formed such that at least part thereof is overlapped with the edge region 480. Due to the structure, the guide portion 450 guides light output from the display unit 151 to the edge region 480.

As illustrated in the present example, the edge region 480 of the cover front surface portion 420 is a transparent material, and the remaining portion thereof may be formed of a non-transparent material. In this case, a pattern generation mechanism may be implemented by a structure in which the diffusion sheet covers the display unit 151 along with the edge region 480. However, the present disclosure may not be necessarily limited to this, and for example, it may be also possible to have a structure in which the diffusion sheet is protruded from an edge of the cover front surface portion 420 and partially exposed to the outside to generate light from the protruded portion. For another example, the cover front surface portion 420 has a transparent material, but a covering layer may be formed on one surface of the cover front surface portion excluding the edge region.

Figure 9A:
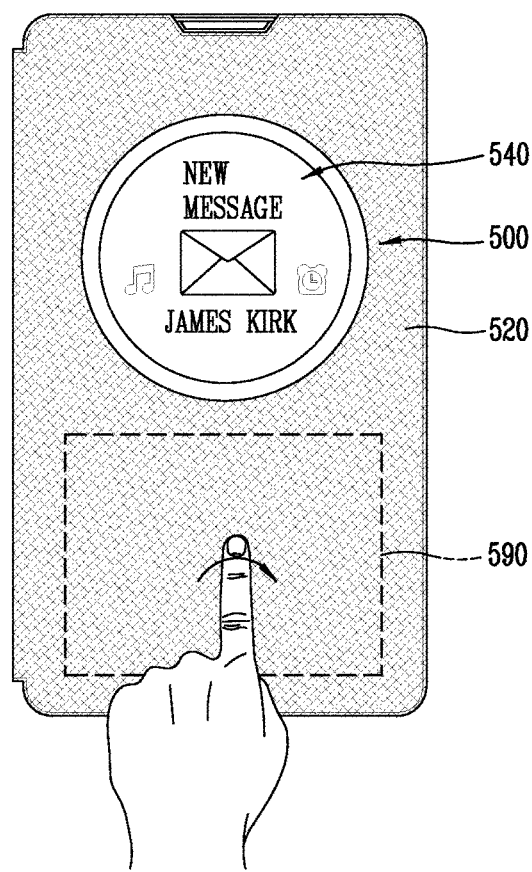
FIGS. 9A and 9B are conceptual views illustrating according to another embodiment of the present disclosure.
Figure 9B:
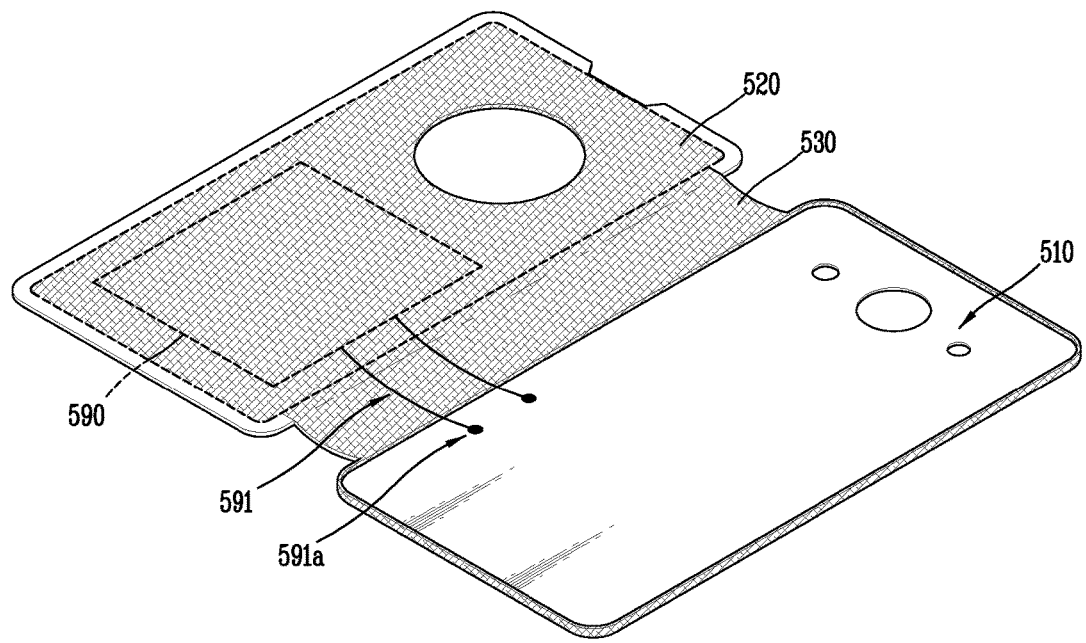

Furthermore, the cover of the present disclosure is configured to sense a user's touch input in response to the pattern generation. Hereinafter, the foregoing structure will be described. FIGS. 9A and 9B are conceptual views illustrating according to another embodiment of the present disclosure.

According to the drawing, the cover 500 may include a window portion 540 and a touch sensing portion 590. More specifically, the window portion 540 is a region for exposing the visual information of the display unit to the outside, and the touch sensing portion 590 may be a region for sensing the user's touch input.

For an example, the cover front surface portion 520 of the cover 500 may be formed of a different material according to the region thereof to form the touch sensing portion 590. For example, the touch sensing portion 590 may be formed of a conductive material to sense a touch input to the touch sensing portion 590 on the touch screen of the terminal. In this case, the other portion of the cover front surface portion 520 may be formed of a non-conductive material.

For another example, the cover front surface portion 520 has the same material, but the touch sensing portion 590 may include a conductive pigment.

For still another example, it may be also possible to have a structure in which the cover front surface portion 520 has the same material, but a conductive material is coated on the touch sensing portion 590, and the touch sensing portion is formed with an elastic material to be brought into contact with the display unit.

For yet still another example, the cover front surface portion 520 may be configured to have a different thickness from the other portion thereof on the touch sensing portion 590. For example, the touch sensing portion 590 may be configured to have a low thickness than that of the other portion. To this end, the touch sensing portion 590 may be formed to be recessed on an outer surface of the cover front surface portion 520.

Furthermore, referring to FIG. 9B, the touch sensing portion 590 may include an additional touch sensor (not shown) mounted on the cover front surface portion 520. In this case, when the cover is mounted on the terminal, a wiring line 591 for electrically connecting the touch sensor (not shown) to the controller of the terminal may be provided therein.

The wiring line 591 may be extended from the touch sensor of the cover front surface portion 520 and connected to the cover rear surface portion through a connecting portion. A connecting terminal 591a connected to the wiring line 591 is provided in the cover rear surface portion, and a connecting terminal (not shown) brought into contact with the connecting terminal 591a during the mounting of the cover rear surface portion is disposed on the terminal body.

The foregoing terminal body and cover may provide a new user interface using the opening or closing of the cover, touch input and pattern generation and the like to the user. Hereinafter, the user interfaces will be described in more detail.

A mobile terminal having any one of the foregoing structures of FIGS. 3, 5, 7, 9A and 9B is configured to diffuse light generated by the activation of the display unit 151 and output notification light to the outside when an event occurs while the display unit 151 is deactivated, at least part of the display unit 151 is activated. Here, at least part of the activated display unit may be a window region, a region disposed with the guide portion or the like, for example. The notification light may be emitted to the outside through the guide sheet including a diffusion material provided in the guide portion 250 formed to cover the surrounding of the window portion 240. Here, the at least part thereof may be a region corresponding to a place located with a window disposed at the foregoing cover or an edge region of the window.

For the control operation, a mechanism for converging light output from the is display unit 151 to generate a specific pattern is provided in the cover 200, and the description of the pattern generation mechanism will be substituted by the earlier description of FIGS. 2A, 2B, 4A and 4B.

Figure 11A:
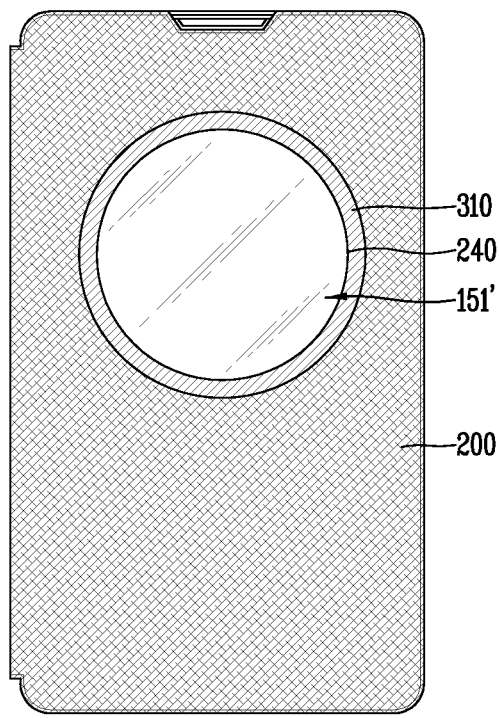
FIGS. 11A and 11B are conceptual views for explaining FIG. 10.
Figure 11A:
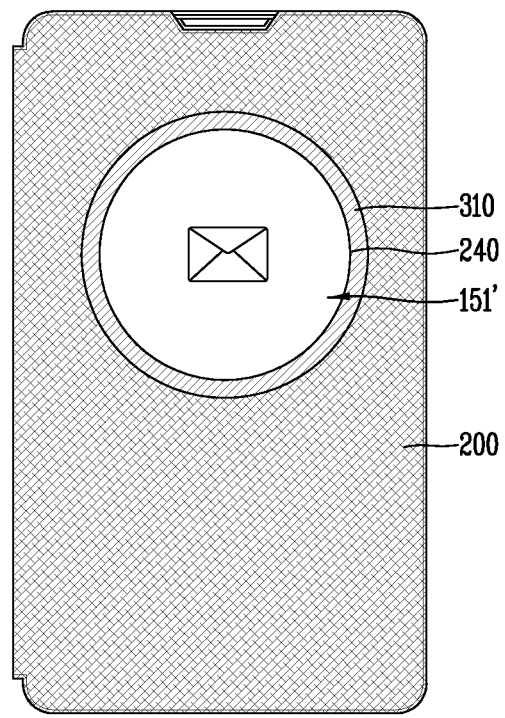
Figure 11A:
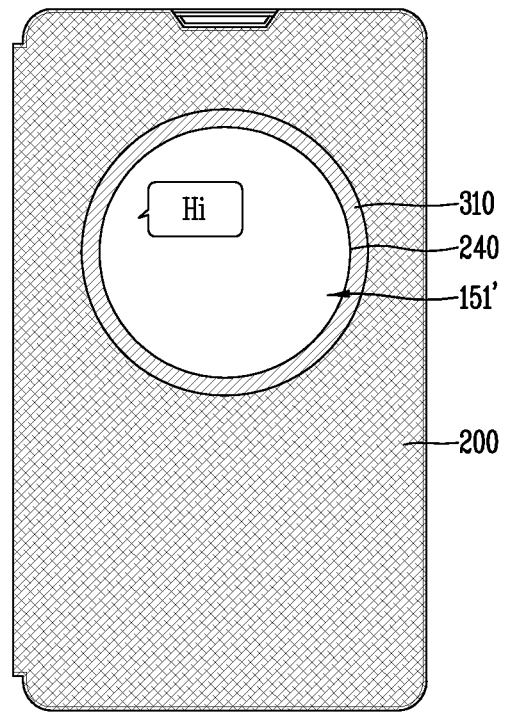
Figure 11B:
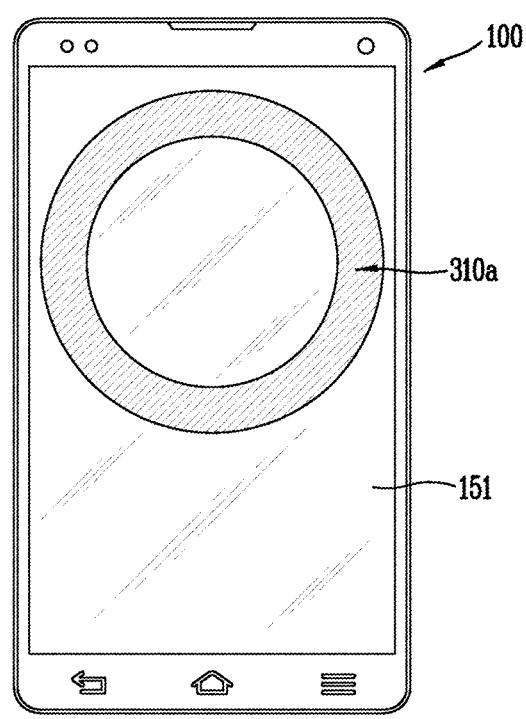

Hereinafter, when an event occurs on the mobile terminal, a method of outputting the information using the pattern generation mechanism will be described in more detail with reference to the accompanying drawings. FIG. 10 is a flow char for explaining a method of providing a user interface notifying the occurrence of an event using a cover in a mobile terminal according to an embodiment of the present disclosure, and FIGS. 11A and 11B are conceptual views for explaining FIG. 10.

When an event occurs in a mobile terminal according to present disclosure (S710), the controller 180 senses whether or not the display unit is hidden by the cover (S720).

Here, "event" denotes the occurrence of an event having an effect on the operation of at least one application installed on the mobile terminal, the occurrence of an event changing information stored in a database (or data file) associated with the at least one application, or the occurrence of an event transmitting or sending data to an external terminal or external network (or external server) through the at least one application. For example, "received a call", "received a message" or the like may be an example of the event.

Furthermore, the "event" may occur in association with the operation of the mobile terminal or the status of the mobile terminal in addition to occurring in association with an application installed on the mobile terminal. For example, when the battery charge amount of the mobile terminal is less than a predetermined reference value, the mobile terminal may generate an event to notify information on the battery amount. For an other example, even when the wireless communication unit 110 of the mobile terminal gets out of or into a wireless communication network, an event may occur. In this manner, an event may occur in various cases associated with the driving, operation and status of the mobile terminal, and according to the present specification, the type of an event is not restricted to the foregoing examples, and it should be understood that "an event has occurred" in case where there exists or is generated or received information to be notified to the user from the mobile terminal.

On the other hand, whether or not the display unit is hidden by the cover 200 when an event occurs may be sensed in various ways and as an example, a magnet may be mounted on the cover 200 and a sensor corresponding to the magnet may be mounted on the mobile terminal. Here, the sensor may be a hole IC for sensing a magnetic field. Accordingly, the controller 180 may sense whether or not the display unit 151 is closed by the cover 200 based on a signal sensed by the sensor corresponding to the magnet. For another example, the mobile terminal may recognize whether or not the cover 200 is covered by the display unit 151 using a proximity sensor or luminance sensor.

On the other hand, as in the steps of S710 and 720, if the display unit is covered by the cover when an event occurs on the mobile terminal as a result of the sensing, then notification light notifying that an event has occurred is output in a boundary region of the window portion provided in the cover (S730).

More specifically, the controller 180 may turn on a display region of the display unit corresponding to the boundary region of the window portion to generate light. The generated light is guided by a diffusion sheet (or diffusion material) included in the guide sheet portion and emitted to the outside from the boundary region of the window portion. Here, notification light may be implemented by the guide sheet 251 included in the guide portion 250, and configured to diffuse light entered to part of one surface thereof and emit light to a broader region on the other surface thereof as illustrated in FIG. 3. Here, the guide sheet may be a diffusion sheet or diffusion film.

On the other hand, the notification light may be formed in the boundary region of window portion by a diffusion member.

According to the present disclosure, a pattern generation mechanism is implemented in coupling to a cover having the foregoing structure, and when an event occurs while the display unit 151 is closed by the cover 200, the display unit 151 is activated to turn on a region covered by the cover 200. Then, light output from the display unit 151 is entered to the guide sheet 251, and the incident light is diffused to the overlapping portion and emitted to the outside. In other words, light emitted to the outside will be notification light having a ring shape in the boundary region of window portion 240.

On the other hand, the process of outputting event information corresponding to the occurred event may be carried out based on a predetermined type of touch applied to one region 151' of the display unit (S740).

Here, event information may be brief information including at least one of a name of the application that has generated an event and a graphic image representing the application, detailed information including the content of the generated event, or the like. Meanwhile, it may be also possible to output event information from one region 151' of the display unit while at the same time outputting notification light 310.

On the other hand, during the step of S720, while the display unit 151 is not hidden by the cover, event information may be immediately displayed on the display unit 151. In this case, the event information may be also output through a pop-up window. Moreover, the method of outputting the event information may be varied in various ways according to the setting of the mobile terminal.

More specifically, referring to the accompanying drawing, when the display unit 151 is closed by the cover 200 when an event occurs on the mobile terminal as illustrated in FIG. 11A(a), notification light 310 is output in the boundary region of window portion 240. In other words, if a configuration in which the display unit 151 is closed by the cover 200 is sensed when an event occurs on the mobile terminal, then the controller 180 activates at least one region of the display unit 151 to output the notification light 310 in the boundary region of window portion 240. Accordingly, the user may recognize that an event has occurred on the mobile terminal through the notification light 310 even when the display unit 151 is closed by the cover 200.

On the other hand, in a mobile terminal according to the present disclosure, when an event occurs on the mobile terminal while the display unit 151 is closed by the cover 200, event information associated with the occurred event may be output through one region 151' of the display unit exposed to the outside by the window portion 240 as illustrated in FIG. 11A(b) in addition to a method of exhibiting the notification light 310 in the boundary region of window portion 240 as described in FIG. 11A(a). Here, event information may be brief information including at least one of a name of the application that has generated an event and a graphic image representing the application, detailed information including the content of the generated event, or the like. Meanwhile, it may be also possible to output event information from one region 151' of the display unit while at the same time outputting notification light 310.

Furthermore, on the contrary, the event information may be output based on a predetermined type of touch applied to one region 151' of the display unit while the output of notification light is maintained subsequent to outputting the notification light. Furthermore, the event information may be output based on a predetermined type of touch applied to one region 151' of the display unit after the output of notification light is terminated. In other words, the event information may be output at various time points.

Here, a predetermined type of touch may be a slide touch extended from any one position to another position, a tap touch hitting one region 151' of the display unit at least one or more times, and the like.

Furthermore, according to the present disclosure, the controller 180 may control the display unit 151 to illuminate notification light 310 while at the same time displaying event information or control the display of the event information and the output of the notification light 310 in an independent manner. Meanwhile, the output of the notification light 310 may be terminated subsequent to displaying it only for a predetermined period of time. Furthermore, if it is prior to checking the occurred event, the output thereof may be terminated subsequent to displaying the notification light 310 at reference time intervals or displaying it for the predetermined period of time, or the output thereof may be continuously maintained until the event is checked.

Furthermore, though not shown in the drawing, when event information corresponding to brief information is displayed in one region 151' of the display unit, it may be possible to further output event information corresponding to detailed information based on a touch to one region 151' of the display unit.

On the other hand, as illustrated in FIGS. 11A and 11B, in order to output notification light 310 guided by the guide sheet 251 on the boundary of the window portion 240, the controller 180 may activate a region 310a (refer to FIG. 11B) overlapped with the guide sheet 251 within a display region of the display unit 151 covered by the window portion 240 to emit light. Here, the activated display region may not be necessarily overlapped with the guide sheet 251 in an accurate manner.

In other words, the display unit 151 may be divided into an activated region 310a corresponding to a portion overlapped with the guide sheet 251 and a deactivated region corresponding to a portion that is not overlapped with the guide sheet 251.

On the other hand, when the display unit 151 is hidden by the cover 200, information on a light emitting region for illuminating light to output notification light 310 in the boundary region of window portion 240 within a display region of the display unit 151 may be previously stored in the memory 170 or the like. Information on the light emitting region may be information on which locations provided with the window portion 240, guide sheet 251 and the like on the cover 200 are taken into consideration. Accordingly, when an event occurs on the mobile terminal while the display unit 151 is closed by the cover 200, the controller 180 may illuminate the light emitting region on the basis of information on the light emitting region, thereby forming notification light 310 in the boundary region of window portion 240.

On the other hand, the controller may recognize the type of a cover currently mounted on the terminal based on the location of a magnet mounted on the cover 200. Information on the recognized cover may previously exist in the memory 170, and the information on the cover may include the location information and shape information of a window disposed on the cover. The controller 180 may determine which region of the display unit is to be illuminated to form the notification light 310 in consideration of the information on the cover. The window portion may have various shapes, and may be formed with a shape such as a circle, a rectangle, a triangle, and the like.

On the other hand, the controller 180 may recognize a cover mounted with the magnet using a hole IC for sensing a magnetic field.

Figure 12A:
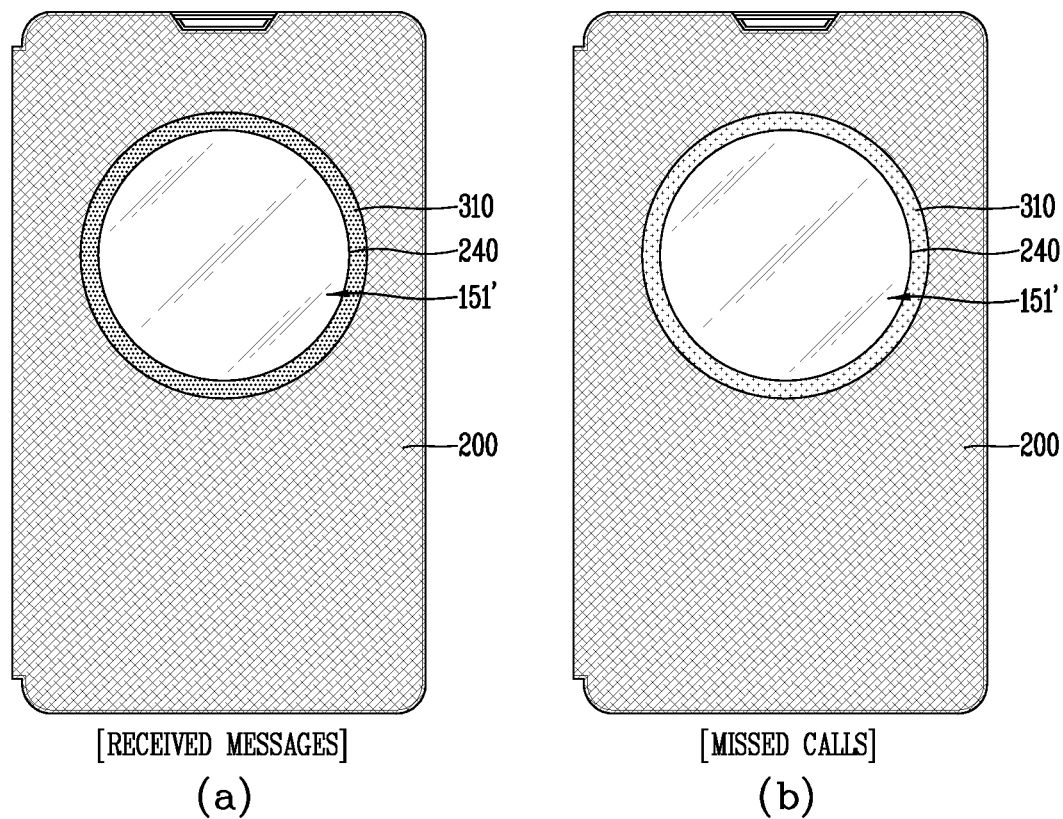
FIGS. 12A, 12B and 12C are conceptual views for explaining a method of notifying the occurrence of an event in a mobile terminal according to the present disclosure.
Figure 12B:
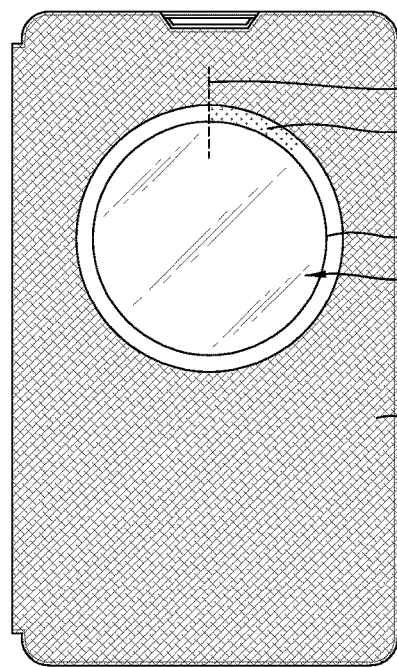
Figure 12B:
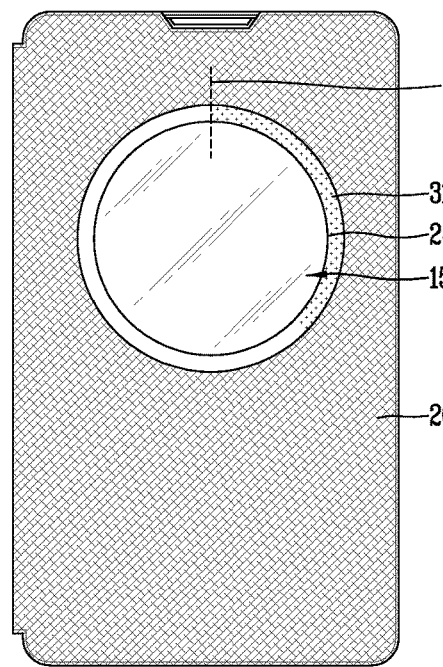
Figure 12B:
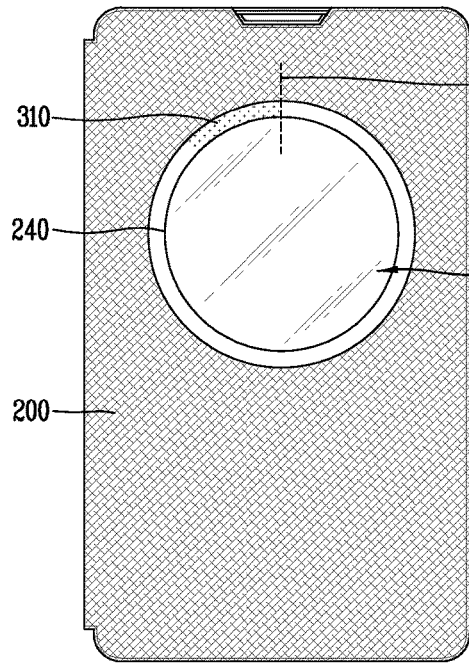
Figure 12B:
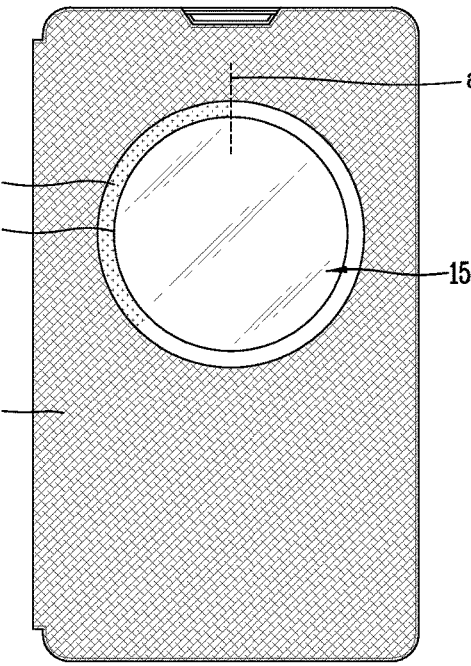
Figure 12C:
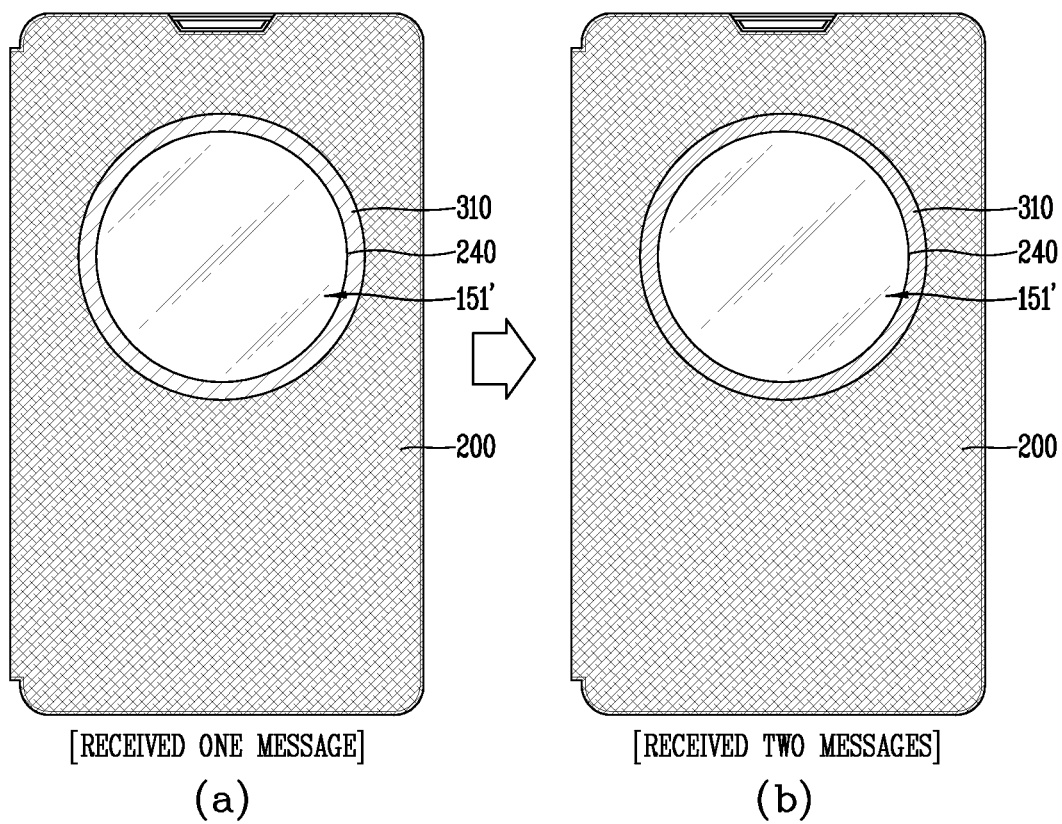

On the other hand, in a mobile terminal according to the present disclosure, notification light formed on the boundary of the window portion may be controlled in various ways according to the type, number or the like of events, thereby providing more detailed information on the events. Hereinafter, it will be described in more detail with reference to the accompanying drawings. FIGS. 12A,12B and 12C are conceptual views for explaining a method of notifying the occurrence of an event in a mobile terminal according to the present disclosure.

The output method (for example, color or turn-on method, etc.) of notification light 310 output from the boundary region of the window portion 240 may be varied according to the color or turn-on method of light output from the display unit 151. Accordingly, the controller 180 may control the color or turn-on method output from the display unit 151 or the brightness or intensity of color output from the display unit 151 according to the type of event or the number of occurred events, thereby controlling more detailed information on the event to the user.

For an example, as illustrated in FIGS. 12A(a) and 12A(b), the controller 180 may control the display unit to vary the color of notification light output from the boundary of the window portion according to the type of the occurred event. In other words, the controller 180 my control the display unit 151 to output notification light with a unique color for each event. For example, the controller 180 may control the display unit 151 to form notification light with a first color (for example, green) when a first type of event (for example, message receive event) has occurred as illustrated in FIG. 12A(a), and control the display unit 151 to form notification light with a second color (for example, red) which is different from the first color when a second type of event (for example, missed call receive event) which is different from the first type has occurred as illustrated in FIG. 12A(b). Meanwhile, the unique color for each event may be determined based on the user's selection. For example, according to the present disclosure, the user may select which color of notification light is to be formed for which type of event. Accordingly, though not shown in the drawing, according to the present disclosure, a setting screen for selecting a unique color for each event may be provided. Through this, the user can easily recognize which type of event has occurred only with the color of notification light.

Furthermore, according to the present disclosure, even though the content of the occurred event is not displayed, it may be possible to provide information on the occurred event to the user who has recognized the unique color based on the event. As a result, the user can receive event information through the color recognized only by him or her without exposing the information of a currently occurred event to a third party while keeping his or her privacy.

For another example, a mobile terminal according to the present disclosure may control the turn-on method of light output from the display unit 151 to vary the turn-on method of notification light formed on the boundary of the window portion according to the type of the occurred event. As illustrated in FIG. 12, the window portion 240 is formed of a circular shape, and an image sequentially turned on along an outer circumference of the window portion 240 is formed on the display unit 151, and such an image is formed when turning on the display unit 151. The controller 180 may provide information on an event using an image sequentially turned on. For example, when a first type of event (for example, message receive event) has occurred, the controller 180 may sequentially turn on light in a first direction on the basis of a virtual reference axis (a) as illustrated in FIGS. 12B(a) and 12B(b). Furthermore, when a second type of event (for example, missed call receive event) has occurred, the controller 180 may sequentially turn on (or illuminate) light in a second direction which is different from the first direction on the basis of a virtual reference axis (a) as illustrated in FIGS. 12B(c) and 12B(d). As a result, the user can more easily know the type of the occurred event according to the direction of forming notification light. Furthermore, when a first type of event (for example, message receive event) has occurred, the controller 180 may turn on light on the display unit 151 to form notification light in the boundary region of window, and then turn on the display unit 151 to form notification light notifying the second type of event in an inner region of the notification light output in the boundary region. In this manner, the notification light may be sequentially formed in an inner region from the outermost region of the window portion.

On the other hand, even in the above case, the user can select a direction in which notification light is sequentially formed according to the type of event as illustrated in FIG. 12A. Moreover, though not shown in the drawing, according to the present disclosure, a time point at which the turn-on of notification light is started as well as a direction in which notification light is formed may be varied according to the type of event. In this manner, a time point at which the turn-on of notification light is started can be selected from the user.

For another example, in a mobile terminal according to the present disclosure, a speed for turning on notification light may vary for each event, thereby controlling more detailed information on the event. More specifically, the controller 180 may control a speed at which notification light is turned on (for example, a turn-on speed at which an image for forming the notification light is displayed on the display unit) with a first speed when the occurred event is a first type of event (for example, an event associated with a first application), and control a speed at which notification light is turned on (for example, a turn-on speed at which an image for forming the notification light is displayed on the display unit) with a second speed which is different from the first speed when the occurred event is a second type of event (for example, an event associated with a second application) which is different from the first type of event.

In the above examples, a method of varying the color, turn-on direction and turn-on speed of notification light according to the type of event has been described in an independent manner, but at least two or more combinations of the above examples may be implemented according to the present disclosure. In other words, the color of notification light may be varied according to the type of event and moreover, the turn-on direction thereof may be also varied.

On the other hand, in a mobile terminal according to the present disclosure, when a plurality of events are received for the same type of events (for example, when a plurality of messages are received in a message receive event), the intensity (or brightness) of notification light may be varied to provide more detailed information on the event. For example, as illustrated in FIG. 12C(a), the controller 180 may output first darkness of light on the display unit 151 when one message is received, and output second darkness of light which is darker than the first darkness on the display unit 151 when two messages are received. Through this, the notification light 310 with a different darkness may be formed in the boundary region of window portion 240. The controller 180 may control the amount of current flowing through the display unit 151, thereby allowing the brightness of output light to be varied.

Furthermore, when the occurred event is associated with the status of a mobile terminal, the controller 180 may control the display unit 151 such that the intensity (or brightness) of notification light is varied based on the status level of the mobile terminal (for example, occurred event: an event associated with battery charge, the status level of the mobile terminal: battery charge amount).

Though examples of outputting notification light have been illustrated for the examples described along with FIGS. 12A, 12B and 12C, the present disclosure may not be necessarily limited to the foregoing illustrations, and it may be also possible to output event information along with notification light as described in FIG. 11A(b).

Furthermore, on the contrary, the event information may be output based on a predetermined type of touch applied to one region 151' of the display unit while maintaining the output of notification light subsequent to outputting the notification light. Furthermore, the event information may be output based on a predetermined type of touch applied to one region 151' of the display unit subsequent to terminating the notification light. In other words, the event information may be output at various time points.

Hereinafter, a method of more effectively notifying the existence of a plurality of events to the user using notification light when there exist a plurality of different types of unchecked events at a time point at which the notification light is displayed will be described in more detail with reference to the accompanying drawings. FIGS. 13A, 13B, 14A, 14B, 14C and 14D are conceptual views for explaining a method of notifying the occurrence of a plurality of events in a mobile terminal according to the present disclosure. In the following examples, a pattern generation mechanism for outputting notification light follows the description of FIGS. 10, 11A, 11B, 12A, 12B and 12C.

According to the present disclosure, when there exist a plurality of notification target events to be guided through notification light, the notification light is output with a plurality of colors, thereby notifying the user that there are a plurality of notification target events. Here, notification target event may denote a currently occurred event and an event that has occurred prior to a time point at which notification light is output in response to the currently occurred event but unchecked. In this manner, when there exist a plurality of notification target events, the controller 180 may partition an outer circumference of the window portion 240 into a plurality of regions based on the number of the plurality of events. Furthermore, the controller 180 may control the display unit such that notification light with different colors are output around the plurality of partitioned regions.

Figure 13A:
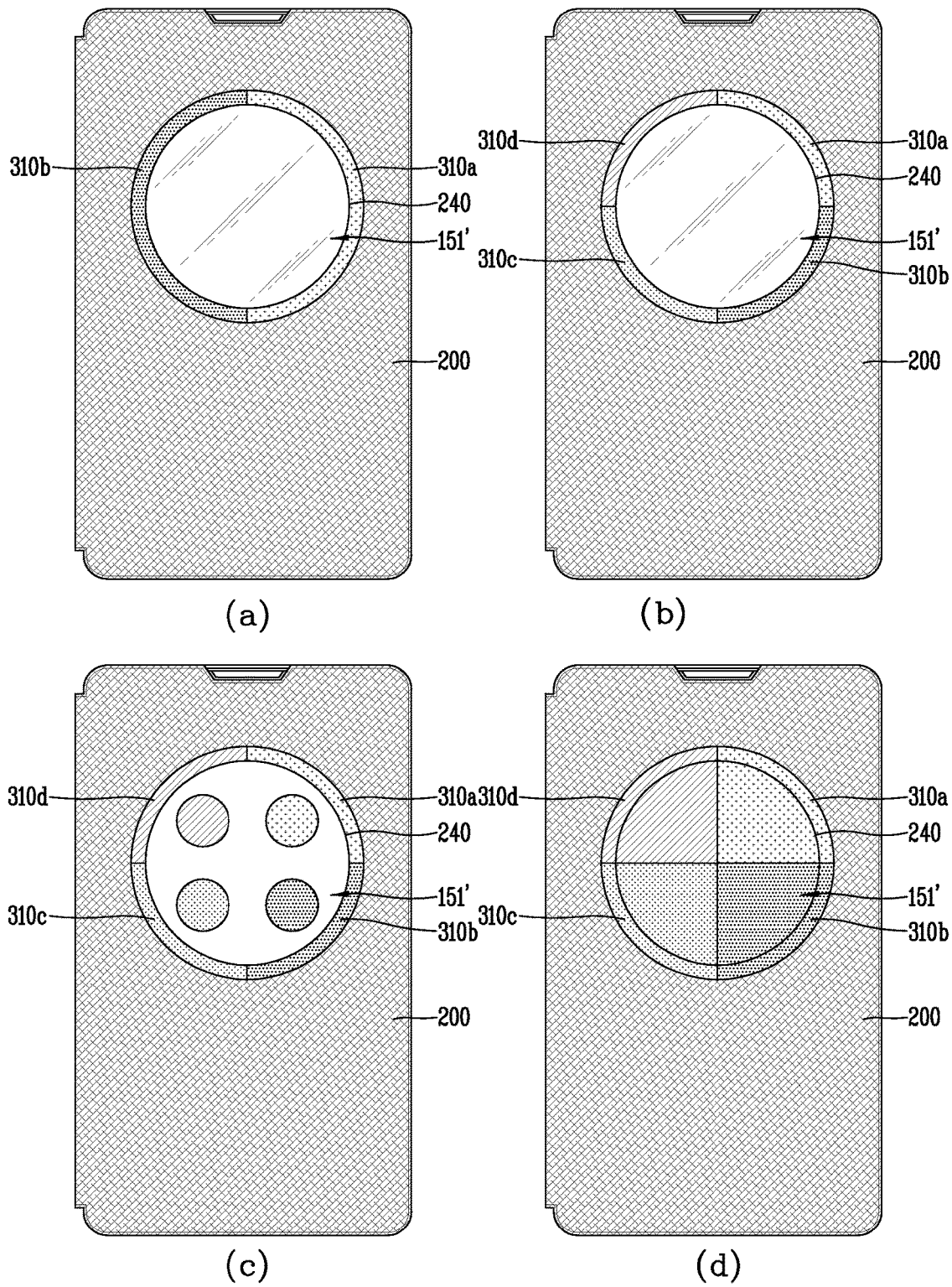
FIGS. 13A, 13B, 14A, 14B, 14C and 14D are conceptual views for explaining a method of notifying the occurrence of a plurality of events in a mobile terminal according to the present disclosure.

For example, as illustrated in FIG. 13A(a), when there exist two notification target events, the controller 180 may control the display unit 151 such that notification light 310*a*, 310*b* are formed with two different colors to notify that there exist two notification target events. At this time, images corresponding to two colors are displayed on the display unit 151 to form notification light corresponding to the images in the boundary region of window portion 240.

On the other hand, in a state that the notification light 310*a*, 310*b* are formed with two different colors, when a touch started from one position of one region 151' of the display unit corresponding to the window portion 240 is dragged (or slid) in a direction in which either one of the notification light 310*a*, 310*b* is formed with the two different colors, the event information of an event corresponding to the either one of notification light may be output. Here, one position from which the drag (or slide) touch is started may be a central portion of the one region 151' of the display unit.

For another example, as illustrated in FIG. 13A(b), where there exist four notification target events, the controller 180 may control the display unit 151 such that notification light 310*a*, 310*b*, 310*c*, 310*d* are formed with four different color to notify that there exist four notification target events. At this time, images corresponding to four colors may be displayed on the display unit 151.

Here, the different colors may be determined based on the plurality of types of events, and information on the different colors may be stored and existed in the memory in connection with the information of an application corresponding to the plurality of events, respectively.

In other words, the controller 180 may control the display unit 151 to illuminate notification light with a unique color for each event. A unique color for each event may be determined based on the user's selection. For example, according to the present disclosure, the user may select which color of notification light is to be formed for which type of event. Accordingly, though not shown in the drawing, according to the present disclosure, a setting screen for selecting a unique color for each event may be provided. Through this, the user can easily recognize which type of event has occurred only with the color of notification light.

In this manner, according to the present disclosure, where there exist a plurality of notification target events, notification light may be formed with a plurality of colors corresponding to the number of notification target events to more effectively notify it to the user. Accordingly, the user may know at a glance which number of events has occurred only with the number of colors of notification light, and which event has occurred only with a unique color corresponding to the event.

On the other hand, a mobile terminal according to the present disclosure may additionally a graphic object in a region corresponding to a region in which notification light is output as illustrated in FIGS. 13A(c) and 13A(d) in addition to a method of displaying a graphic image formed with notification light on the display unit 151. More specifically, the controller 180 may display graphic objects displayed with the same color as that of the notification light in one region 151' of the display unit as illustrated in FIG. 13A(c). Moreover, the controller 180 may evenly divide one region 151' of the display unit into regions corresponding to the number of the occurred events, thereby displaying a graphic image with the same color as that of the notification light formed in a region adjacent to each region.

Moreover, in this case, when a central portion of the region is selected, the controller 180 may output all the information of a plurality of occurred events, thereby showing the event information in a collective manner. Furthermore, when each region thereof is individually selected, the controller 180 may output only event information corresponding to the selected individual region in one region 151' of the display unit.

Figure 13B:
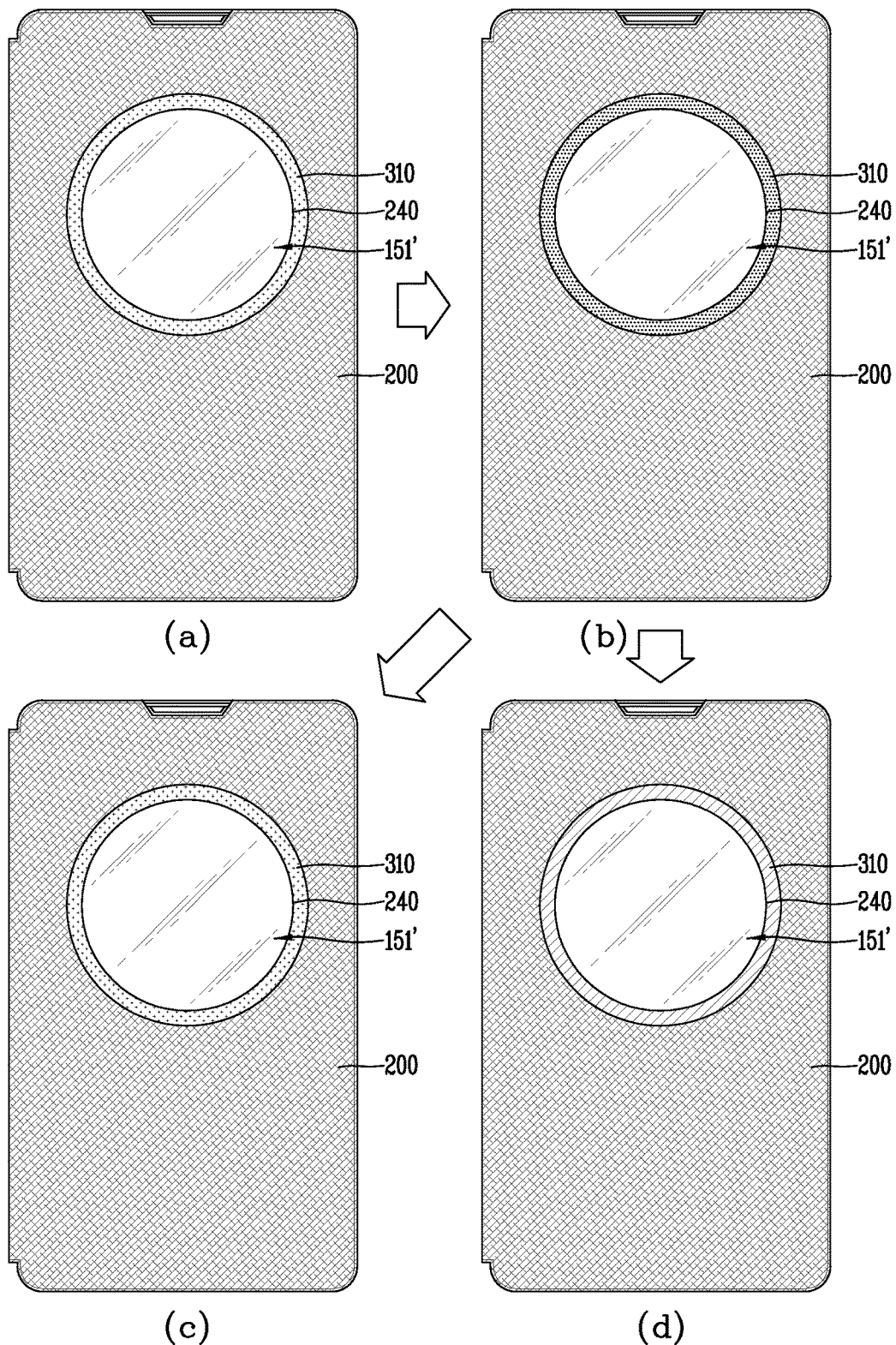

For another example, according to the present disclosure, when there exist a plurality of notification target events, it may be possible to sequentially output notification light relevant to a unique color for each event. For example, when there exist two notification target events relevant to a first and a second type of events, the controller 180 may control the display unit 151 to form a first color of notification light corresponding to a first type of event (for example, an event associated with a first application), and then control the display unit 151 to form a second color of notification light corresponding to a second type of event (for example, an event associated with a second application). In other words, the controller 180 may control the display unit 151 to sequentially form notification light relevant to a first and a second color. Moreover, controller 180 may form notification light relevant to a first color again as illustrated in FIG. 13B(c) after an output maintaining time of notification light corresponding to a second color has passed. Furthermore, when there exists a third type of event, the controller 180 may control the display unit 151 to form notification light relevant to the third color corresponding to the third type of event as illustrated in FIG. 13B(d). Meanwhile, in the description of FIGS. 13A and 13B, it is not illustrated an example of outputting event information described along with FIG. 11A(b), but even in cases relevant to FIGS. 13A and 13B, event information may be output in one region 151' of the display unit along with notification light.

Hereinafter, a method of outputting event information in an example described along with FIG. 13A will be described in more detail As described above, according to the present disclosure, when an event occurs, the controller 180 may control the display unit to output notification light based on color information in connection with the occurred event. Moreover, the controller 180 may output event information (for example, application information, status information, etc.) corresponding to an event generated in one region 151' of the display unit along with the notification light.

Figure 14A:
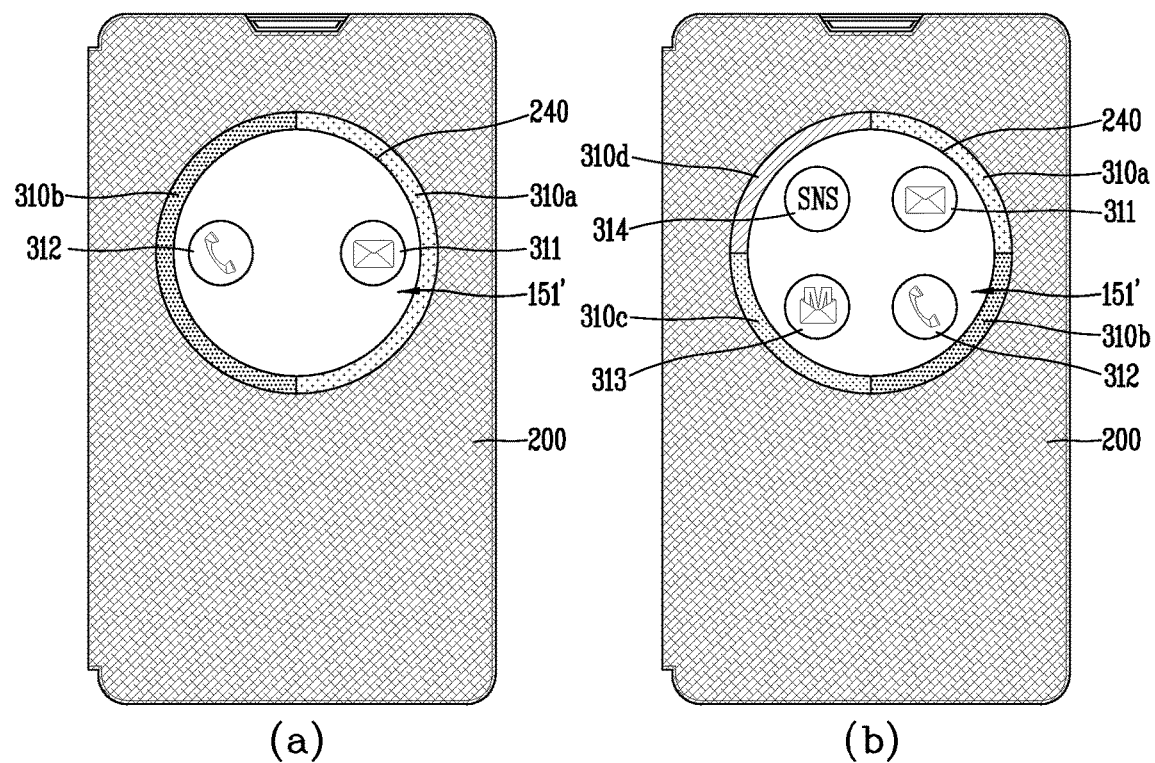
Figure 14B:
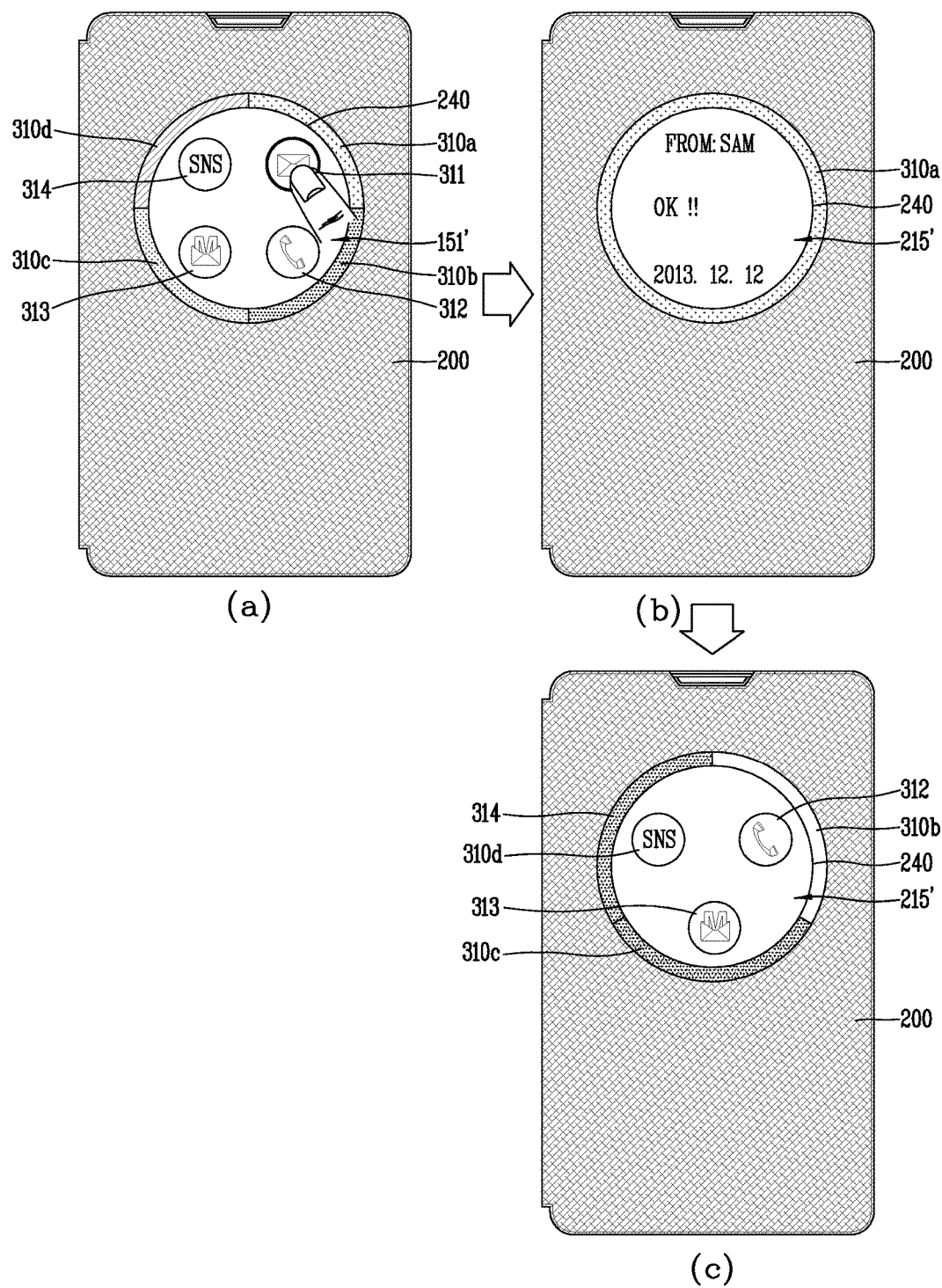

For example, the controller 180 may display icons 311, 312, 313, 314 representing events relevant to the relevant notification light on one region 151' of the display unit exposed through the window portion to correspond to a location formed with the relevant notification light in a state that notification light made of a plurality of colors is output on an outer circumference of the window portion 240 as illustrated in FIGS. 14A and 14B. Here, the displayed icons 311, 312, 313, 314 are arranged along the outer circumference of the window portion.

In particular, when notification light made of a plurality of colors are output on an outer circumference of the window portion 240 and the a predetermined type of touch is applied to the window portion within a predetermined period of time, the controller 180 may display a plurality of icons 311, 312, 313, 314 representing applications corresponding to the plurality of events, respectively.

Moreover, when any one icon is selected while a plurality of icons are displayed thereon (refer to FIG. 14B(a)), the controller 180 may display the detailed information of an event corresponding to the selected icon on the exposed region 151' exposed through the window portion of the display unit as illustrated in FIG. 14B(b).

Moreover, according to the present disclosure, when any one of the plurality of icons is selected to provide information on which one is an event currently displayed with the detailed information, notification light made of a plurality of colors along an outer circumference of the window portion may be switched to a color in connection with an event (or application) corresponding to the selected icon.

On the other hand, when detailed information on any one event is displayed through the selection of the icon among a plurality of notification target events, the event displayed with the detailed information is regarded as a checked one. Accordingly, the output of an icon relevant to the event displayed with the detailed information is terminated, and notification light relevant to the event displayed with the detailed information is no more formed as illustrated in FIG. 14B(c). In other words, the controller 180 may control the display unit 151 not to form notification light relevant to the event displayed with the detailed information.

In other words, different colors constituting notification light may represent the plurality of notification target events, respectively, and thus the controller 180 may exclude a color corresponding to a checked event among the plurality of notification target events from a plurality of different colors constituting notification light.

Figure 14C:
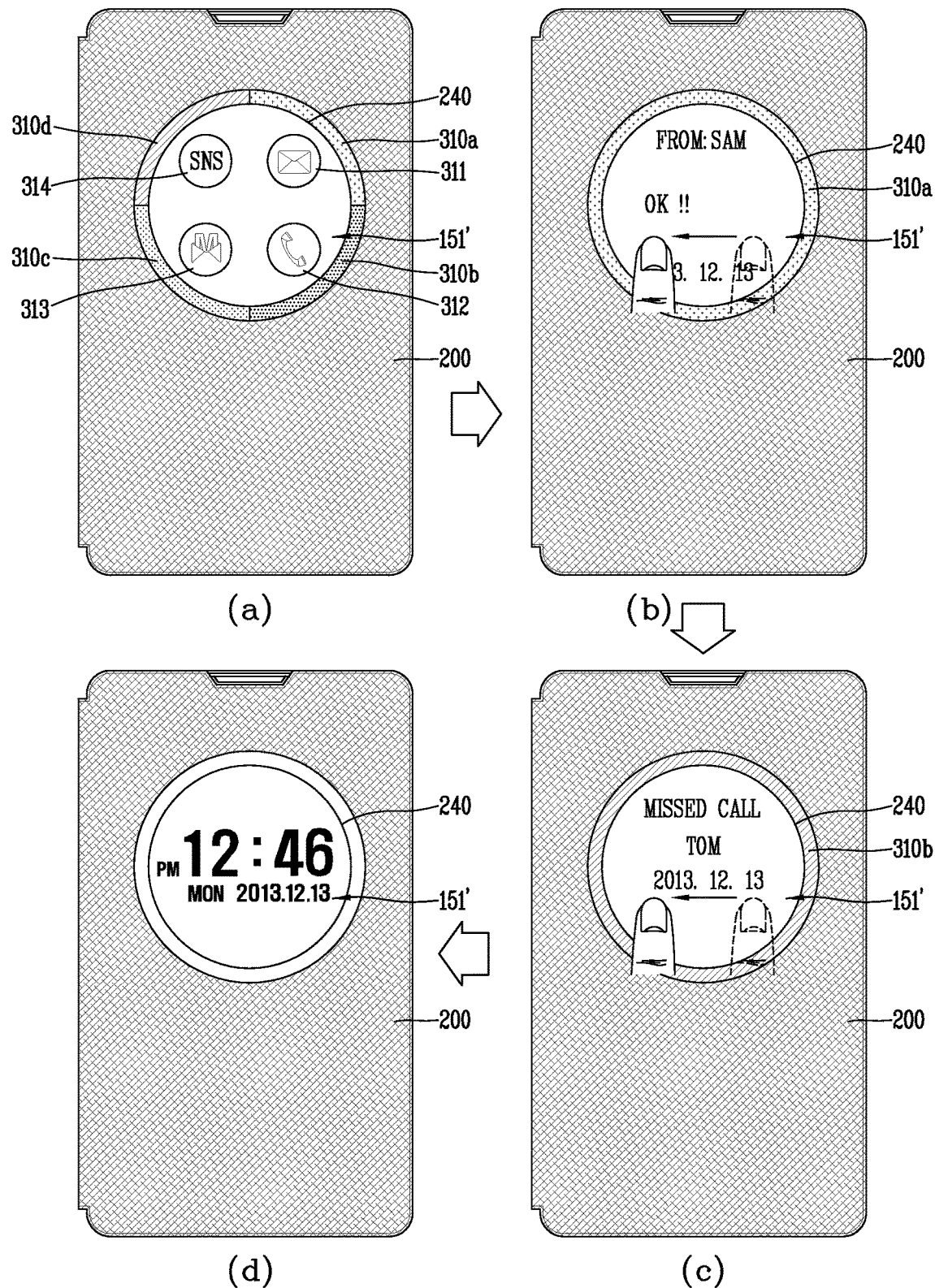

For another example, when the predetermined type of touch (for example, flicking, sliding, dragging touch, etc.) is applied again to the window portion as illustrated in FIG. 14C(b) while displaying detailed information on any one of the plurality of notification target events as illustrated in FIG. 14C(a), the controller 180 may switch detailed information displayed on the display unit (or exposed region 151') to detailed information on another one of the plurality of notification target events as illustrated in FIG. 14C(c). Furthermore, when the output of detailed information on a notification target event is completed, basic information (or default information) may be displayed on the exposed region 151' of the display unit as illustrated in FIG. 14C(d).

Figure 14D:
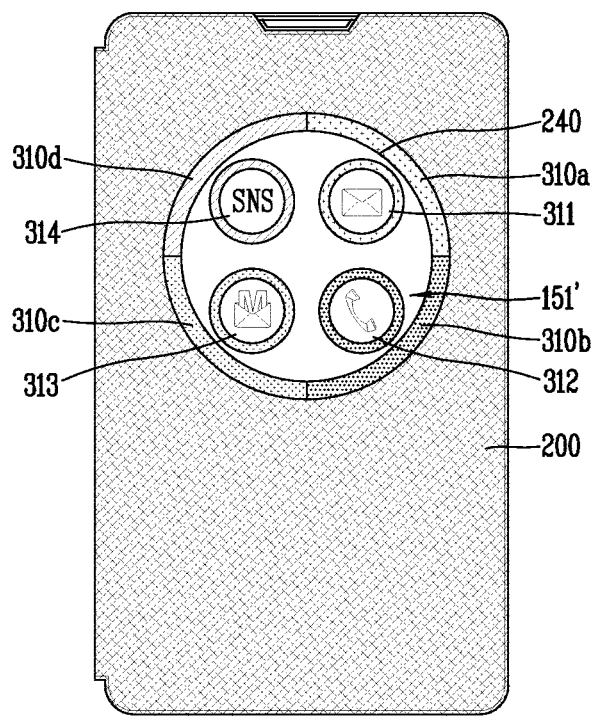

On the other hand, according to the present disclosure, icons displayed along with the foregoing notification light may be displayed with colors in connection with an application (or type of event) corresponding to a plurality of icons, respectively, as illustrated in FIG. 14D. In other words, the controller 180 may output images relevant to colors in connection with each icon or display an icon itself with a color tone in connection therewith around the icons.

In the above description, a method of forming notification light notifying the occurrence of an event in a mobile terminal covered by a cover guided by the guide sheet 251 to form the notification light 310 on the boundary of the window portion 240 has been described.

On the other hand, according to the present disclosure, the display unit 151 may be controlled to immediately form notification light without guiding light output from the display unit 151 by the guide sheet 251 to form notification light in addition to a method of guiding light output from the display unit 151 by the guide sheet 251 to form notification light. In this manner, a pattern generation mechanism for forming light output from the display unit 151 as notification light may be implemented by the structure of a cover according to FIG. 5 or carried out by controlling the display unit 151.

A method of outputting notification light according to a pattern generation mechanism formed by the structure of FIG. 5 may be carried out similarly to the description illustrated in FIGS. 10, 11A, 11B, 12A, 12B, 12C, 13A, 13B, 14A, 14B, 14C and 14D, and thus the detailed description thereof will be omitted below.

Furthermore, a mobile terminal according to the present disclosure may output a circular shaped graphic image along an outer circumference of the window portion 240 within the exposed region 240*a* to form notification light. In other words, in this case, the output of a graphic image may substitute the role of notification light. For example, As illustrated in FIG. 15A and 15B, the controller 180 may display a graphic image relevant to a specific color in the boundary region of window portion 240.

More specifically, referring to the accompanying drawings, as illustrated in FIG. 15A, in case where the display unit 151 is covered by the cover 200 when an event occurs, a graphic image 410 (or notification light) relevant to a specific color is output in a region relevant to the boundary portion of the window portion 240 within the exposed region 151' of the display unit. In other words, upon sensing a configuration in which the display unit 151 is covered by the cover 200 when an event occurs on the mobile terminal, the controller 180 activates at least one region of the display unit 151 to display the graphic image 410 on the boundary portion of the window portion 240. Accordingly, the user can recognize that an event has occurred on the mobile terminal through the graphic image 410 even when the display unit 151 is covered by the cover 200.

On the other hand, in a mobile terminal according to the present disclosure, when an event occurs while the display unit 151 is covered by the cover 200, in addition to a method of exhibiting the graphic image 410 on the boundary portion of the window portion 240 as illustrated in FIG. 15A, event information associated with the occurred event may be displayed along with the graphic image 410 on the exposed region 151' as illustrated in FIG. 15B. Here, event information may be brief information including at least one of a name of the application that has generated an event and a graphic image representing the application, detailed information including the content of the generated event, or the like. Meanwhile, it may be possible to output event information from the exposed region 151' while at the same time outputting the graphic image 410. Furthermore, on the contrary, the event information may be output based on a predetermined type of touch applied to the exposed region 151' while the output of notification light is maintained subsequent to outputting the notification light. Furthermore, the event information may be output based on a predetermined type of touch applied to the exposed region 151' after the output of the graphic image is terminated. In other words, the event information may be output at various time points. Furthermore, according to the present disclosure, the controller 180 may control the display unit 151 to display the graphic image 410 while at the same time displaying event information or control the display of the event information and the output of the graphic image 410 in an independent manner. Meanwhile, the output of the notification light 310 may be terminated subsequent to displaying it only for a predetermined period of time. Furthermore, if it is prior to checking the occurred event, the output thereof may be terminated subsequent to displaying the notification light 310 at reference time intervals or displaying it for the predetermined period of time, or the output thereof may be continuously maintained until the event is checked.

Furthermore, though not shown in the drawing, when event information corresponding to brief information is displayed in the exposed region 151' of the display unit, it may be possible to further output event information corresponding to detailed information based on a touch to the exposed region 151' of the display unit.

Furthermore, in a mobile terminal according to the present disclosure, when a touch is applied to one region 151a of the display unit while outputting the notification light 410 as illustrated in FIG. 15A, brief information or detailed information on the occurred event will be displayed as illustrated in FIG. 15B.

On the other hand, when the display unit 151 is hidden by the cover 200, information on a region to be displayed with a graphic image may be previously stored and existed in the memory 170 to output notification light 410 (or graphic image) on the boundary region portion of the window portion 240 within a display region of the display unit 151. The information on the exposed region may be information on which a location disposed with the window portion 240 or the like is taken into consideration. Accordingly, when an event occurs on the mobile terminal while the display unit 151 is covered by the cover 200, the controller 180 may display a graphic image in a region relevant to an outer circumference of the window portion 240, thereby providing information on the event.

Figure 15:
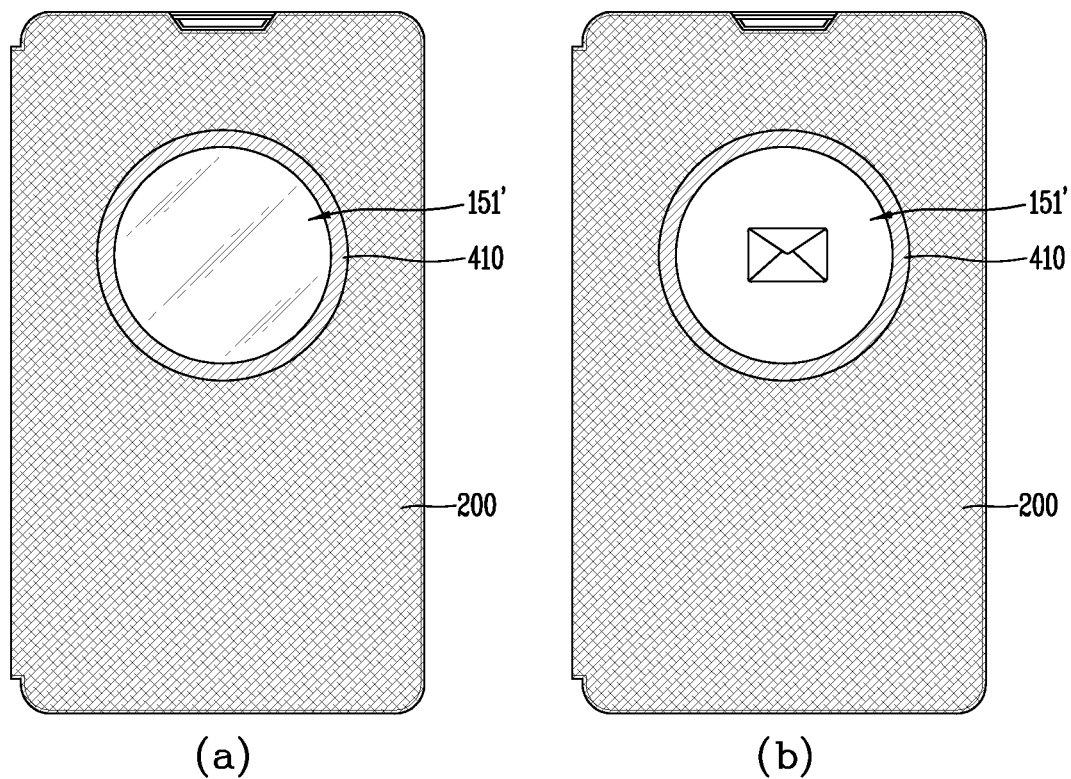
FIG. 15 is a conceptual view for explaining a method of notifying the occurrence of an event in a mobile terminal according to another embodiment of the present disclosure.

As illustrated in FIG. 15, a control method of displaying notification light and icons according to the type, number or the like of events described along with FIGS. 10, 11A, 11B, 12A, 12B, 13A, 13B, 14A, 14B, 14C and 14D may be also applicable to a case where a graphic image relevant to notification light is displayed in the boundary region of window portion 240, and the detailed description thereof will be substituted by the description of FIGS. 10, 11A, 11B, 12A, 12B, 13A, 13B, 14A, 14B, 14C and 14D.

Figure 16A:
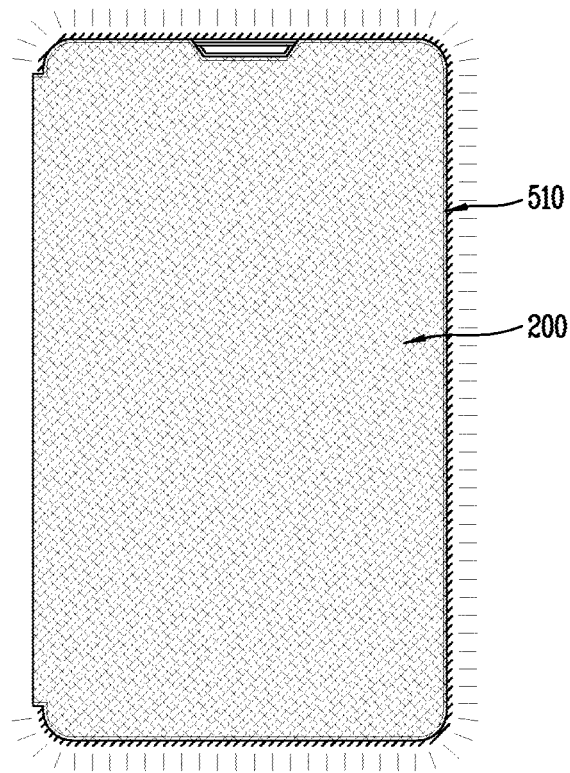
FIGS. 16A and 16B are conceptual views for explaining a method of notifying the occurrence of an event using another region of the cover in a mobile terminal according to the present disclosure.
Figure 16B:
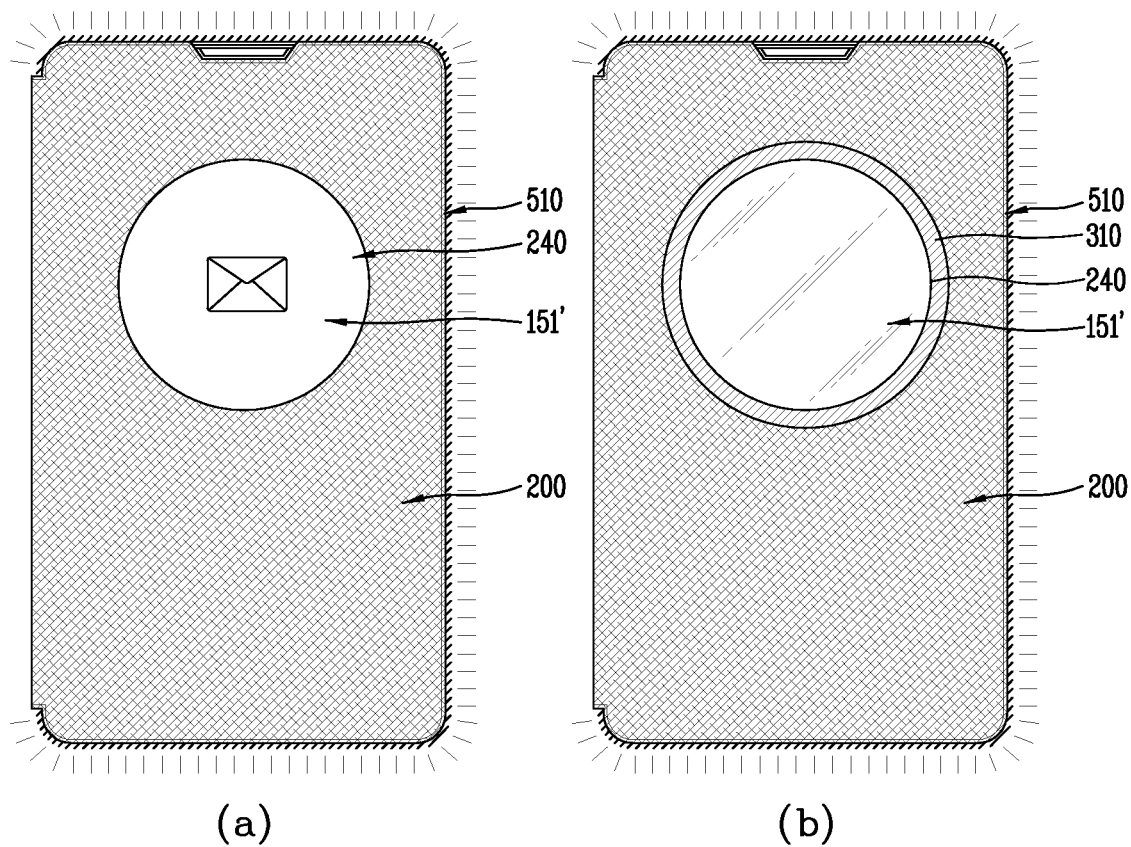

FIGS. 16A and 16B are conceptual views for explaining a method of notifying the occurrence of an event using another region of the cover in a mobile terminal according to the present disclosure.

Referring to the drawings, when an event occurs on the mobile terminal, notification light 510 is output on the edge region 480 (refer to FIG. 7) of the cover 200.

As illustrated in the present example, even when outputting notification light on the edge region thereof, a control method described with reference to FIG. 10 will be applicable thereto. For example, when an event occurs on the mobile terminal according to the present disclosure, the controller 180 senses whether or not the display unit is hidden by the cover. In this manner, upon sensing a configuration in which the display unit is covered by the cover is sensed when an event occurs on the mobile terminal, notification light notifying that the event has occurred is output on the edge region 480 of the cover provided in the cover.

Here, notification light may be implemented by the guide sheet (diffusion sheet or diffusion film) included in the guide portion 450, and configured to diffuse light entered to part of one surface thereof and emit light to a broader region on the other surface thereof as illustrated in FIG. 7.

According to the present disclosure, a pattern generation mechanism is implemented in coupling to a cover having the foregoing structure, and when an event occurs while the display unit 151 is closed by the cover 200, the display unit 151 is activated to turn on a region covered by the cover 200. Then, light output from the display unit 151 is entered to the guide portion 250, and the incident light is diffused to the edge region 480 and emitted to the outside. In other words, light emitted to the outside will be notification light having a ring shape in the edge region 480. Accordingly, even when the display unit 151 is covered by the cover 200, the user can recognize that an event has occurred on the mobile terminal through the notification light 510.

Furthermore, though not shown in the drawing, when there exist a plurality of events, the controller 180 may control the display unit 151 such that light diffused to the edge region 480 is emitted with a plurality of colors corresponding to the plurality of events. In other words, the edge region 480 may be divided into a plurality of regions to emit light representing different events, respectively, in each region. In other words, an outer region of the display unit 151 is divided into a plurality of regions to display images with different colors.

Furthermore, event information on an event that has occurred in a configuration in which the cover 200 is covered may be displayed on the display unit 151 when the display unit 151 is exposed to the outside, namely, when the cover 200 is open. The controller 180 may display the summary information of the occurred events in a list format or in an icon or widget format. The event information may be displayed on a home screen page or lock screen. Moreover, the event information may be displayed in the form of a pop-up window on the home screen page or lock screen.

On the other hand, in a mobile terminal according to the present disclosure, when an event occurs on the mobile terminal while the display unit 151 is closed by the cover 200, event information associated with the occurred event may be output through the exposed region 151' of the display unit exposed to the outside by the window portion 240 in addition to a method of exhibiting the notification light 510 in the edge region 480 as illustrated in FIG. 16B(a). Here, event information may be brief information including at least one of a name of the application that has generated an event and a graphic image representing the application, detailed information including the content of the generated event, or the like. Meanwhile, it may be also possible to output event information from the exposed region 151' of the display unit while at the same time outputting notification light 510. Furthermore, on the contrary, the event information may be output based on a predetermined type of touch applied to the exposed region 151' of the display unit while the output of notification light is maintained subsequent to outputting the notification light. Furthermore, the event information may be output based on a predetermined type of touch applied to the exposed region 151' of the display unit after the output of notification light is terminated. In other words, the event information may be output at various time points.

Furthermore, according to the present disclosure, the controller 180 may control the display unit 151 to illuminate notification light 510 while at the same time displaying event information or control the display of the event information and the output of the notification light 510 in an independent manner. Meanwhile, the output of the notification light 510 may be terminated subsequent to displaying it only for a predetermined period of time. Furthermore, if it is prior to checking the occurred event, the output thereof may be terminated subsequent to displaying the notification light 510 at reference time intervals or displaying it for the predetermined period of time, or the output thereof may be continuously maintained until the event is checked.

For another example, as illustrated in FIG. 16B(b), in addition to a method of exhibiting the notification light 510 on the edge region 480, the notification light 310 may be output in the boundary region of window portion 240, thereby notifying that an event has occurred.

More specifically, when an event occurs, the notification light 510 of the edge region 480 and the notification light 310 of the boundary region may be output at the same time. In this case, the terminal and cover may include at least one of mechanisms described in FIGS. 3 through 6 and a mechanism described in FIGS. 7 and 8.

For still another example, when an event occurs, the notification light 510 of the edge region 480 and the notification light 310 of the boundary region may be sequentially output. More specifically, the controller 180 may control the display unit 151 to form either one of the notification light 510 of the edge region 480 and the notification light 310 of the boundary region when a first type of event (for example, message receive event) has occurred, and then control the display unit 151 to form the other one of the notification light 510 of the edge region 480 and the notification light 310 of the boundary region when a second type of event (for example, missed call receive event) which is different from the first type has occurred. Furthermore, when there exist a plurality of events even in case of the same type of event, the notification light 310, 510 may be also sequentially output.

FIGS. 17A, 17B, 17C and 17D are conceptual views for explaining a method of controlling a mobile terminal using a touch to the cover.

Referring to the drawings, the cover 200 may include a window portion 240 allowing the visual information of the display unit 151 to be exposed to the outside and a touch sensing portion 590 configured to sense the user's touch input. Even in the examples of FIGS. 17A, 17B, 17C and 17D, when an event occurs while the display unit is deactivated, the graphic image 410 may be output on the boundary of the window portion, but the present examples may not be necessarily limited to this. For example, a terminal control associated with a touch to the cover may be carried out regardless of the output of notification light.

Figure 17A:
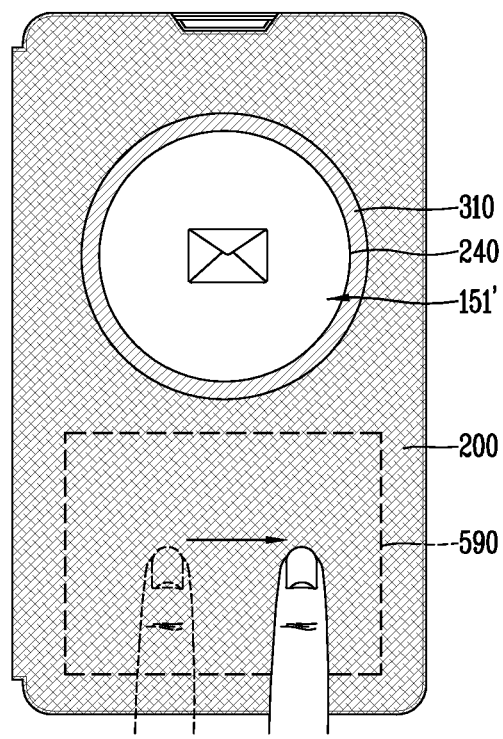
FIGS. 17A, 17B, 17C and 17D are conceptual views for explaining a method of controlling a mobile terminal using a touch to the cover.
Figure 17A:
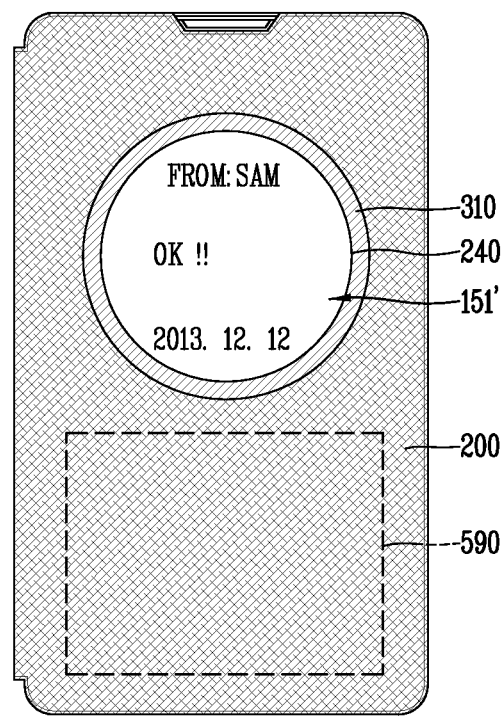

Referring to FIG. 17A, when there is a touch input to the touch sensing portion 590, the terminal drives an application associated with an event that has occurred on the terminal in response to the touch input. Furthermore, the detailed content of the event may be displayed on the window portion 240 along with the driving of the application.

For example, when a specific event (for example, message receive event) has occurred as illustrated in FIG. 17A, the controller 180 may control the display unit 151 to form notification light, and display an icon representing the event on the exposed region 151'. In this state, when a touch input such as short touch, long touch, drag, flicking and the like is applied to the touch sensing portion 590, the terminal senses the touch input. In this manner, the cover 200 is configured to allow the user to enable an operation for manipulating the display unit 151 in a configuration while covering the display unit 151 of the terminal.

According to the present example, when a drag input is applied to the touch sensing portion 590, the terminal senses it to drive an application (for example, message application) associated with the specific event. At this time, the input of a user control command to the application may be limited in the other portion excluding the touch sensing portion 590. It is to mostly prevent the application from being activated due to the input of a user's unintentional control command in a touch input enabled terminal.

Furthermore, as illustrated in FIG. 17A(b), the controller 180 displays the execution screen of an application in the exposed region 151' while at the same time driving the application associated with the specific event. In this case, the content of the received message may be displayed on the execution screen. In other words, when an application is driven, the content of the received message is displayed in the exposed region. Furthermore, when the content of the message is displayed, the display unit 151 may be controlled such that the notification light disappears.

Figure 17B:
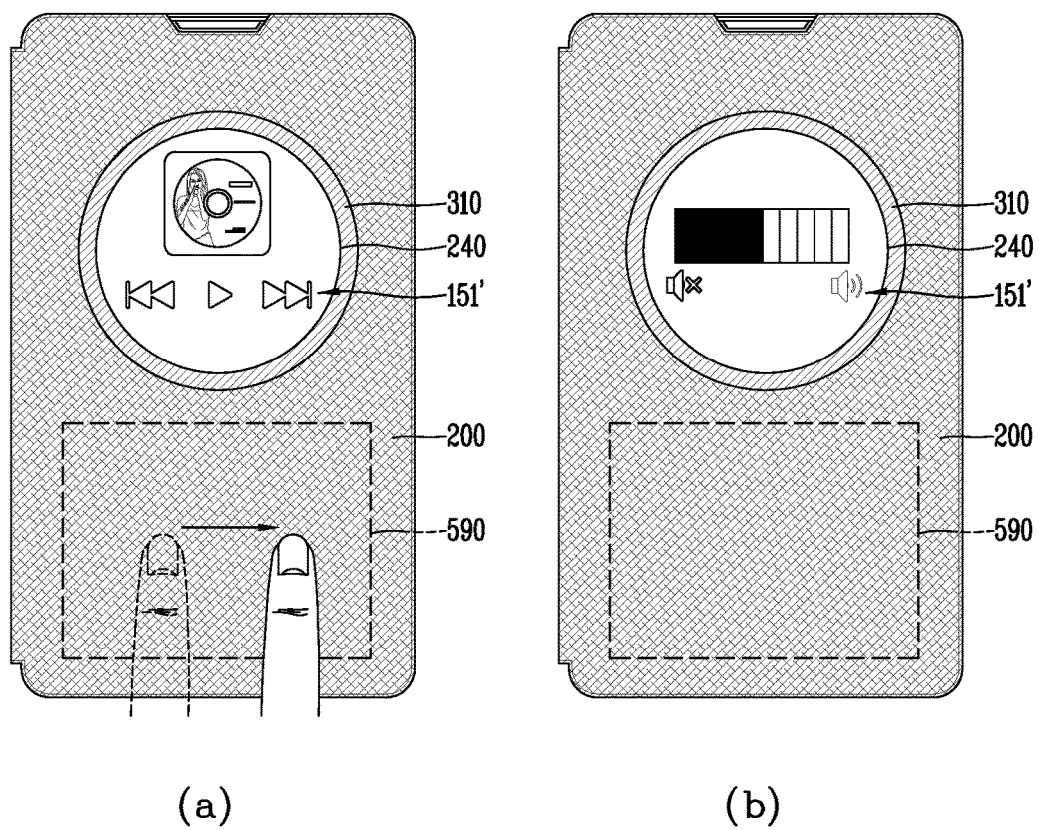

Referring to FIG. 17B, when there is a touch input to the touch sensing portion 590, the controller 180 controls a specific operation of a currently executed application in response to the touch input. For example, a specific application is driven on the terminal, and an execution screen associated with the application is displayed on the exposed region 151' while the cover 200 covers the display unit 151 of the terminal. In this configuration, the terminal receives a control command associated with the operation of the application through a touch input to the touch sensing portion 590 to perform the control command.

More specifically, referring to FIG. 17B(a), when an audio play application is driven to reproduce audio (or the reproduction is completed), the controller 180 displays a key or keys (audio play control key) for controlling the audio reproduction on the exposed region 151'. In this case, even when there is a touch input to the touch sensing portion 590, the terminal does not process it, and when there is a touch input to the touch sensing portion 590, it is processed as a control command associated with audio reproduction. Furthermore, the controller 180 may further display a representative image of audio data (for example, thumbnail image of a music file), audio data information (for example, music title, singer name, etc) or the like on the exposed region 151'.

For such an example, when a touch input (for example, short touch) is applied to a location (a location relevant to the bottom of each key) corresponding to a key for controlling audio reproduction (for example, a play key (PLAY), a stop key (STOP), a fast forward key (FF), a fast rewind key (FR), etc.), the relevant operation will be carried out.

For another example, as illustrated in FIG. 17B(b), when a drag input is applied to the touch sensing portion 590, the audio play volume may be adjusted. In this case, when the drag input is sensed, the controller 180 may display an indicator indicating the level of the volume adjustment on the exposed region. Furthermore, the controller may control the display unit 151 to allow the notification light 310 to flicker along with the volume control, thereby providing a feedback for volume control to the user.

Figure 17C:
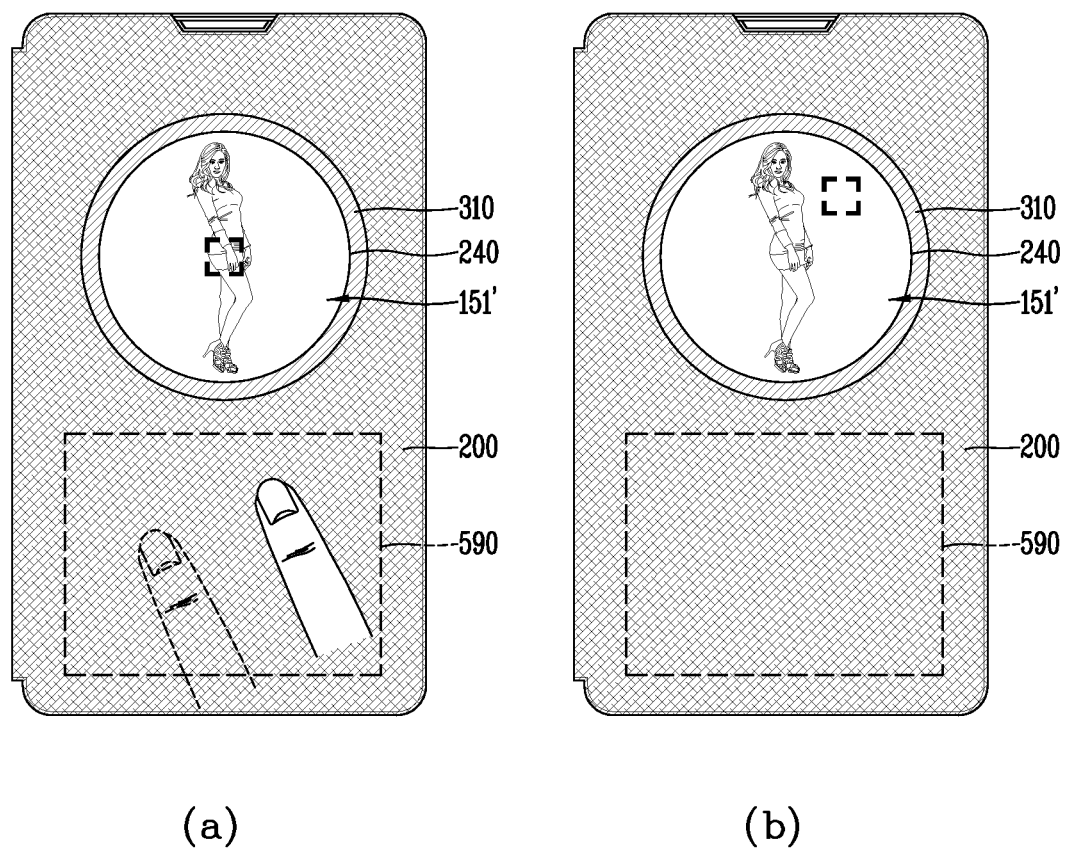

Referring to FIG. 17C, when there is a touch input to the touch sensing portion 590, the terminal senses it, and controls a camera of the terminal in response to the touch input.

For the control method, first, upon entering a camera mode in which the camera 121*a* or 121*b* (refer to FIGS. 1B and 10) is activated according to the user's selection, an image received through the camera 121*a* or 121*b* is displayed on the display unit 151. At this time, when the terminal is covered by the cover, an image sensed by the camera is reduced to a size corresponding to the exposed region 151' as a preview image and displayed on the exposed region 151'.

According to the drawing, an indicator associated with a current status of the sensed image may be displayed on the exposed region 151'. The indicator may be a focus icon, a zoom icon, a brightness adjust icon, a menu select icon, and the like, for example. In this case, when there is a touch input to the touch sensing portion 590, the terminal changes the location or status of the icon using the touch input.

More specifically, a focus icon is displayed on the exposed region 151' along with an image sensed by the camera as illustrated in FIG. 17C(a), and the location of the focus icon is moved in response to a touch input to the touch sensing portion 590 as illustrated in FIG. 17C(b). At this time, the camera 121*a* or 121*b* may be controlled to change a subject which is a focused target according to the movement of the focus icon. For example, as another example of consecutively moving a touch position like a drag to the touch sensing portion 590, when a drag input is sensed on the touch sensing portion 590 in a state the camera is activated, the controller 180 may process the drag input as an execution command of zoom-in or zoom-out in the camera.

For another example, the controller 180 may change the focus of the camera in response to a drag touch to the touch sensing portion 590 prior to activating a zoom function, and process a drag input subsequent to activating a zoom function as a zoom-in and zoom-out execution command subsequent to activating a zoom function. In this case, when the drag is completed (or when a user's hand is released from the touch sensing portion), a zoom-controlled image may be captured or stored.

On the other hand, though not shown in the drawing, a cover portion relevant to the touch sensing portion 590 may be formed in a semi-transparent manner to transmit screen information displayed on the display unit 151. In other words, the user can recognize screen information displayed on the display unit 151 through the cover portion formed in a semi-transparent manner. At this time, a control button for controlling a function currently being carried out in the mobile terminal may be displayed on the display unit 151.

For example, the controller 180 may display a capture function icon, a video switch function icon, a stop function icon, and the like in a display region of the display unit 151 relevant to the touch sensing portion 590 in a state that the camera is activated. When a touch input is applied thereto, the location of the focus icon is moved along the direction of the movement. When another touch input such as a short touch, a tap or the like is applied to the touch sensing portion 590 in this state, a capture operation is carried out. For another example, when the drag is released, a capture operation may be carried out on the basis of a subject located with the focus icon at the time of the releasement.

Figure 17D:
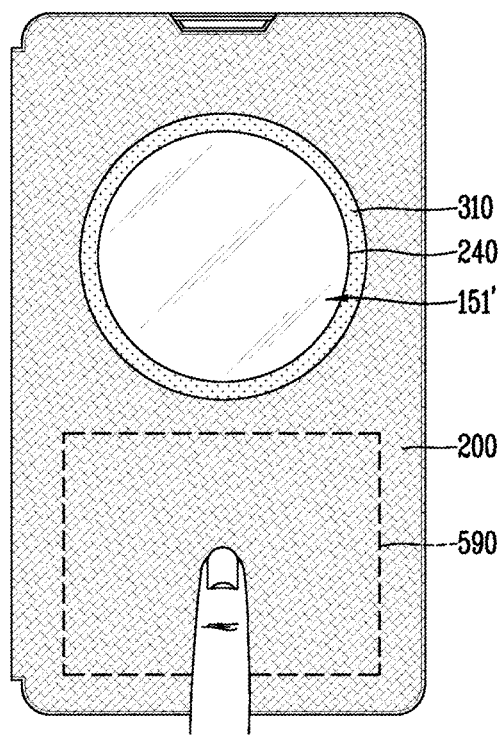

Referring to FIG. 17D, when there is a touch input to the touch sensing portion 590 while the display unit is covered by the cover, the terminal processes the touch input as a control command for a predetermined application.

Furthermore, in this case, when there is a touch input to the touch sensing portion 590 while covering the display unit, one region 151' of the display unit may be activated to display screen information associated with a currently applied touch input.

According to the present embodiment, the terminal is configured to enable the execution of a remote control application, and when the remote control application is executed, the execution screen of the remote control application may be displayed on the terminal.

According to the drawing, a touch input to the touch sensing portion 590 is defined as a driving of the remote control application or a control of a specific operation without the output of an execution screen of the remote control application. For example, when a short touch or tap is applied to the touch sensing portion 590, the terminal senses it and transmits a driving signal (for example, power signal) to an image display device (for example, TV, monitor, etc.). Notification information for notifying that the driving signal has been transmitted may be displayed on the exposed region 151'. In this case, a remote control application may be executed on the terminal along with the transmission of the driving signal. When the remote control application is executed, the associated execution screen may be displayed on the exposed region 151'.

For another example, when a touch input is applied to the touch sensing portion 590 in a state that an event has occurred on the terminal, the touch input may be processed as an input for a control command associated with a second application which is different from a first application that processes the event. In other words, a touch input to the touch sensing portion 590 may be defined as a specific function regardless of the output of the notification light 310. As a more specific example, when a touch input is applied to the touch sensing portion 590 in a state that a message is received to display the notification light 310, the touch input may be processed as an input of a control command associated with a second application (remote control application) which is different from the first application (message application).

Furthermore, the controller 180 may change the notification light 310 to notification light having a different color along with the processing of a control command associated with the second application or control the display unit 151 to allow the notification light to flicker, thereby providing a feedback for processing a control command to the user.

Figure 18:
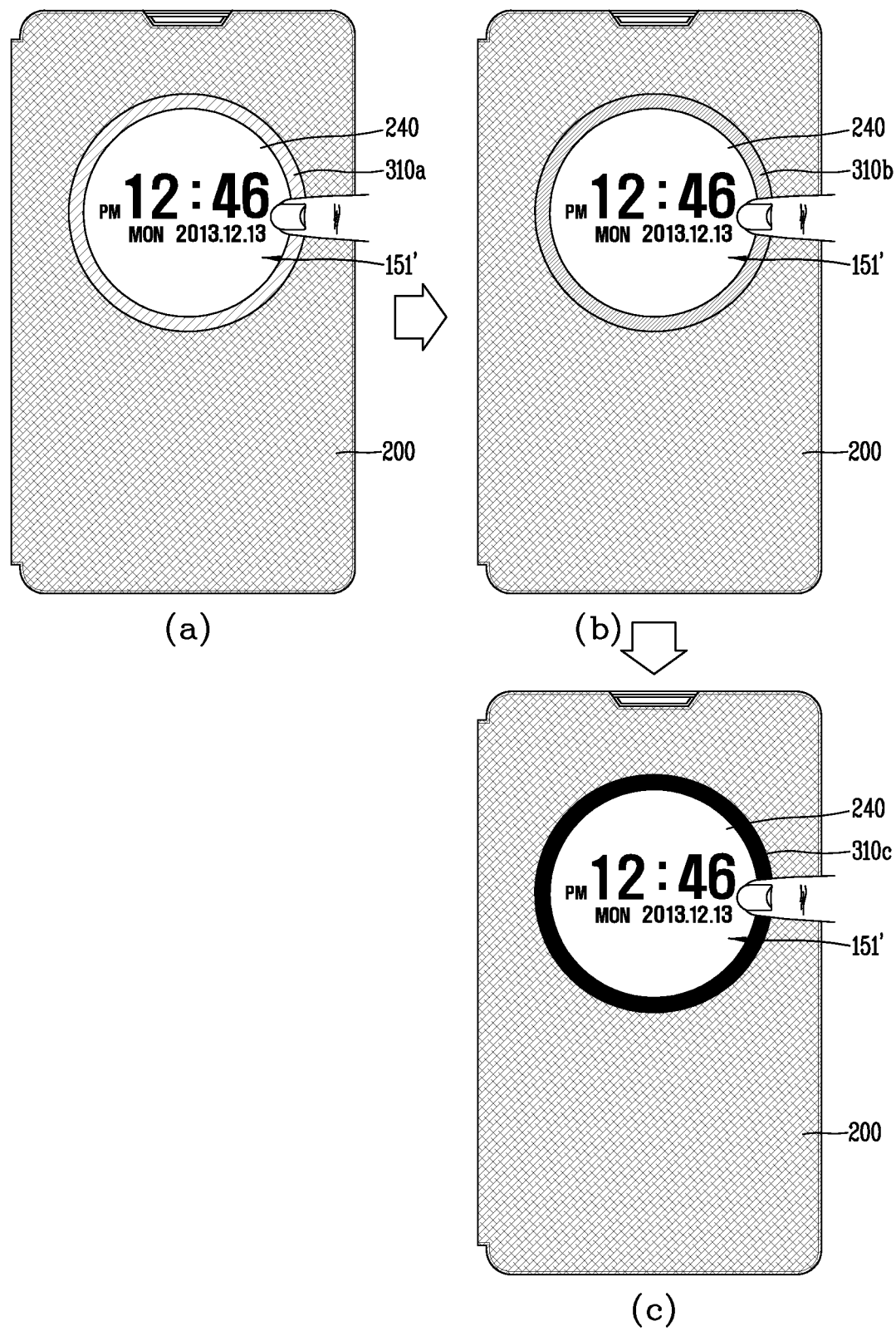
FIG. 18 is a conceptual view for explaining a method of providing a feedback to a user when the mobile terminal according to the present disclosure is closed by the cover.

Furthermore, the present disclosure presents another method of providing a feedback to the user. FIG. 18 is a conceptual view for explaining a method of providing a feedback to a user when the mobile terminal according to the present disclosure is closed by the cover.

Referring to the drawings, the terminal may be configured to sense a touch input to the window portion of the cover. For such an example, the terminal may be formed to detect a charge amount change at a position corresponding to the window portion or sense a pressure applied to the cover while the terminal is covered by the cover.

A feedback provided to the user may be implemented according to the notification light being changed according to the touch input. For such an example, referring to FIG. 18A, basic information (or default information) is displayed on the exposed region 151' of the display unit, and the notification light 310 relevant to the event is output when an event occurs in this state.

In this case, when a touch input is applied to the window portion 240, the terminal senses it to release the output of the notification light 310. At this time, when there exists another event, the terminal changes the notification light to another form such as outputting a dark color (refer to FIG. 18B) or reducing a blinking time, and the like without releasing the output of the notification light 310. Through this, the user may know that there exists another event, and receive a feedback in which the previous event has been checked.

The control method may be repeated in case where there exists any unchecked event. For example, when there exists an event again in case where a touch input is applied to the window portion 240 in the state of FIG. 18B, the controller may output the notification light with a dark color as illustrated in FIG. 18C.

Furthermore, sequentially changing notification light in the foregoing control method may provide a new type of setting method to the user. For example, when an event occurs, the color of the output notification light may be set by a touch input applied to the window portion 240. For example, the color of notification light is sequentially changed when a touch input is sequentially applied to the window portion 240, and the color of notification light currently being output may be set as the color of notification light being output during the occurrence of the event when a different type of touch input (for example, long touch) is applied to the window portion 240 while outputting notification light with a certain color.

FIGS. 19A, 19B, 19C, 19D, 19E and 19F are conceptual views for explaining a method of providing its corresponding user interface when a cover provided with a circular shaped window is covered on a mobile terminal according to the present disclosure.

Referring to the drawings, information (for example, a first type of graphic user interface) that has been displayed on the display unit while a front surface of the terminal is open by the cover is switched to another information (for example, a second type of graphic user interface) when the cover is closed. For example, information that has been displayed in an open configuration is displayed at a position out of a circular shaped window, and information displayed in a covered configuration may be limited to a region corresponding to the circular shaped window on the display unit.

For example, when a home screen page is displayed on the display unit in a configuration in which the cover is open or the cover is closed in a state that the execution screen of a specific application is displayed, another information may be displayed within the exposed region 151'.

Here, home screen page may be expressed as an idle screen, and when the terminal is in an idle state, the home screen page may be displayed on the display unit. More specifically, an application icon, a folder stored with icons or a widget icon, and the like installed in the mobile terminal may be displayed on the home screen page.

Furthermore, when covering the cover, information displayed within the exposed region 151' of the display unit may be a lock screen. The lock screen may be a screen capable of allowing only a touch input associated with an operation for releasing the lock state. The lock screen may be displayed when an event occurs on the terminal while the display unit is deactivated.

Figure 19A:
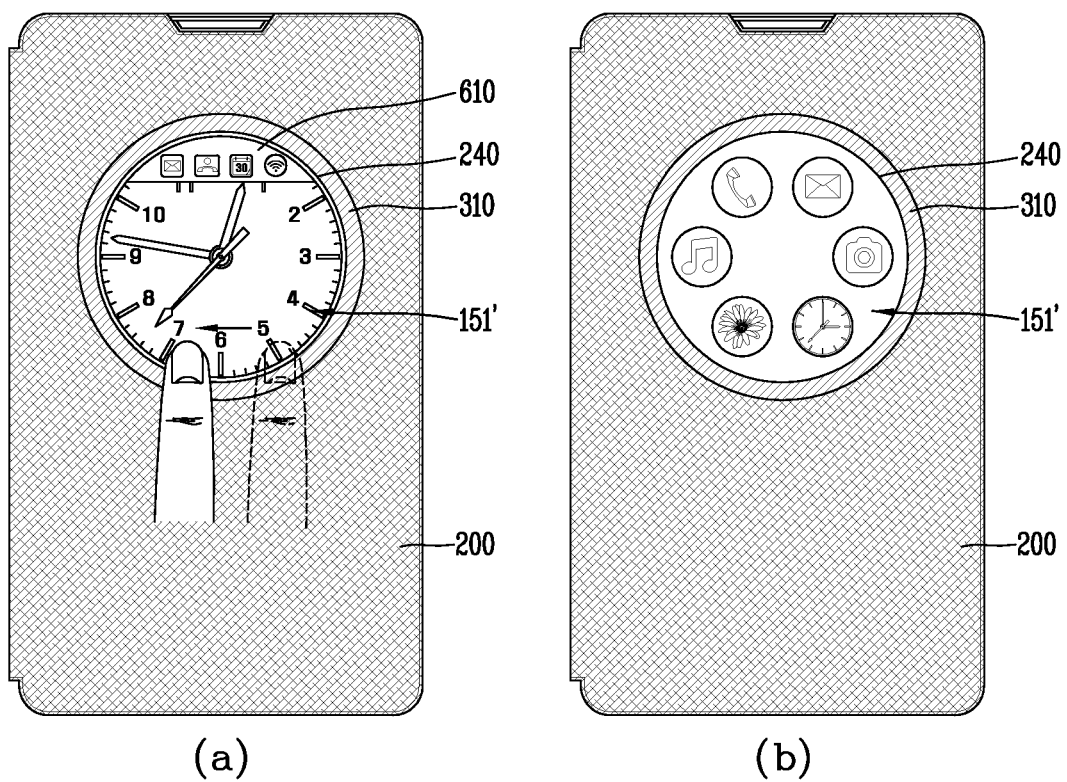
FIGS. 19A, 19B, 19C, 19D, 19E and 19F are conceptual views for explaining a method of providing its corresponding user interface when a cover provided with a circular shaped window is covered on a mobile terminal according to the present disclosure.

For more specific example, referring to FIG. 19A(a), an analog clock image may be displayed on a circular shaped window, namely, the exposed region 151' when covering the cover 200. Furthermore, a digital clock or another size of analog clock may be displayed while the cover is open, and then an analog clock may be displayed within the exposed region 151' when covering the cover.

Furthermore, a status display window 610 may be displayed at an upper end of the analog clock image. The status display window 610 may be displayed or not displayed according to circumstances, and displayed at an upper end of the window when displayed.

A region displayed with the status display window 610 may changed based on a drag or slide touch to the region displayed with the status display window 610. When the status display window 610 covers one region 151' of the display unit by a more than predetermined range, a GUI screen as illustrated in FIG. 19A(b) may be displayed on the status display window 610.

Furthermore, according to the drawing, when an event occurs on the terminal, notification light 310 may be output in the boundary region of window portion 240. In other words, when an event occurs on the terminal, an analog clock image may be displayed on the exposed region 151', and notification light 310 may be displayed in the boundary region of window portion 240. However, the present example may not be necessarily limited to the output of the notification light 310, and for example the output of the notification light 310 may be omitted.

Referring to FIGS. 19A(a) and 19A(b), when a touch is applied to the window portion 240, an application icon, a widget icon, and the like installed in the mobile terminal may be displayed while releasing the lock of the window portion. However, the present disclosure may not be necessarily limited to this, and when an event occurs, an application icon, a widget icon, and the like installed in the mobile terminal may be displayed while releasing the lock of the window portion without any control operation associated with FIG. 19A(a).

In this case, an event occurred application or widget icon may be displayed on the window portion 240. For another example, the icons may be arranged on the window portion 240 according to the rules set by the default.

Furthermore, the icons may be some icons among icons displayed on a home screen page. In this case, the icons may be arranged in a matrix form when the cover is open, and disposed in a circular manner along an outer circumference of the window portion 240 when the cover is closed.

On the other hand, as illustrated in FIG. 19A(b), when any one icon is dragged or slid to a predetermined region (for example, one region 151' of the display unit) in a state that icons are disposed therewithin, the controller 180 may recognize such a touch as a selection of the dragged or slid icon. Accordingly, the controller 180 may display the event information of an application relevant to the dragged or slid icons or execute an application relevant to the dragged or slid icons.

Figure 19B:
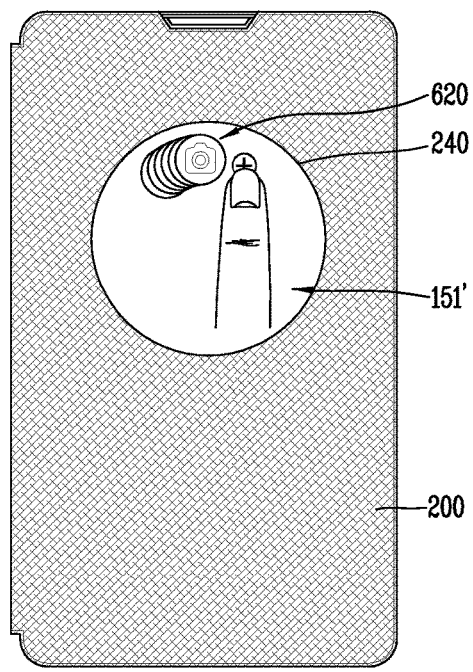
Figure 19B:
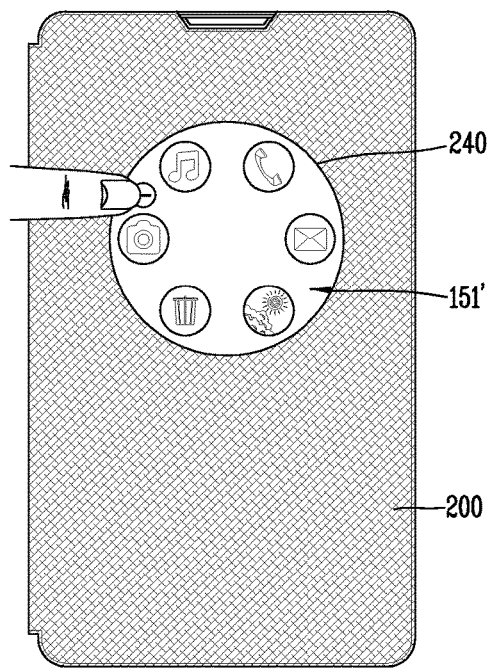
Figure 19B:
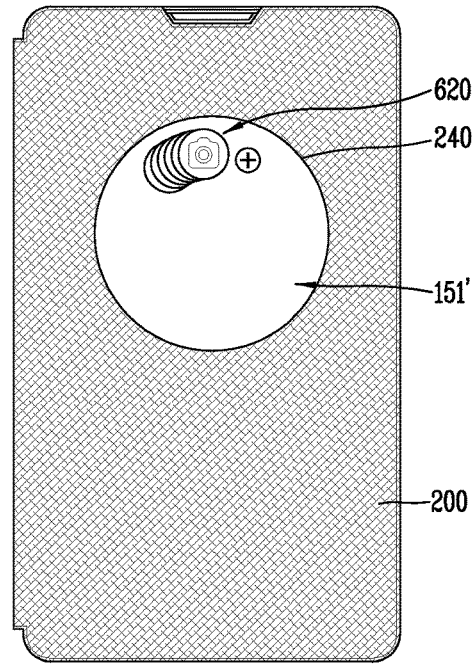

Referring to FIG. 19B, when covering the cover, icons 620 displayed on the window portion 240 may be converged on one position and then unfolded according to the user's selection. In this manner, when icons be converged on one position and then unfolded according to the user's selection, other information may be displayed in a limited region of the window portion 240. The other information may be information that has been displayed in the previous example or any one of information displayed on an exposed region in another example which will be described below.

Figure 19C:
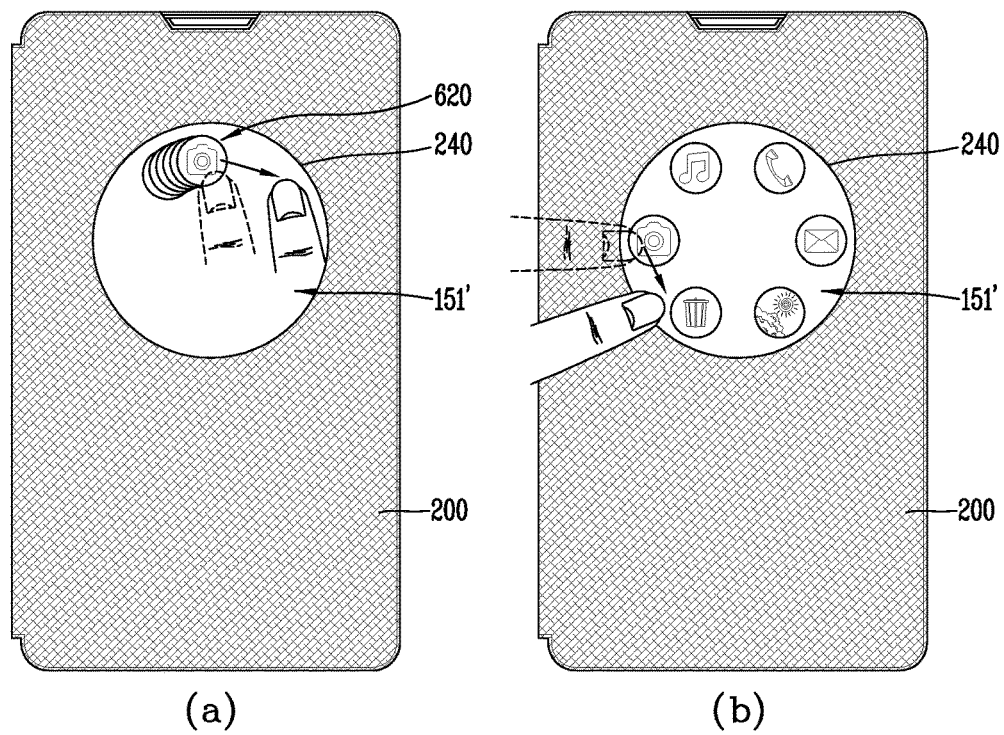
Figure 19C:
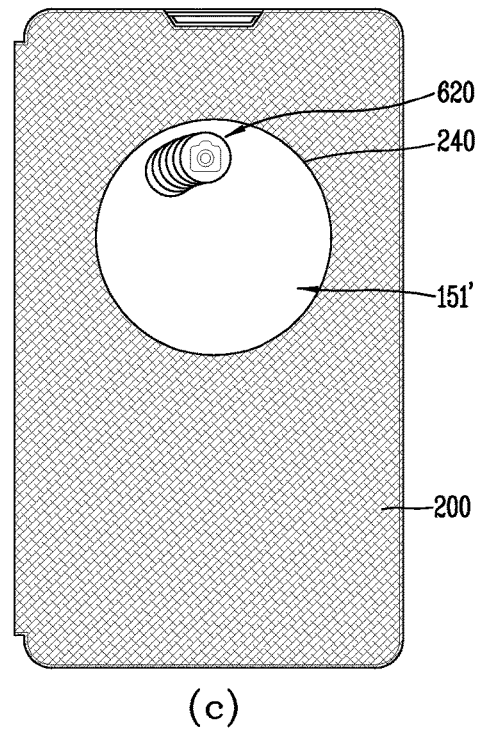

More specifically, for example, as illustrated in FIG. 19B(a), a plurality of icons 620 are displayed in an overlapping manner to one another, and a first icon (unfold command receive icon) for receiving an input for unfolding the plurality of icons is displayed at the same time. When the user applies a touch input to the first icon through the window portion 240, the terminal recognizes it to unfold the plurality of overlapped icons to a focus of the camera one another to be disposed in a circular shape along an outer circumference of the window portion 240 as illustrated in FIG. 19B(b). In this case, a second icon (converge command receive icon) for receiving an input for converging the plurality of icons 620 is displayed. As illustrated in FIGS. 19B and 19C, when a touch input is applied to the second icon, unfolded icons are converged to one position again to be overlapped with one another.

However, the unfold and converge command may be applied to the window portion in a different manner. For example, referring to FIG. 19C, a plurality of icons 620 may be converged or unfolded based on a drag input.

More specifically, for example, when a plurality of icons are displayed in an overlapping manner to one another, and the user applies a drag input to the plurality of icons 620 as illustrated in FIG. 19C(a), the plurality of icons 620 overlapped to one another are unfolded to be disposed in a circular shape along an outer circumference of the window portion 240 as illustrated in FIG. 19C(b), as illustrated in FIGS. 19C(b) and 19C(c), icons 610 that have been unfolded when a drag input is applied to the plurality of unfolded icons 620 are converged on one position to be overlapped with one another.

Figure 19D:
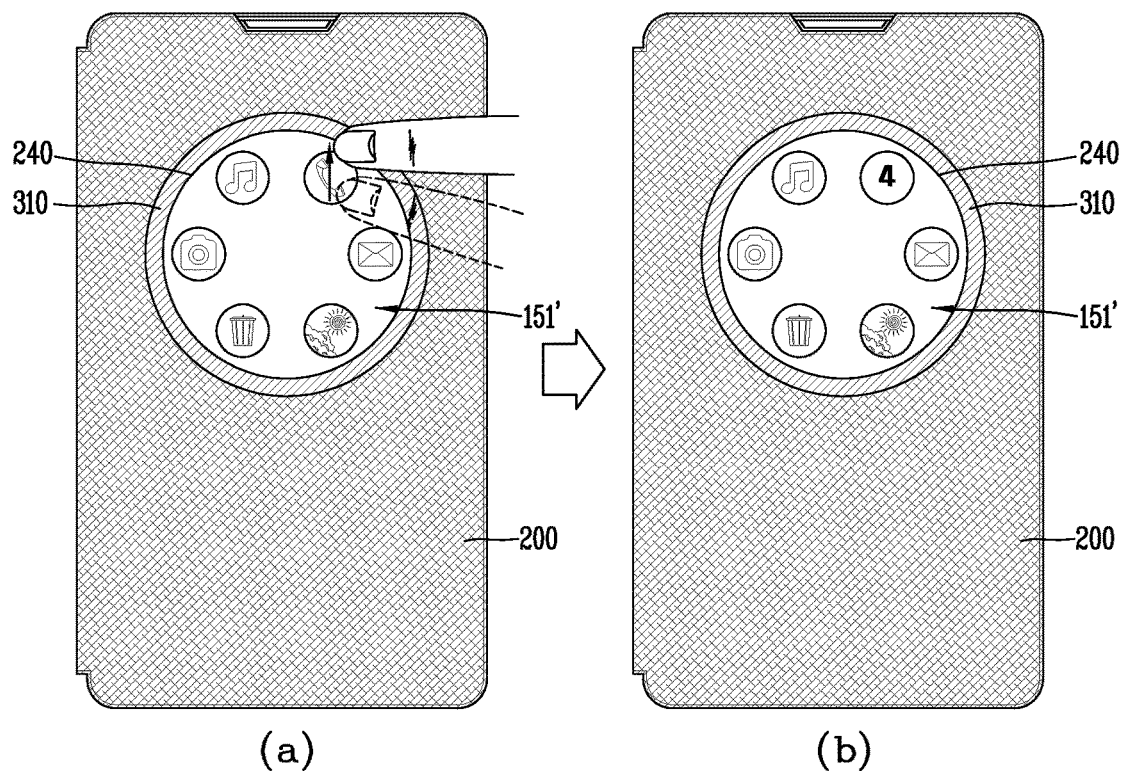

Referring to FIG. 19D, when a touch input is applied to any one of the displayed icons, the number of occurred events may be displayed thereon. For example, when an event occurs as illustrated in FIG. 19D(a), notification light 310 is output in the boundary region of window portion 240. At the same time, an application icon, a widget icon, and the like installed in the mobile terminal may be displayed while releasing the lock of the window portion 240. For another example, when a touch is applied to the window portion 240 subsequent to the output of the notification light 310, an application icon, a widget icon, and the like installed in the mobile terminal may be displayed while releasing the lock of the window portion.

In this case, when a users touch input (for example, short touch, long touch, drag, flicking, tap, etc.) is applied to any one of the displayed icons (refer to for instance 19D(a)), the number of occurred events is displayed while overturning the relevant icon (refer to FIG. 19D(b)). In this case, the other icons excluding an icon to which the touch input is applied may continuously maintain the displayed form.

Furthermore, the output of the notification light 310 may be maintained until receiving a command for checking an event.

Furthermore, when a touch is applied to the relevant icon again while displaying the number of occurred events as illustrated in FIG. 19D(b), brief information or detailed information on the occurred event may be displayed in one region 151' of the display unit. The brief information or detailed information may be displayed in a list format.

Figure 19E:
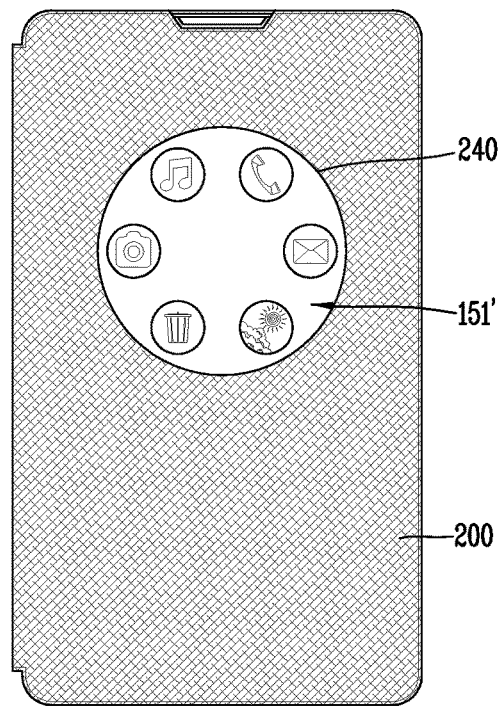
Figure 19E:
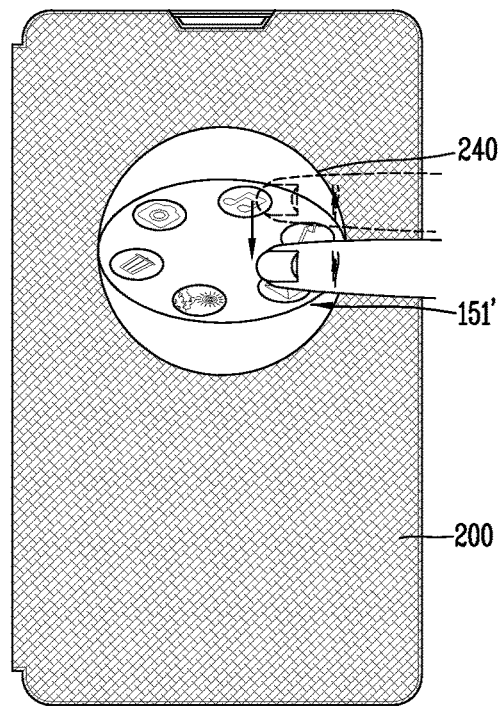
Figure 19E:
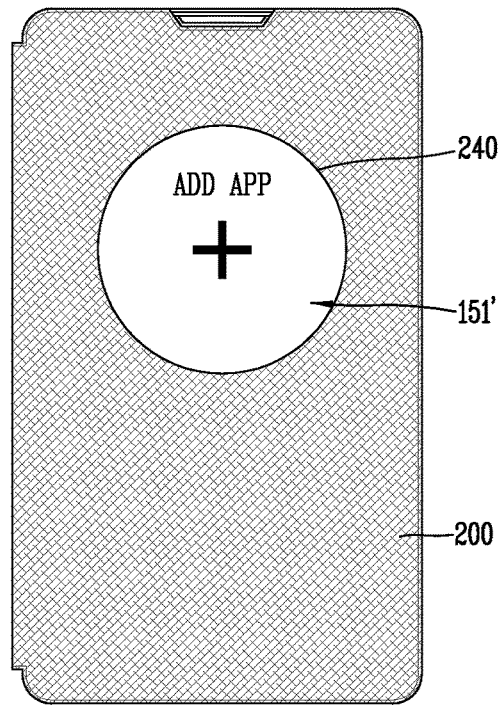

Referring to FIG. 19E, a touch input to the window portion may be set to a control command for performing a specific function of the terminal. For such an example, when a touch input is applied to a background on which the icons are displayed, an edit function of the background may be carried out.

For a more specific example, referring to FIG. 19E(a), while the terminal is closed by the cover, an application icon, a widget icon, and the like may be displayed on the exposed region 151'. The icons may be arranged in order along an outer circumference of the window portion.

Referring to FIG. 19E(b), when a touch input (for example, short touch, long touch, drag, flicking, tap, etc.) is applied to the background, an edit function capable of adding an application is carried out while overturning the background. In order to perform the edit function, the execution screen of an application add function may be displayed on the exposed region 151'.

Furthermore, when a touch input (for example, short touch, long touch, drag, flicking, tap, etc.) is applied to the background as illustrated in FIGS. 19E(a) and 19E(b), a basic background screen including clock information or the like may be displayed instead of screen information corresponding to an edit function. Here, a basically configured display screen may be the basic background screen, and when the touch input (for example, short touch, long touch, drag, flicking, tap, etc.) is applied to the basic background screen, a GUI screen as illustrated in FIG. 19E(a) may be displayed. Here, the basic background screen may be screen information as described in FIG. 19A(a).

Furthermore, when icons illustrated in FIG. 19E(a) are icons corresponding to event occurred applications, the controller 180 may process the event such that it has been checked in response to a predetermined type of touch (for example, long touch, drag touch, etc.) being applied to the icon.

In case of a control process in FIG. 19E, when an event occurs prior to starting the process, during the process, and subsequent to completing the process, notification light may be output in the boundary region of window portion 240. However, the present example may not be necessarily limited to this, and the notification light may not be output during the control process.

Figure 19F:
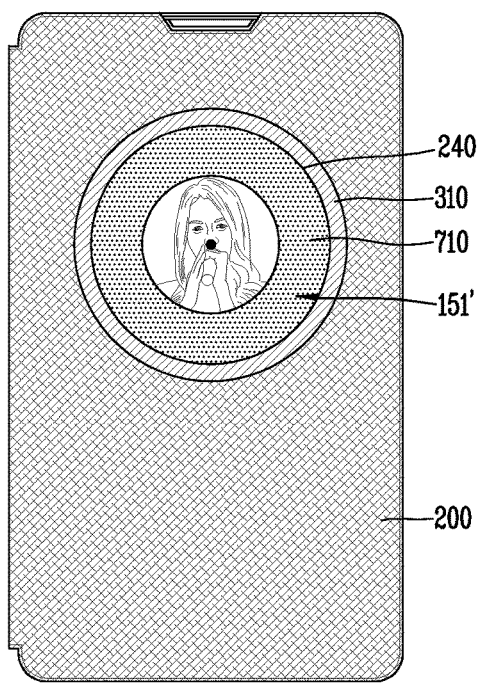
Figure 19F:
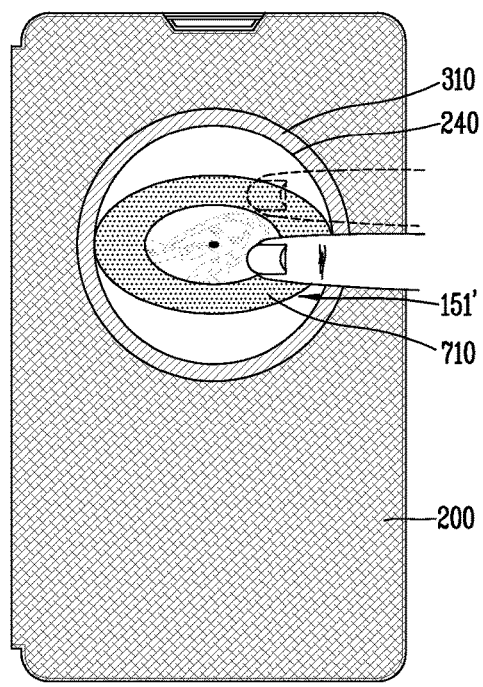
Figure 19F:
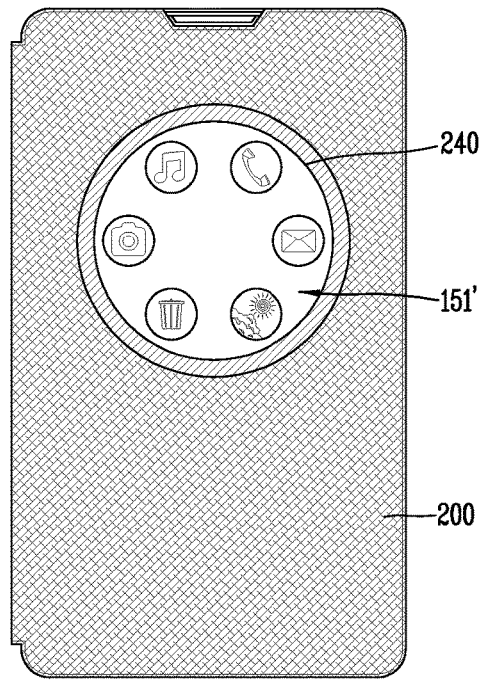

Referring to FIG. 19F, the terminal may be configured to select information displayed on the exposed region 151' through a touch input to the exposed region 151'.

For example, while a first type of screen 710 (for example, a screen including an image) is displayed on the exposed region 151' of the terminal, the cover 200 and terminal may be combined with each other to receive only an input for changing a screen displayed on the exposed region.

In this case, the output of the first type of screen may be carried out according to an event being occurred on the terminal. When an event occurs while the exposed region 151' is deactivated, the first type of screen may be displayed while at the same time notification light 310 is output in the boundary region of window portion 240 (refer to FIG. 19F(a)).

When a touch input is applied to the window portion 240 while the first type of screen is displayed as illustrated in FIG. 19F(b), the terminal process the touch input as a control command for changing the first type of screen to another second type of screen. For example, when the touch input (for example, short touch, long touch, drag, flicking, tap, etc.) is applied to the first type of screen 710, the first type of screen 710 is overturned to display the second type of screen (refer to FIG. 19F(c)). In this case, the second type of screen may be a screen in which an application icon, a widget icon, and the like installed in the mobile terminal are sequentially arranged according to an outer circumference of the window portion.

FIGS. 20A, 20B, 21A, 21B, 21C, 21D and 21E are conceptual views for explaining a method of providing a user interface capable of controlling a mobile terminal in the aspect of user's experience when a cover provided with a circular shaped window is covered on a mobile terminal according to the present disclosure.

Figure 20A:
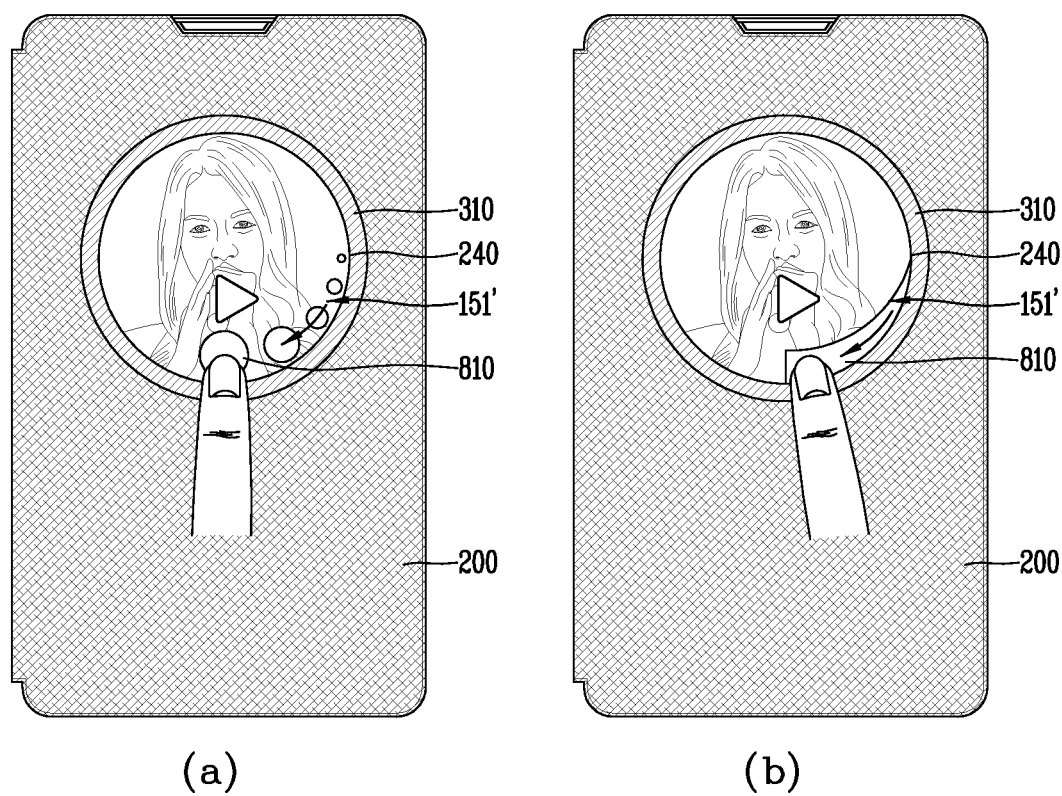
FIGS. 20A, 20B, 21A, 21B, 21C, 21D and 21E are conceptual views for explaining a method of providing a user interface capable of controlling a mobile terminal in the aspect of user's experience when a cover provided with a circular shaped window is covered on a mobile terminal according to the present disclosure.
Figure 20B:
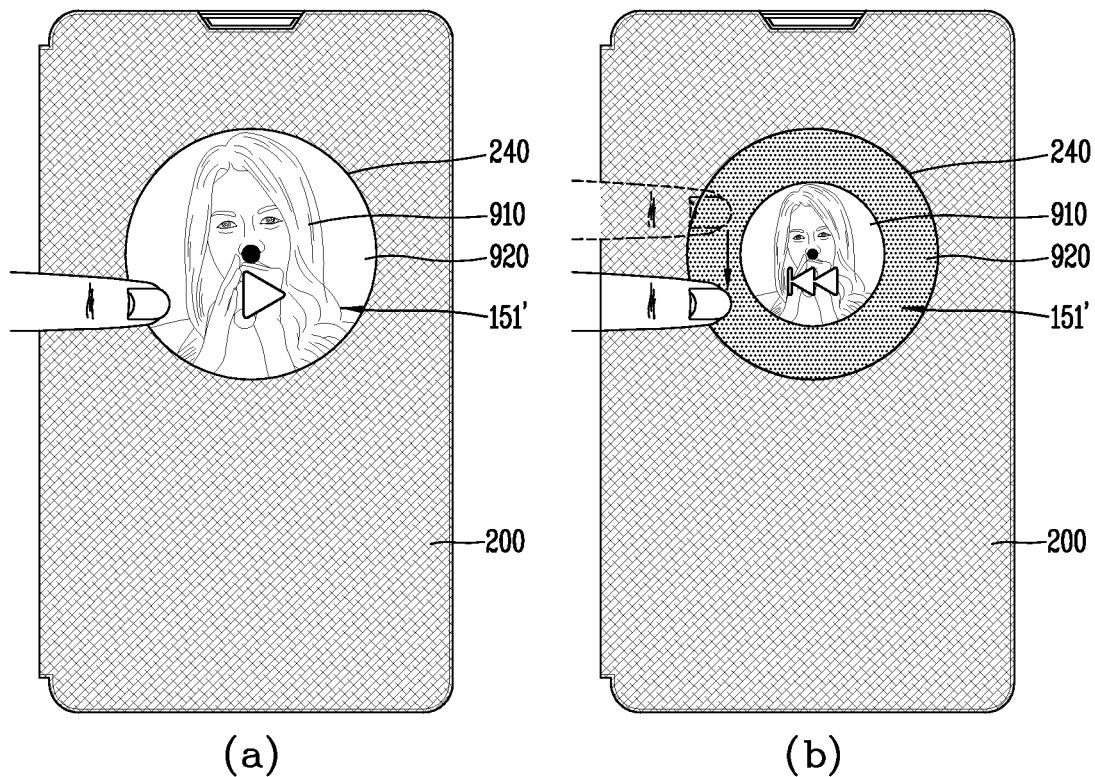

As illustrated in FIGS. 20A and 20B, when the terminal is covered by the cover 200, the terminal may process a touch input applied to a specific portion of the window portion 240 as a control command for performing a specific function. Furthermore, the present examples may be accompanied by switching information that has been displayed on the display unit while a front surface of the terminal is open to another information when covering the cover 200.

Referring to FIG. 20A, when the terminal is covered by the cover 200, the execution screen of a currently executed application (a play application in the present example, a gallery application in another example, etc.) is displayed on the exposed region. At the same time, notification light 310 due to the occurrence of an event may be displayed in the boundary region of window portion 240. Furthermore, an indicator 810 indicating the execution region of a specific function (volume control in the present example, brightness control in another example, etc.) may be displayed along an outer circumference of the window portion 240 within the boundary region.

The indicator 810 may be implemented in various shapes as illustrated in FIGS. 20A(a) and 20A(b), and a specific function is carried out by a touch input (for example, short touch, long touch, drag, flicking, tap, etc.) is applied to the indicator. For example, when a plurality of images are arranged along an outer circumference of the window portion 240 as illustrated in FIG. 20A(a), the volume (or brightness) is adjusted to the relevant size when a short touch is applied to any one of the plurality of images. For example, when a drag is applied to an image formed in an elongated manner along the outer circumference as illustrated in FIG. 20A(b), the volume (or brightness) is adjusted to a size relevant to the length of the drag.

In case of a control process in the present example, when an event occurs prior to starting the process, during the process, and subsequent to completing the process, notification light 310 may be output in the boundary region of window portion 240. However, the present example may not be necessarily limited to this, and the notification light may not be output during the control process.

Referring to FIG. 20B(a), when the terminal is covered by the cover 200, the execution screen 910 of an audio play application currently being executed is displayed on the exposed region 151'. An image, a play icon, or the like may be displayed on the execution screen 910. In this case, when a touch input is applied to the window portion 240, the touch input is processed as a control command executing a specific function of the audio play application. For example, when a drag input is applied to the execution screen 910 as illustrated in FIG. 20B(b), a border image 920 surrounding the execution screen may be displayed while reducing the execution screen 910. The reduced execution screen 910 and the border image 920 are combined with each other to form an image like a turn table.

At this time, the drag input may be applied to a region displayed with the border image 920. According to the direction of the drag input, fast forward (FF) and fast rewind (FR) may be carried out for reproduced audio. In other words, fast rewind is carried out when a drag input is applied in the direction of winding a turn table, and fast forward is carried out when applied in the opposite direction. Through this, it may be possible to apply an input in the form of winding or unwinding a turn table.

FIGS. 21A through 21E illustrate a method of providing a user interface in which the location or shape of a specific image is varied according to an outer circumference of the circular shaped window portion.

Figure 21A:
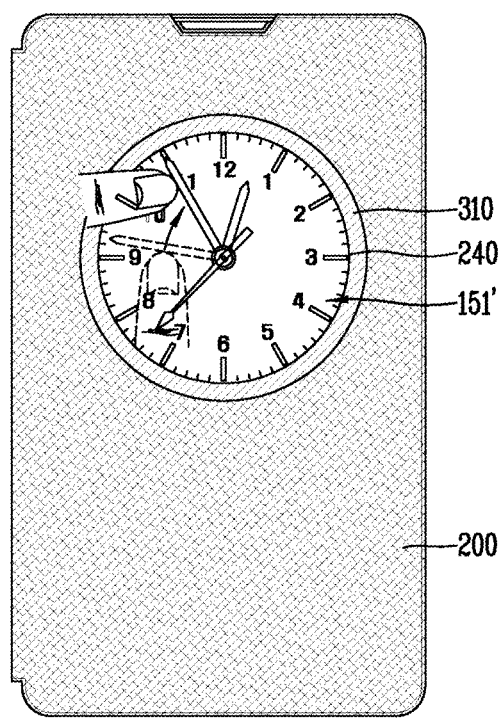
Figure 21B:
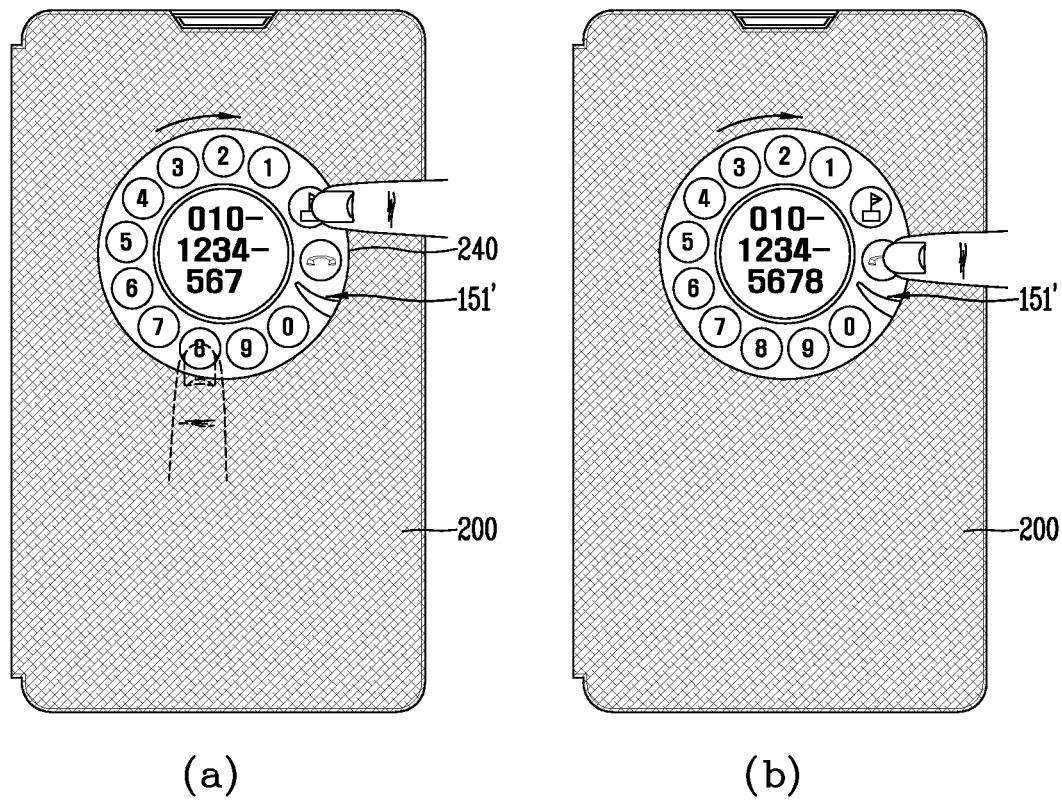

Referring to FIG. 21A, an analog clock image may be displayed on the circular shaped window portion 240, namely, the exposed region 151' when covering the cover 200. Furthermore, a digital clock or another size of analog clock may be displayed while the cover is open, and then an analog clock may be displayed within the exposed region 151' when covering the cover.

Furthermore, the (hour or minute) hands of an analog clock may be rotated based on the user's drag input. For example, when a first touch input (for example, tap or long touch) is applied to the window portion 240 while displaying the analog clock image, an adjustment mode capable of adjusting the hour or minute hand of the analog clock is carried out. In the adjustment mode, notification light 310 may be displayed in the boundary region of window portion 240. In this case, the notification light 310 performs the function of notifying that the adjustment mode has been executed.

Furthermore, upon executing the adjustment mode, the controller 180 may notify that an adjustment mode has been executed using at least one of vibration and sound in addition to the notification light 310. In other words, the user can receive a feedback for the execution of an adjustment mode through the output of notification information thorough at least one of notification light, vibration and sound.

When the user applies a second touch input (for example, drag) to the hour or minute hand in the adjustment mode, the hour or minute hand can be rotated by the second touch input. Then, when a first touch input (for example, tap or long touch) is applied thereto again, the adjustment mode can be terminated. Meanwhile, at least one of notification light, vibration and sound is output in response to the second touch input, thereby providing a feedback notifying that the second touch input is being effectively received.

For another example, referring to FIGS. 21 B through 21 D, an analog phone dial image may be displayed on a circular shaped window portion 240, namely, the exposed region 151' when covering the cover 200. In this case, the dial image may not be displayed while the cover 200 is open, and then the dial image may be displayed on the exposed region 151' when covering the cover.

When the user applies a touch input being moved along an outer circumference of the circular shaped window portion to the dial image, the dial image is rotated in response to the touch input. At this time, a number being entered may be set according to the rotating level. For example, when any number ("8" in the present example) is touched (refer to FIG. 21B(a)), and then a drag is applied along an outer circumference of the window portion to the end position of the rotation, the any number is entered (refer to FIG. 21B(b)). In this case, an indicator indicating the end position of the rotation may be displayed on the dial image, and the entered number may be displayed within the dial image. In this case, when the entered number corresponds to a number of the counterpart terminal, a call signal connection for the counterpart terminal may be carried out.

Figure 21C:
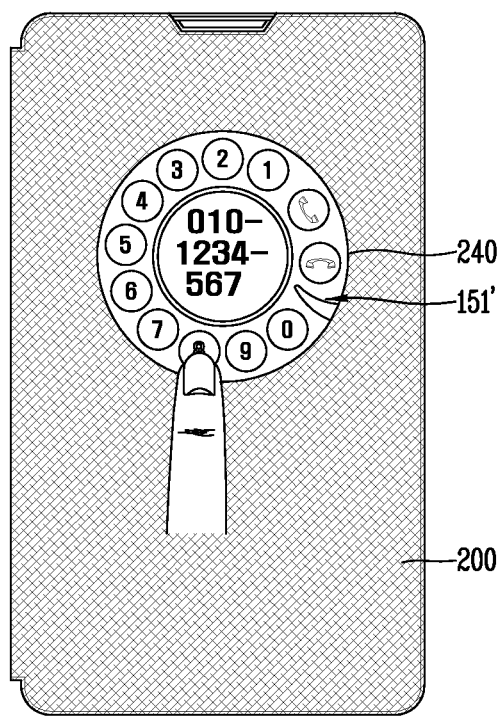
Figure 21C:
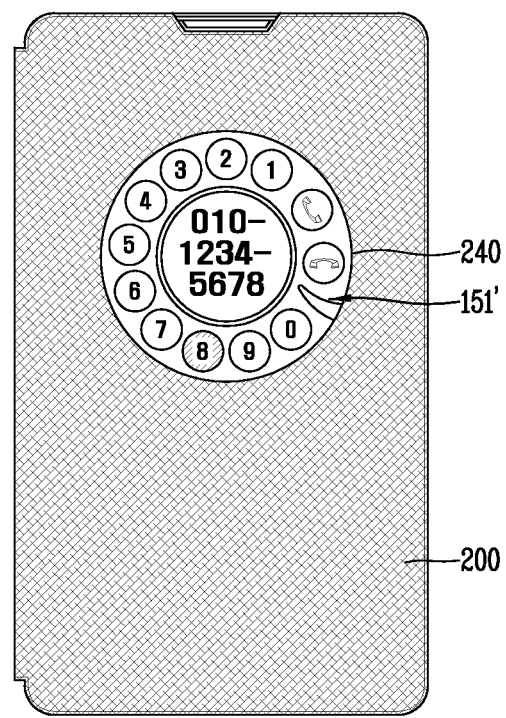

For another example, as illustrated in FIG. 21C, when a touch input (for example, short touch, long touch, tap, etc.) is applied to a number shown on the dial image, an input to the relevant number can be carried out. Even in this case, the entered number may be displayed within the dial image, and a call signal connection for the counterpart terminal may be carried out when the entered number corresponds to a number of the counterpart terminal.

Figure 21D:
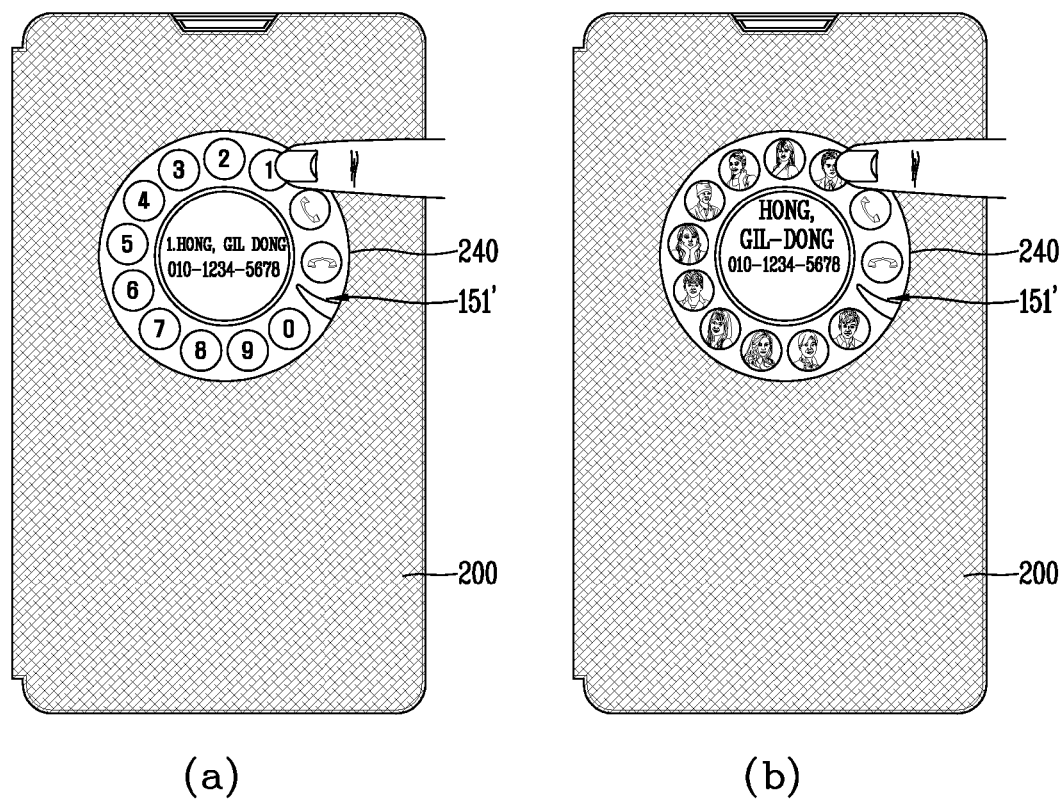

For still another example, as illustrated in FIG. 21D, numbers shown on the dial image may be specified as a shortcut number. The shortcut number as a reduced number capable of calling the counterpart is set by the user. More specifically, the phone number of any counterpart is specified to any one of numbers shown on the dial image, and when the user applies a touch input (for example, short touch, long touch, tap, etc.) is applied to the any one number while displaying the dial image, a call signal connection for the specified phone number may be carried out.

However, the present example may not be necessarily limited to a shortcut number, and a "Favorites" function may be carried out. For a specific example, a specific application or webpage is specified to the number, and it may be possible to execute the relevant application or display the relevant webpage when a touch input is applied to any number.

A user interface in which the location or shape of a specific image is varied according to an outer circumference of the circular shaped window portion 240 may have a different shape from the foregoing example.

Figure 21E:
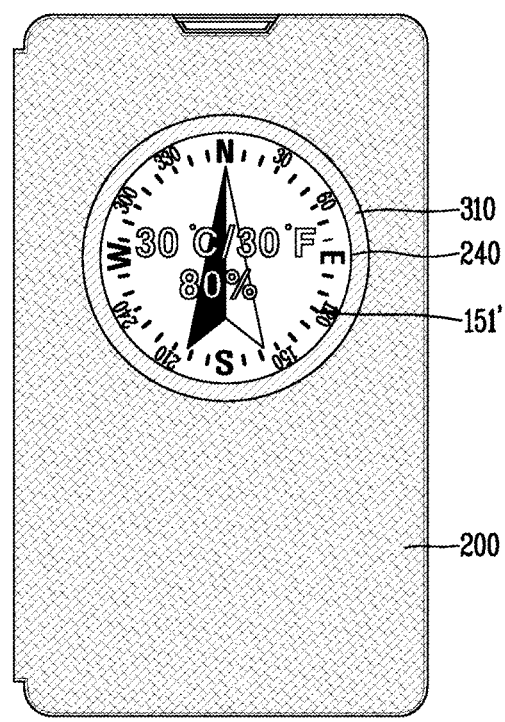

Referring to FIG. 21E, a compass image may be displayed on a circular shaped window portion 240, namely, the exposed region 151', when covering the cover 200. In this case, the output of the compass image may be carried out in response to a specific control command being applied thereto. For example, when a touch input (for example, short touch, drag, tap, etc.) set to a compass display command is applied to the window portion 240 while the exposed region 151' is deactivated, a compass image may be displayed on the exposed region 151'.

A compass image displayed on the exposed region 151' may be rotated in response to the movement of the location of the terminal. In other words, the compass can be rotated to indicate a north-south direction all the time regardless of the movement of the terminal.

At this time, notification light 310 may be displayed in the boundary region of window portion 240. In this case, the notification light 310 may perform a function of notifying that the compass image has been displayed. For another example, when an event occurs on the terminal prior to or subsequent to the output of the compass image, the notification light 310 may be output thereon.

The configurations and methods according to the above-described embodiments will not be applicable in a limited way to the foregoing mobile terminal, and all or part of each embodiment may be selectively combined and configured to make various modifications thereto.

In this manner, according to the present disclosure, information may be provided through a display region exposed through the window portion of the cover even while the display unit is covered by the cover. Accordingly, the user may more conveniently use a mobile terminal even when the cover of the mobile terminal is not open.

Furthermore, according to the present disclosure, notification light due to the occurrence of an event may be output in the boundary region of window portion while the display unit is covered by the cover, thereby more intuitively notifying the occurrence of the event to the user.

Furthermore, according to the present disclosure, the window portion of the cover may be formed in a circular shape, thereby providing a more emotional mobile terminal. Moreover, according to the present disclosure, the window portion may be provided with a circular shape, thereby providing a specialized graphic user interface (GUI).

Hereinafter, another embodiment of a cover on which a mobile terminal according to the present disclosure can be mounted will be described in more detail. The function of a mobile terminal associated with the foregoing cover may be similarly applicable to a case where a cover described below is mounted on the mobile terminal, and thus the detailed description thereof will be omitted.

Figure 22:
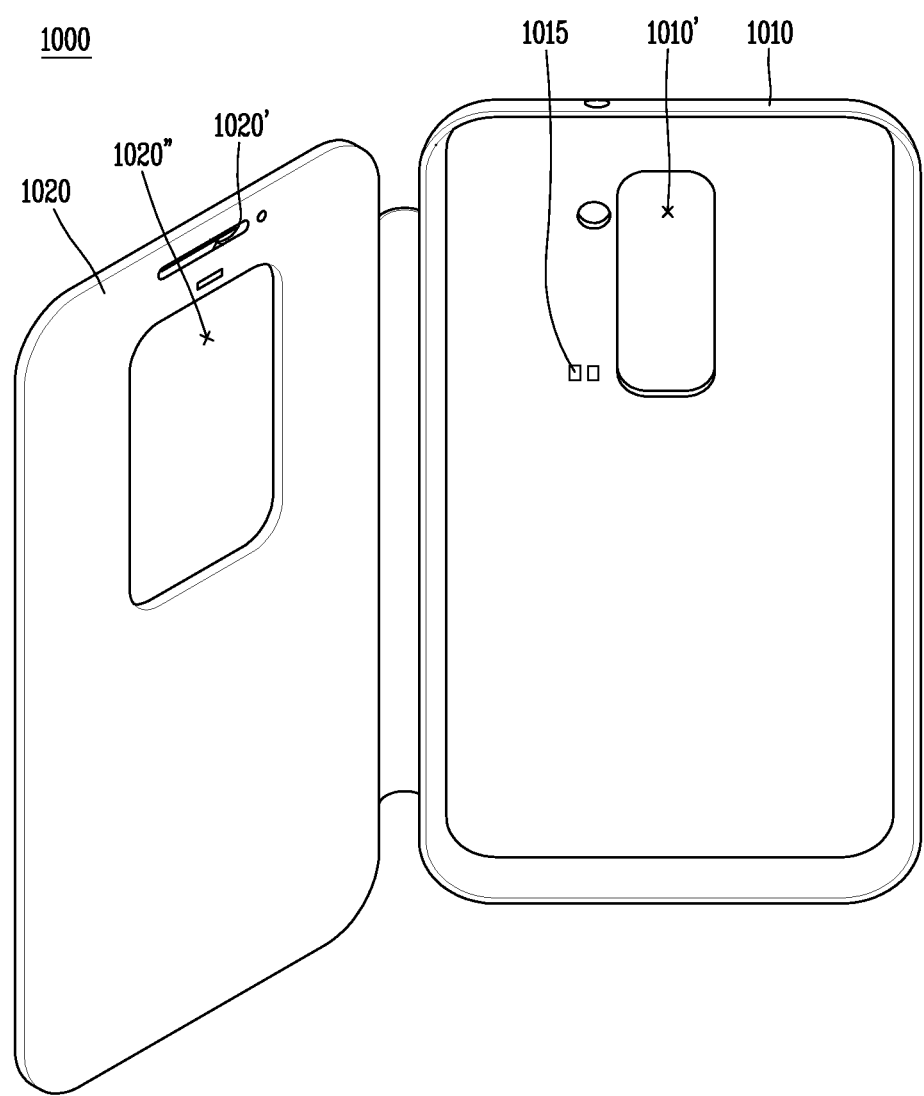
FIG. 22 is a view illustrating a mobile terminal case according to an embodiment of the present disclosure.
Figure 23:
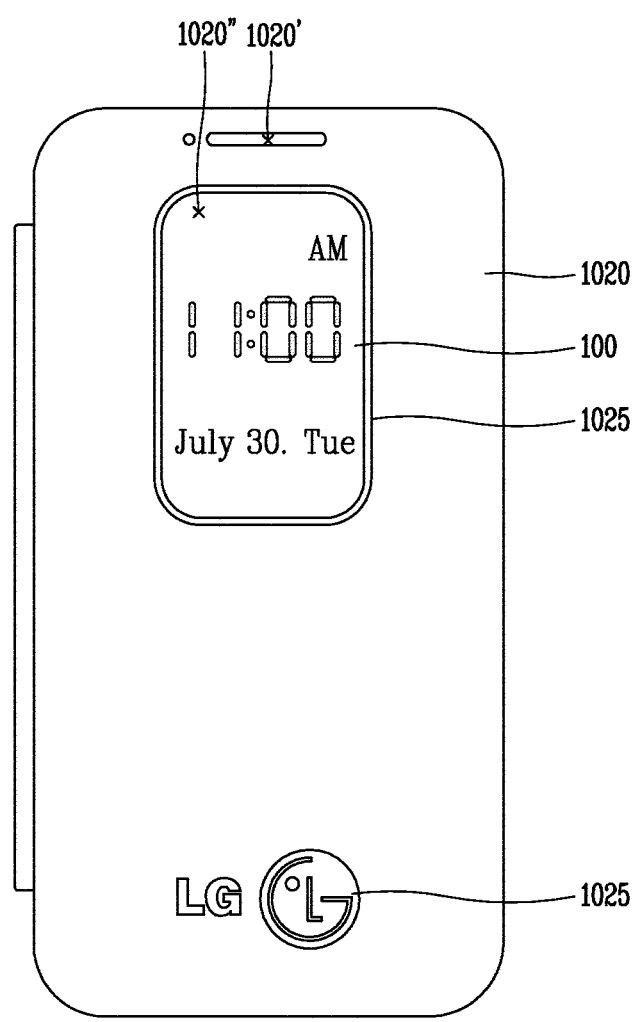
FIG. 23 is a view illustrating a state in which a mobile terminal is mounted on a mobile terminal case in FIG. 22.

FIG. 22 is a view illustrating a mobile terminal case 1000 according to an embodiment of the present disclosure, and FIG. 23 is a view illustrating a state in which a mobile terminal 100 is mounted on a mobile terminal case 1000 in FIG. 22. Referring to FIG. 22, a mobile terminal case 1000 according to the present disclosure may include a rear cover 1010 and a folio cover 1020. The rear cover 1010 may be combined with a rear surface of the mobile terminal 100 or combined with a rear case thereof after separating a battery cover of the mobile terminal 100 to replace the battery cover of the mobile terminal 100.

An opening portion 1010' may be formed on the rear cover 1010 in a portion corresponding to the location of a camera of the mobile terminal 100 to capture a picture while mounting the rear cover 1010. The opening portion 1010' may be formed in a portion at a location corresponding to a button, a flash, a speaker, and the like, located on a rear surface of the mobile terminal 100, in addition to the camera.

A hook combined with the mobile terminal 100 is formed on the circumference of the rear cover 1010, and a connection terminal 1015 electrically connected to the mobile terminal 100 is formed within the rear cover 1010. Power can be supplied from a power supply unit of the mobile terminal 100 through the connection terminal 1015, and a control signal can be transferred from the controller of the mobile terminal 100.

The folio cover 1020 is combined with one side of the rear cover 1010, and the mobile terminal 100 is combined with the rear cover 1010 to cover a front surface of the mobile terminal 100 as illustrated in FIG. 23. The folio cover 1020 may be configured with a shape corresponding to a front shape of the mobile terminal 100, and an opening portion 1020' may be formed at a receiver portion for a call. Furthermore, a window 1020" may be formed on the folio cover 1020 to partially display time, weather information and the like at a portion of the window 1020", thereby allowing the user to check a clock, weather information, event notification and the like even without opening the folio cover 1020.

Figure 24:
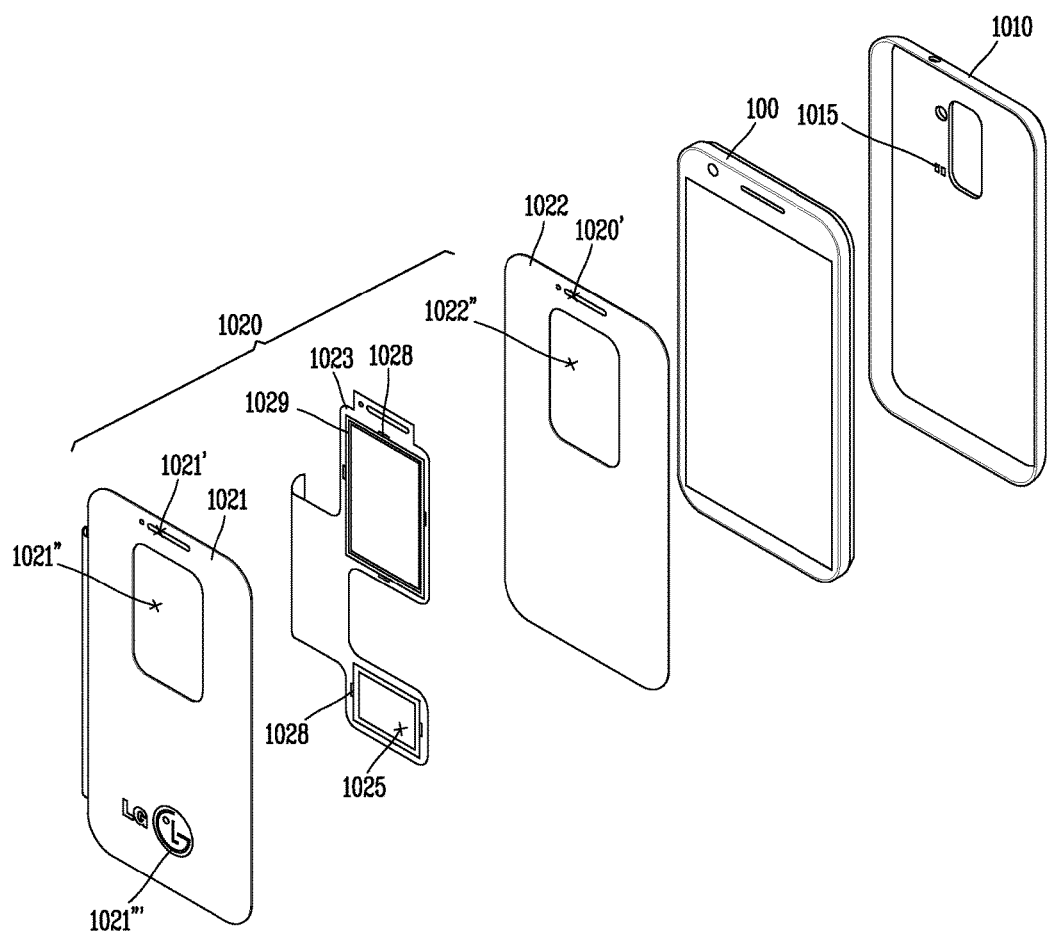
FIG. 24 is an exploded perspective view illustrating a mobile terminal case in FIG. 22.

FIG. 24 is an exploded perspective view illustrating a mobile terminal case 1000 in FIG. 22, and the folio cover 1020 may include a front sheet 1021, a rear sheet 1022, a light source 1028 and a light guide member 1025.

The front sheet 1021 is located at an uppermost front surface thereof to be exposed to the front surface when covering the folio cover 1020, and various materials such as cloth, synthetic resin, silicon or the like may be used for the front sheet 1021. The rear sheet 1022 as a portion brought into contact with the display unit of the mobile terminal 100 when covering the folio cover 1020 may be made of the same material as that of the front sheet 1021, but also configured with a different material.

At least one of the front sheet 1021 and rear sheet 1022 may include a rigid material to maintain the shape of the folio cover 1020. However, here, a connecting portion between the folio cover 1020 and rear cover 1010 is configured with a flexible material for a rotational movement.

Figure 25:
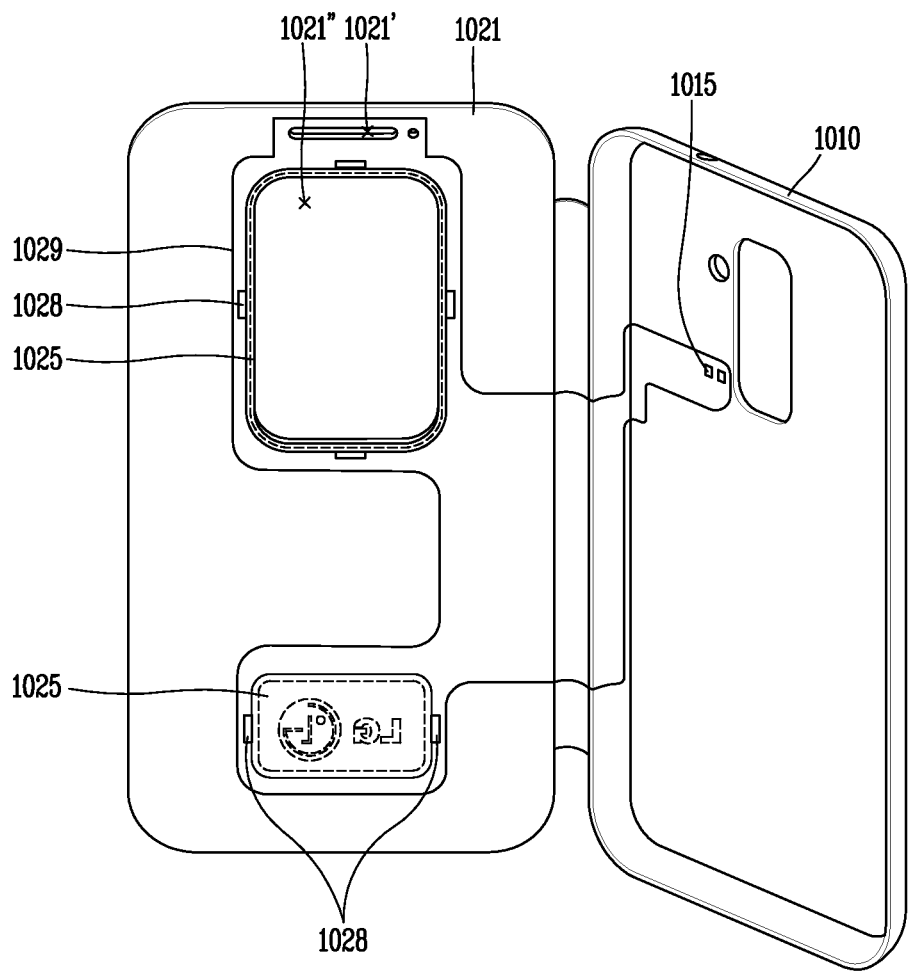
FIG. 25 is a view illustrating a folio cover combined with a front sheet, a light guide member, a light source and a flexibly printed circuit board in FIG. 24.

The light source 1028 may be interposed between the front sheet 1021 and rear sheet 1022 to supply light, and a flexible printed circuit board 1029 may be used to supply power to the light source 1028. Referring to FIG. 25, which is a view illustrating the front sheet 1021, light guide member 1025, light source 1028 and flexible printed circuit board 1029 excluding the rear sheet 1022, the flexible printed circuit board 1029 is extended to the rear cover 1010, and connected to the foregoing connection terminal 1015 to receive power from the mobile terminal 100.

The light guide member 1025 emits light emitted from the light source 1028 in a front surface direction of the folio cover 1020, and a portion in which light is incident from the light source 1028 is referred to as a light entrance portion 1025*b,* and a portion in which light is emitted in the front surface direction thereof is referred to as a light exit portion 1025*a*. The light exit portion 1025*a* is disposed on the opening portion 1021', 1021', 1021''' and the light entrance portion 1025*b* is disposed at a location adjacent to the light source.

The light exit portion 1025*a* may be located at a portion indicating a specific logo, glyph or the like as illustrated in FIG. 23, or located on the circumference of the opening portion 1020', 1020'' formed on the folio cover 1020. The opening portion 1021''' is formed only on the front sheet 1021 in case of the former, but all the opening portions 1201', 1021'', 1022', 1022'' are formed on the front sheet 1021 and rear sheet 1022 in case of the latter.

Figure 26:
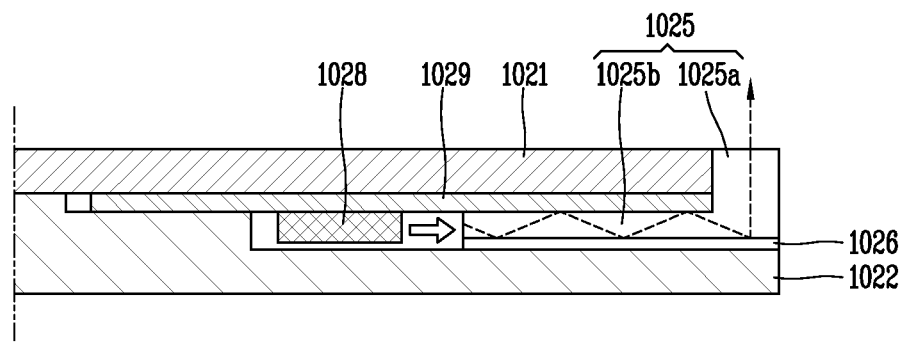
FIG. 26 is a partial cross-sectional view illustrating a light guide member portion of a folio cover.

FIG. 26 is a partial cross-sectional view illustrating a portion of the light guide member 1025 of the folio cover 1020, in which the light source 1028 interposed between the front sheet 1021 and rear sheet 1022 and the light guide member 1025 disposed on the circumference of the opening portion 1020' are shown. The light source 1028 is placed on the flexible printed circuit board 1029 as described above, and the flexible printed circuit board 1029 may be disposed at the side of the front sheet 1021 or rear sheet 1022 as illustrated in FIG. 26. When disposed at the side of the rear sheet 1022, a light shielding treatment may be required to suppress light emitted from the light source 1028 and light guide member 1025 from being exhibited on a front surface of the front sheet 1021.

The light guide member 1025 is bent in an L-shape, and the light entrance portion 1025*b* is extended in a direction parallel to the front sheet 1021 and rear sheet 1022, and the light exit portion 1025*a* is passed through the front sheet 1021. A reflective coating 1026 is made on a surface of the light entrance portion 1025*b* to minimize the loss of light when arriving at the light exit portion 1025*a*.

As illustrated in FIG. 23, the light guide member 1025 may be located on the circumference of the opening portion 1020' of the folio cover 1020 or the light exit portion 1025*a* may be disposed at an opening partially formed with a figure or character shape.

When a specific event occurs such as receiving a text message or call, the mobile terminal 100 supplies power through the connection terminal 1015 to emit light from the light source 1028. Power is supplied through the connection terminal 1015 to emit light from the light source 1028. Light supplied from the light source 1028 is emitted to a front surface through the light guide member 1025, thereby allowing the user to know the occurrence of an event while covering the folio cover 1020.

When the light source 1028 capable of emitting three colors such as red, green and blue is used, it may be possible to implement various colors in combination with the three colors, and vary colors according to the type of the event. Otherwise, the light source 1028 may be controlled in a blinking manner or light may be supplied only through a measurement light guide member 1025 among a plurality of light guide members 1025 to identify the type of the event.

Figure 27:
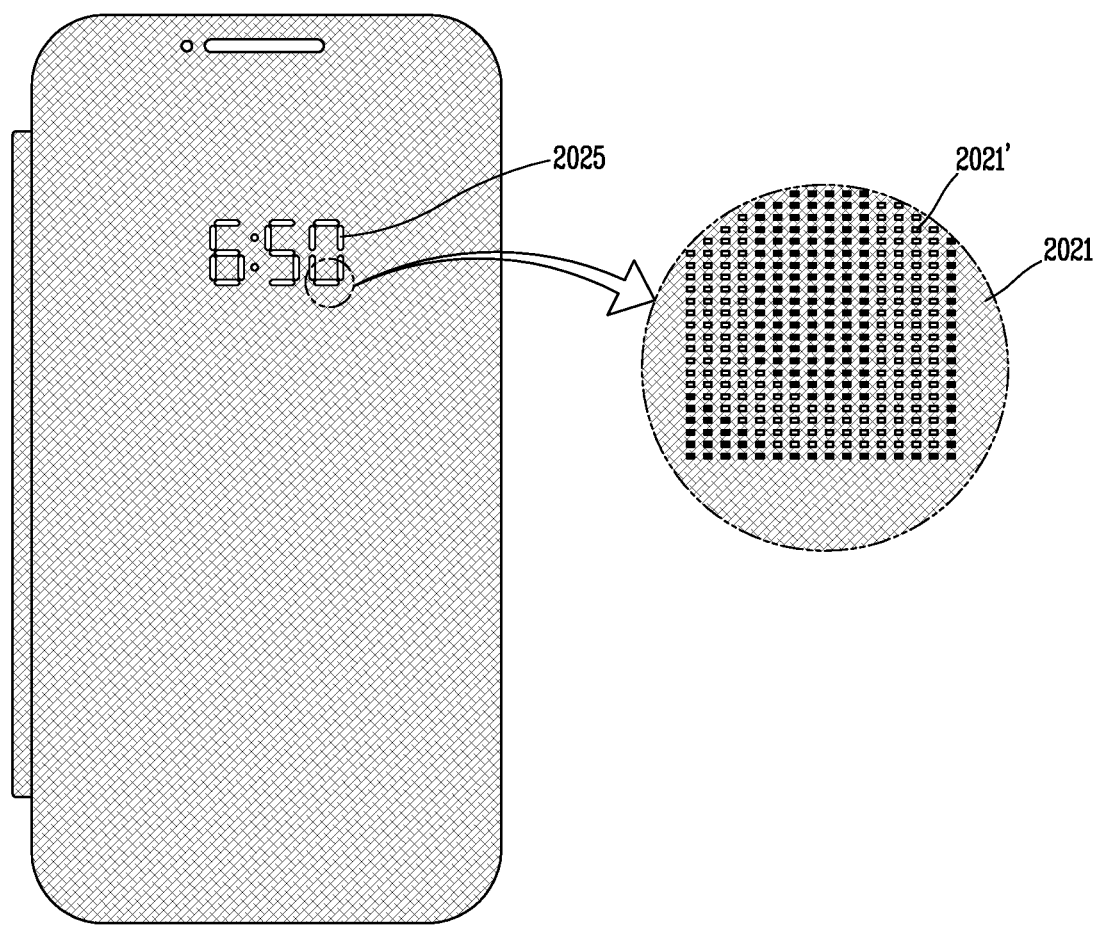
FIG. 27 is a view illustrating a mobile terminal case according to another embodiment of the present disclosure.
Figure 28:
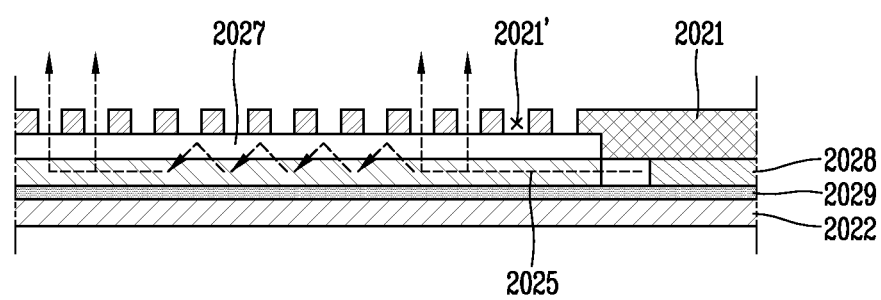
FIG. 28 is a cross-sectional view of FIG. 27.

Next, FIG. 27 is a view illustrating a mobile terminal case according to another aspect of the present disclosure, and FIG. 28 is a cross-sectional view of FIG. 27. Referring to FIGS. 27 and 28, an opening portion formed on the front sheet 2021 is a plurality of micro perforated holes 2021', and further includes a liquid crystal 2027' interposed between the light guide member 1025 and front sheet 2021.

The liquid crystal 2027 is a material existing in an intermediate state between liquid and crystal, thereby alternately exhibiting a liquid phase with an irregular molecular arrangement and a crystalline phase with a regular molecular arrangement. The regularity of molecular arrangement may be varied according to whether or not power is supplied thereto, and thus light is not transmitted when in an irregular molecular arrangement but light is transmitted when in a regular molecular arrangement.

Light may be selectively transmitted by controlling the arrangement of the liquid crystal 2027, thereby implementing a specific character or figure. For example, a numeral may be implemented to transfer time information to the user, and an image may be implemented to notify weather or the occurrence of an event to the user.

A plurality of micro perforated holes 2021' may be formed at a portion located with the liquid crystal 2027 to exhibit a character or figure implemented with the liquid crystal 2027 on a front surface of the folio cover 2020 as illustrated in FIGS. 27 and 7 to emit light transmitted through the liquid crystal 2027. The micro perforated holes 2021' may be formed with a size less than 0.5 mm not to be largely noticeable through the user's eye.

As described above, according to at least one of the embodiments of the present disclosure, the occurrence of an event may be notified from the folio cover of the mobile terminal, thereby notifying the occurrence of the event to the user even while covering the folio cover.

Furthermore, light may be emitted from the folio cover, thereby implementing more various and luxurious designs.

It should be understood by those skilled in the art that the present invention may be embodied in other specific forms without departing from the concept and essential characteristics thereof.

The detailed description is, therefore, not to be construed as illustrative in all respects but considered as restrictive. The scope of the invention should be determined by reasonable interpretation of the appended claims and all changes that come within the equivalent scope of the invention are included in the scope of the invention.

What is claimed is:

1. A mobile terminal, comprising:
a controller;
a body configured to be coupled to a cover; a display disposed on a front side of the body; and
a first electrical connector disposed at the body;
wherein the cover is configured to cover the display in a first position and comprises:
a second electrical connector configured to be electrically coupled to the first electrical connector;
an opening configured to allow a portion of the display to be viewed while the cover front portion is in the first position;
a front sheet and a rear sheet;
a light source interposed between the front sheet and the rear sheet and located on a circumference of the opening; and
a light guide member disposed between the front sheet and the rear sheet and located on the circumference of the opening,
wherein the light guide member comprises a first portion through which light incident from the light source is transmitted and a second portion through which the light is emitted at the front side,
wherein the light guide member is configured to be covered by the front sheet and the second portion is configured to overlap with the opening to emit the light to the opening, and
wherein the controller is configured to cause the light source to produce the light when an event occurs at the mobile terminal.

2. The mobile terminal of claim 1 wherein the cover further comprises a flexible printed circuit board configured to electrically couple the second electrical connector to the light source.

3. The mobile terminal of claim 2, wherein the cover comprises a cover front portion comprising the front sheet and the rear sheet and a cover rear portion, and
a hinge between the cover front portion and the cover rear portion to provide hinged movement of the cover front portion from the first position to at least a second position in which the cover front portion does not cover the display.

4. The mobile terminal of claim 2, wherein the cover front portion is configured to cover the entire display in the first position such that no portion of the display is visible.

5. The mobile terminal of claim 4, wherein the cover front portion is further configured such that the light from the light source provides at least a portion of indicator information related to the event.

6. The mobile terminal of claim 5, wherein the indicator information is related to at least a type of the event, a time of the event, a source of the event, or an application related to the event.

7. The mobile terminal of claim 4, wherein the cover front portion further comprises a plurality of holes and a light passage member configured to selectively allow light from the light source to pass through some of the plurality of holes to be visible when the cover front portion is in the first position.

8. The mobile terminal of claim 2, wherein the produced light comprises indicator information related to a type of the event.

9. A cover for a mobile terminal, the cover comprising:
a first cover portion configured to cover a display of the mobile terminal in a first position;
a second cover portion configured to be coupled to a body of the mobile terminal; wherein:
the second cover portion comprises a first electrical connector configured to be electrically coupled to a second electrical connector disposed on the body of the mobile terminal; and
the first cover portion comprises:
an opening configured to allow a portion of the display to be viewed while the first cover portion is in the first position;
a front sheet and a rear sheet;
a light source interposed between the front sheet and the rear sheet and located on a circumference of the opening; and
a light guide member disposed between the front sheet and the rear sheet and located on the circumference of the opening,
wherein the light guide member comprises a first portion through which light incident from the light source is transmitted and a second portion through which the light is emitted at the front side,
wherein the light guide member is configured to be covered by the front sheet and the second portion is configured to be overlapped with the opening to emit the light to the opening, and
wherein the first electrical connector is configured to transfer power provided by the second electrical connector to cause the light source to produce the light when an event occurs at the mobile terminal.

10. The cover of claim 9, wherein the rear sheet faces the display when the first cover portion is in the first position.

11. The cover of claim 9 further comprising a flexible printed circuit board configured to electrically couple the first electrical connector to the light source.

12. The cover of claim 11, further comprising a hinge between the first cover portion and the second cover portion to provide hinged movement of the cover front portion from the first position to at least a second position in which the cover front portion does not cover the display of the mobile terminal.

13. The cover of claim 11, wherein the first cover portion is configured to cover the entire display of the mobile terminal in the first position such that no portion of the display is visible.

14. The cover of claim 13, wherein the first cover portion is further configured such that the light from the light source provides at least a portion of indicator information related to the event.

15. The cover of claim 14, wherein the indicator information is related to at least a type of the event, a time of the event, a source of the event, or an application related to the event.

16. The cover of claim 11, wherein the first cover portion further comprises a plurality of holes and a light passage member configured to selectively allow the light from the light source to pass through some of the plurality of holes to be visible when the first cover portion is in the first position.

* * * * *